(12) United States Patent
Jenkins

(10) Patent No.: US 9,879,394 B2
(45) Date of Patent: Jan. 30, 2018

(54) HERODOTUS MACHINE

(71) Applicant: Keith Lorin Jenkins, Maricopa, AZ (US)

(72) Inventor: Keith Lorin Jenkins, Maricopa, AZ (US)

(*) Notice: Subject to any disclaimer, the term of this patent is extended or adjusted under 35 U.S.C. 154(b) by 0 days.

(21) Appl. No.: 15/627,043

(22) Filed: Jun. 19, 2017

(65) Prior Publication Data

US 2017/0284049 A1  Oct. 5, 2017

(51) Int. Cl.
| | |
|---|---|
| *E02B 5/08* | (2006.01) |
| *E02C 1/06* | (2006.01) |
| *E02B 7/36* | (2006.01) |
| *E02B 7/28* | (2006.01) |
| *E02B 7/40* | (2006.01) |
| *E02C 1/04* | (2006.01) |
| *E02B 5/06* | (2006.01) |
| *E02B 7/20* | (2006.01) |

(52) U.S. Cl.
CPC ............ *E02B 5/06* (2013.01); *E02B 5/08* (2013.01); *E02B 7/28* (2013.01); *E02B 7/36* (2013.01); *E02B 7/40* (2013.01); *E02C 1/06* (2013.01); *E02B 7/20* (2013.01); *E02C 1/04* (2013.01)

(58) Field of Classification Search
CPC ..... E02B 5/06; E02B 7/36; E02B 7/40; E02B 7/50; E02B 7/28; E02B 5/08; E02B 5/00; E02C 1/06
USPC ..................................................... 400/84–86
See application file for complete search history.

(56) References Cited

U.S. PATENT DOCUMENTS

| | | | | |
|---|---|---|---|---|
| 1,037,396 A * | 9/1912 | Wood | ............ | E02C 1/00 405/85 |
| 1,173,367 A * | 2/1916 | Meacham | ............ | E02C 1/00 405/85 |
| 1,733,850 A * | 10/1929 | Zimmermann | ............ | E02B 7/40 405/101 |

FOREIGN PATENT DOCUMENTS

| | | | | |
|---|---|---|---|---|
| JP | 2012251404 A | * | 12/2012 | |
| JP | 2014118774 A | * | 6/2014 | ............ E02B 7/44 |
| JP | 2016108883 A | * | 6/2016 | |

OTHER PUBLICATIONS

Kunkel, E. "The Pharaoh's Pump", self published, 1973. Selection relevant of pages provided, showing Kunkel intended step locks on the outside of the Pyramid, and used a vacuum pump to raise the water.

(Continued)

*Primary Examiner* — Daniel J Colilla

(74) *Attorney, Agent, or Firm* — Keith L. Jenkins, Registered Patent Attorney, LLC; Keith L. Jenkins

(57) ABSTRACT

An Herodotus machine, or bottom-source, up-stair, hybrid pump and step lock system, includes synchronized reciprocating cross-gate displacers with commonly synchronized gates and floating body movers; specifically including a sequence of ascending adjacent step locks separated by gates with reciprocating gears on axles aligned over respective gates. A chain over each reciprocating gear has a displacer on each end, with one displacer in the upper lock and the other displacer in the lower lock. Rotating first, the downstream displacer descends to raise the lower lock water level, while the upstream displacer rises to lower the upper lock water level, and vice versa on the reverse gear rotation. Displacers are sized such that water levels in alternate pairs of upper lock and lower lock are made the same. The gate (Continued)

is then opened and a watercraft can be transferred from the lower lock to the upper lock or vice versa.

20 Claims, 30 Drawing Sheets

(56) References Cited

OTHER PUBLICATIONS

Adema "This is no pyramid scheme!", http://imgur.com/gallery/HJ9II, published Jan. 27, 2017 downloaded Jun. 19, 2017. Lift gates, but no displacers, much less synchronized reciprocating cross-gate displacers.

Jana, D. "The Great Pyramid Debate", 29th International Cement Microscopy Association (ICMA) Conference, Quebec City, Canada May 21-May 24, 2007. Theory of Davidovits proposed as explanation of microscopic features of some limestone used in the Great Pyramid. Good evidence, wrong interpretation.

Daniel, "The Pharaoh's Pump—How the Great Pyramid was built", http://www.civradio.com/index.php/civnews/civilizationlistmenu/egyptianmenu/78thepharaohspumphowthegreatpyramidwasbuilt; Published Nov. 11, 2014; downloaded Jun. 19, 2017. Updated Kunkel. Stones on top of narrow barges are unstable in roll: as soon as the center of gravity of the stone moves to left or right of the center of lift in the barge, the barge rolls over and dumps the stone.

Herodotus, "The Histories", Book 2, 449-447 BCE; Macaulay, trans; Lateiner, rev; Barnes and Noble, 2004; items 124-125. Hearsay, from 2000 years after the Great Pyramid was built., but sporadically verifiable.

\* cited by examiner

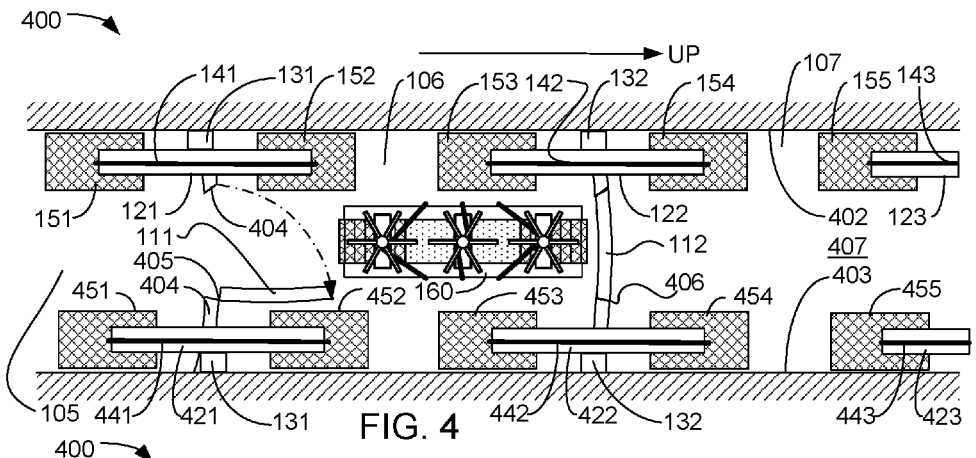
FIG. 4
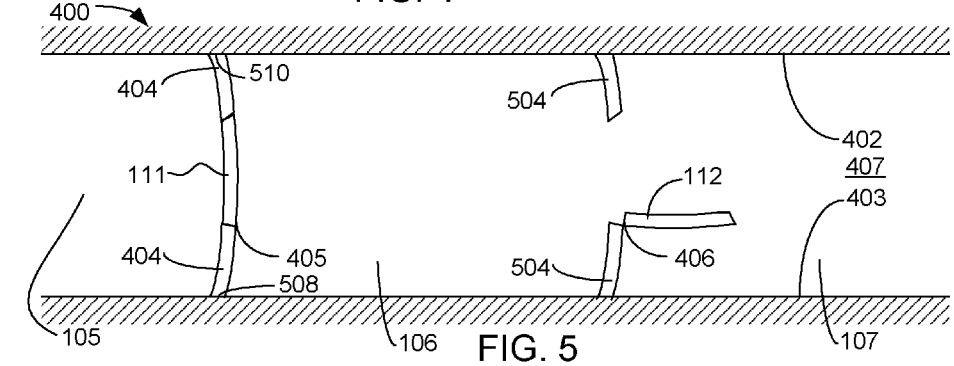
FIG. 5
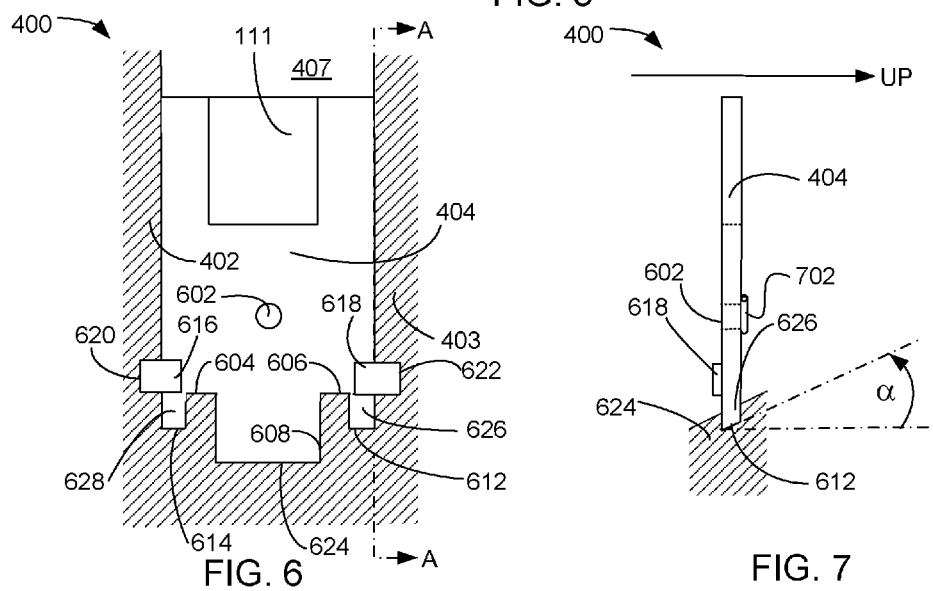
FIG. 6
FIG. 7

HERODOTUS MACHINE

FIELD OF ART

The present invention relates to a machine for raising watercraft from a lower body of water to a higher body of water. The present invention more particularly relates to a bottom-source, up stair, incrementally extendable, hybrid pump and step lock system with synchronized reciprocating cross-gate displacers and optional commonly synchronized gates and floating body movers. The present invention is a reverse engineering of the Herodotus machine, lost for more than 2,500 years.

BACKGROUND OF THE INVENTION

Reverse engineering necessarily requires looking at parts and aspects of the thing to be reverse engineered. The matters that were considered are included below.

A step lock is a series of ascending water locks (like the locks on the Panama canal) in which the water level in a lower step lock is raised to the level of the next upper lock, and transfer of a watercraft or other floating body may be made through a gate between the lower and upper locks. Long sequences of step locks can be made. Step locks are conventionally supplied with water from the upstream (uphill) end.

A fifth-century BCE historian named Herodotus recorded a non-enabling description of a machine, made of "short timbers", that was used to lift large (e.g. 2.5 tons) stones to various levels in the building of the Great Pyramid at Giza, Egypt. A myriad of proposed machines and methods have since been proposed to meet the long-felt need for such a machine, but none have won wide acceptance. Such machines are known as "Herodotus machines". The Herodotus machine is an ancient technology and has been lost for over twenty-five centuries. There has been a long-felt (2,500+ years) and unmet need for an Herodotus machine. This paper represents the reverse engineering of that anciently known and subsequently lost technology.

The principle of displacement of water is known. In the simplest illustration, a bather draws a bath tub about half full of water, places a floating rubber ducky on the water, and then gets in the tub. As the bather sits down in the tub, the bather's body displaces an equal volume of water which, being constrained by the tub, moves upward, lifting the rubber ducky. Anything that floats (has positive buoyancy) can be lifted using this principle, including ships and barges.

The Grand Gallery of the Great Pyramid of Giza, Egypt, is an ascending passageway enclosed in the Great Pyramid featuring opposed spaced-apart limestone walls and a limestone floor. The passageway is about six feet and nine inches wide, with a centrally aligned channel three feet and five inches wide and two feet deep. Opposed, spaced-apart shoulders extend one foot and eight inches from the top edges of the centrally aligned channel to the walls. The shoulders have twenty-six opposed pairs of regularly spaced aligned sockets adjacent to the walls. The lower walls and floor were charred when investigated by Europeans. The lower walls and floor also feature tic-tac-toe scratches and contain, in the pores of the stone, chemical decomposition products of frankincense.

Raw frankincense is tree sap from trees of the genus *Boswellia*. Raw frankincense was so valued by the ancient Egyptians that a palette of balls of raw frankincense was an item in a triumphal parade after a successful expedition into Egypt's southern neighbor, as shown on a wall carving in an ancient tomb. Raw frankincense has the necessary temperature stability for use as a flux for gold working. Rosin, used as flux in modern rosin-core solder, was originally a tree-sap derivative.

Caliph Abdullah al-Mamun entered the Great Pyramid around 820 CE, found the Grand Gallery, and had gold removed from the Grand Gallery. It took "one hundred men using one hundred torches one hundred days" to complete the task. The results were so uneconomical that further intrusions were not undertaken.

Gold is, as a consequence of gold's natural properties, the best water tight sealing material known for so-called "room temperature" applications. Gold is still used today as plumbing seals in high-value plumbing installations and in the hatch seals of submarine vehicles. Gold-to-gold seals are particularly effective for watertight seals.

At least as recently as the 1960's, the charred remains of some large wooden gears and an uncharred oddly knotted rope were in the Egyptian Museum in Cairo, cataloged as being from the Grand Gallery. Some of the gears did not have continuous perimeters and some did not have teeth around their entire perimeters. An early investigation of the gears concluded that the gears were not strong enough to lift pyramid stones, that the absence of teeth was a result of breakage, and that the incomplete perimeters were also the result of breakage.

Originally thought to be rollers, and found near ancient quarries and construction sites, short wooden logs were examined under a microscope by an archaeologist and it was found that there were no surface indications of use as rollers, but rather showed that the short logs had been lashed at the ends.

Lamp-like ancient Egyptian artifacts having a lamp oil reservoir, a long, nearly vertical, spout ending in a small horizontal tip extending from the oil reservoir have been found. The spout has several pairs of opposed arcuate extensions on the spout, generally on top but angled slightly to one side. The spout also has several small oil lamps along the length of the spout. A bowl, made of one piece with the oil reservoir, extends externally from a side of the oil reservoir. Artifacts of this type are found with a solidified puddle of gold in the bottom of the bowl and a layer of raw frankincense above the gold.

Two large jars found in the Queen's Chamber of the Great Pyramid have weights built into their bases. Scientific analysis by others has shown that the jars were never used to contain anything.

Desoldering braid is a wire wick, used with a soldering flux, to wick molten solder from electronic parts and circuit boards and is available from Radio Shack.

When quarrying Tura limestone, used as casing stones for the Great Pyramid, ancient Egyptians would anoint the stones with oil before pushing the stones off the quarry wall.

Ancient Egyptian artifacts comprising two parallel spaced-apart operationally horizontal beams with connecting structure and one or two operationally vertically extending hubs with radial spokes have been found. There is one published photograph extent that shows such an artifact partially stuck at an angle in a sand dune, with two hub and spoke devices visible and spokes from a third hub extending out of the sand. It has been proposed that such devices were used to hold together boxes for casting Pyramid building stones as concrete. An extant tomb wall painting shows a one hub and spoke device with a stone fuzzily outlined underneath, interpreted to be lifted by workers. No ropes are shown in the tomb painting.

Edward J. Kunkel, a hydraulic engineer, published a book entitled "Pharaoh's Pump", in which he proposed a step lock system external to the Great Pyramid that was supplied with water at the top of the step lock system. Supplying water at the top, to flow down through the step locks, represented the conventional thinking of his time as well as the present. Kunkel proposed that the water was pumped for the step lock system using the Grand Gallery of the Great Pyramid as a vacuum pump by burning fuel in the Grand Gallery, sealing the Grand Gallery and, as the air eventually cooled within, using the reduced pressure to suction up water to the top of the step locks. Kunkel relied on the charred surfaces of the lower walls and floor of the Grand Gallery, and charred wooden gears found within the Grand Gallery to support his argument. Kunkel proposed that, at the top of the step locks, the stone cargo would be transferred from the top of a barge to a smaller device for placement in a construction reservoir in the structure. No credible evidence of Kunkel's external step lock system has been found.

SUMMARY OF THE INVENTION

Briefly described, the invention includes a sequence of ascending adjacent step locks separated by gates with a large reciprocating (oscillating) gear on an axle aligned over each gate. A rope chain over the reciprocating gear has a displacer on each end, with one displacer in the upper lock and the other displacer in the lower lock. Turning in a first direction, the displacer in the lower lock descends into the water to raise the lower lock water level, while the displacer in the upper lock rises from the water, causing the water level in the upper lock to lower. By appropriate sizing of the displacers in relation to the lock volume, the water levels in the upper lock and lower lock are made the same by the motions of such displacers. The gate between the upper lock and the lower lock is then opened, and a watercraft can be transferred from the lower lock to the upper lock. Reciprocating gears on neighboring gates are synchronized to rotate in opposite directions, so that, in each lock, the displacer near the upper gate and the displacer near the lower gate move in unison. In some embodiments, the motion of the gates and motion of the watercraft are also synchronized.

DESCRIPTION OF THE FIGURES OF THE DRAWINGS

The present invention will hereinafter be described in conjunction with the following drawing figures, wherein like numerals denote like elements.

FIG. 4 is a diagrammatic top view illustrating an exemplary portion of a second embodiment of an Herodotus machine, built upon the Herodotus machine of FIG. 1C, according to a preferred embodiment of the present invention;

FIG. 5 is a diagrammatic top plan view illustrating an exemplary embodiment of a portion of the Herodotus machine of FIG. 1E, according to a preferred embodiment of the present invention;

FIG. 6 is a diagrammatic front elevation view illustrating an exemplary embodiment of a gate support panel of the Herodotus machine of FIG. 1E and defining cross section AA, according to a preferred embodiment of the present invention;

FIG. 7 is a diagrammatic cross-sectional view of cross section AA illustrating the exemplary embodiment of a gate support panel of the Herodotus machine of FIG. 1E and FIG. 4, according to a preferred embodiment of the present invention;

DETAILED DESCRIPTION OF THE INVENTION

Figure 1A:
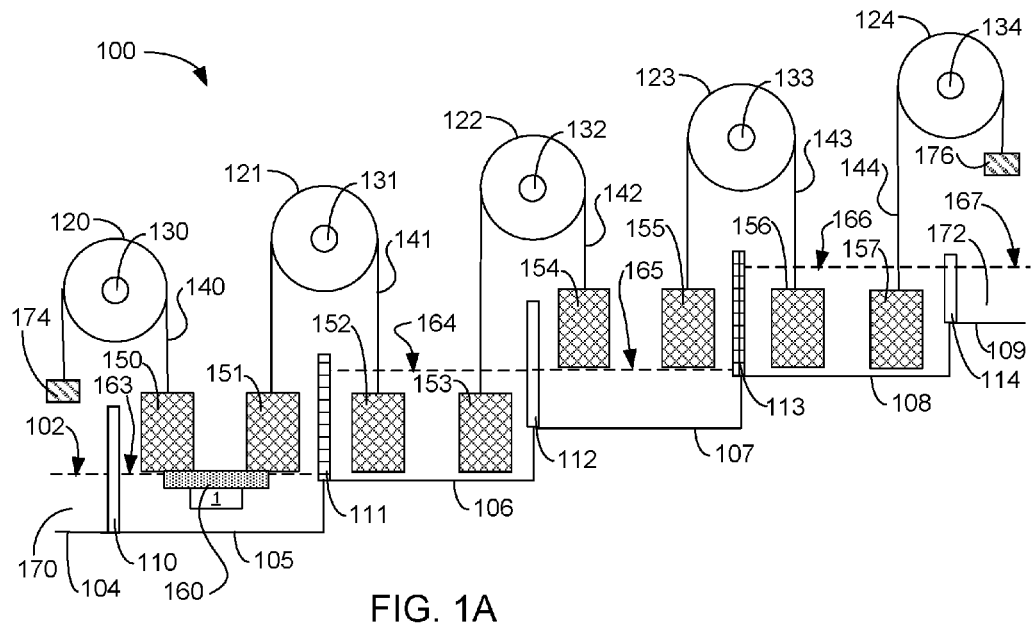
FIG. 1A is a diagrammatic side elevation view illustrating an exemplary embodiment of an Herodotus machine in a first position, according to a preferred embodiment of the present invention.

Identical reference numbers refer to similar parts throughout this specification and drawings. Generally, the hundreds digit(s) indicate the figure number of the figure in which the reference number was first used. The exception to the rule is made for the building stones being carried as cargo, which use single-digit numbers. The drawings are not to scale, unless specifically identified as such. A "reciprocating gear" as used and defined herein is a gear that is designed to rotate about an axle in a first direction and then rotate back in the second direction. The term "cross-gate displacers" as used and defined herein is two displacers, or one displacer and a counterweight, one on a downstream side of a gate and the other on an upstream side of that gate, both connected to a synchronizing device such that when one displacer lowers, the other rises, and vice versa. As used and defined herein, "downstream" refers to an object associated with a lower lock and "upstream" refers to an object associated with an upper lock. As used and defined herein, "floating body" means anything with positive buoyancy (boats, barges, etc.) or neutral buoyancy (submarine vehicles and fish). As used and defined herein, "rack" means a straight member with a linear array of gear teeth for engaging a circular or semi-circular gear.

The specification, claims, and drawings herein are Copyright Keith L. Jenkins 2017. Public license is hereby granted only for ordinary patent purposes.

The present inventor presents novel conclusions regarding Kunkel here. The charring on the surfaces of the Grand Gallery are the result of the ancient process of removing thin gold cladding from surfaces. The thin gold cladding is wicked away from the stone surface using a heated copper wire wick, supported on the pairs of opposed arcuate transverse extensions on the spout of the oil lamp and using raw frankincense as a gold working flux. The opposed arcuate extensions are located slightly to one side of center of the top of the spout to enable small heater lamps along the spout to heat the wick. A fabric wick within the spout conducts oil to the tip of the spout to assist in heating the wick. The raw frankincense is applied to the gold that is to be wicked, the hot wick is applied to the gold to melt it, and the raw frankincense flows with the molten gold through the hot copper wire wick. The wires of the wick have small diameters to create tiny capillaries in the wick to compete with the capillary action of the pores of the limestone. The small oil lamps on the spout and the oil lamp flame at the end of the spout keep the long copper wire wick hotter than the melting point of gold and cooler than the melting point of copper, a difference of about twenty degrees Centigrade. The flames of the heaters for the wire wick do not contact the wire wick: the oil lamp flame at the end of the spout heats an extended portion of the wire wick, without direct flame contact. Operation of this device required some art and practice. The copper wire wick leads down along the spout to a collection bowl, where molten gold and frankincense are deposited and cooled. The heavier gold sinks to the bottom of the collection cup and the liquefied frankincense puddles on top of the gold. Acids in the raw frankincense dissolve away copper oxides on the surfaces of the copper wires, which mix with the gold. One odd result is that recycled Egyptian gold is found with discreet equally spaced increments of copper content. Conventionally believed to be gold from separate mines, the present inventor concludes that the discrete equally spaced increments indicate the number of times that the gold has been recycled, each recycling adding another discrete increment of copper to the gold from the copper oxides and from scraping the wire wick over stones.

The expanse of the thin gold cladding, used to make the floor and lower walls of the Grand Gallery watertight, is large enough to create a heat transfer problem for gold recyclers. The heat from the wire wick heated with an oil lamp (i.e., "torch") would dissipate rapidly throughout the large expanse of the gold cladding, making the gold difficult, if not impossible, to melt. The ancient solution was to scratch through the thin gold cladding to create a boundary around a small area, thus breaking the continuity of the heat transfer path. As evidence, an easy boundary to scratch is roughly a square and, because neatness is not important in a salvage operation, these squares appear as tic-tac-toe scratches on the stone walls of the Grand Gallery. With the continuity of the heat transfer path destroyed, the heat from the heated wire wick remained in the small area and melted the gold therein. Some of the frankincense used as a flux for removing the gold would remain in the pores of the limestone and decompose over the centuries. The wooden gears were clad with gold to prevent tiny aquatic organisms, common to the Nile, from eating the wood. The wooden gears were also later wicked for their gold cladding, leaving the gears charred. Accordingly, Kunkel's proposition is not supported.

The ancient Egyptians used standardized measurements for building stones, timbers, liquid measures, grain measures, and the like. The present inventor concludes that the "short timbers" reported by Herodotus are any pieces of timber cut to less than a standardized length.

A number of Herodotus machines using leverage have been proposed, but none of them account for the gears, nor have they achieved widespread acceptance. Ramp theories have been perennially popular, but are not feasible from an engineering perspective, do not comport with the report of Herodotus, and do not explain the charred gears. Theories that include pulling stones up the sloping sides of the pyramid have been proposed. However, such methods are much more work than using the present invention, and do not explain the charred gears.

FIG. 1A is a diagrammatic side elevation view illustrating an exemplary embodiment of an Herodotus machine 100 in a first position, according to a preferred embodiment of the present invention. Herodotus machine 100 is a sequence of ascending adjacent step locks 105, 106, 107, and 108 that can transfer a floating body from a lower source of water 170 to an upper reservoir 172. A source of water 170, such as a river or a lake, has a substantially constant water level 102 above a floor 104 that supports a gate 110. Gate 110 is similar to gates 111, 112, 113, and 114 and is discussed in more detail in regard to FIGS. 4-7. As a diagrammatic convention for FIGS. 1A-1I, closed gates, such as non-neighboring gates 111 and 113 in FIG. 1A, are cross hatched; and open non-neighboring gates, such as gate 110, 112, and 114 in FIG. 1A are shown without cross hatching. The Herodotus machine 100 is shown with four locks 105, 106, 107, and 108, leading to an upper reservoir 172 supported by floor 109 and having a water level 167. In various other embodiments, there may be more or fewer locks 105-108. Above and aligned and parallel to gate 110 is reciprocating gear axle 130 on which reciprocating gear 120 is mounted. The rope chains 140, 141, 142, 143, and 144 are engaged with, and supported by, reciprocating gears 120, 121, 122, 123, and 124, respectively, with each rope chain 140-144 having two opposed ends (a downstream end and an upstream end) extending below each respective reciprocating gear 120-124. Rope chains 140-144, 202 (see FIG. 2), 441, 442, 443 (see FIG. 4), 1406 (see FIG. 14), 1506 (see FIG. 15), and 1606 (see FIG. 16) may be made according to the FIGS. 130 and 131 in "The Encyclopedia of Knots and Fancy Rope Work", plate 250 and instructions on page 460, which shows a rope ladder, made completely of rope, that the present inventor concluded can be adapted and extended to form a rope chain 140-144 for engaging reciprocating gears 120-124, and is consistent with the remains of the oddly knotted ropes once in the possession of the Egyptian Museum in Cairo, Egypt, cataloged as being from the Grand Gallery of the Great Pyramid at Giza.

A reciprocating cross-gate displacer device includes a reciprocating gear 120, 121, 122, 123, or 124, a rope chain 140, 141, 142, 143, or 144, respectively, and displacers or counterweights 174 and 150, 151 and 152, 153 and 154, 155 and 156, or 157 and 176, respectively, by pairs, on respective downstream and upstream ends of said rope chains 140, 141, 142, 143, or 144. Reciprocating gears 120-124 synchronize the motion of each respective pair of displacers 151 and 152, 153 and 154, 155 and 156, and displacer/counterweight pairs 174 and 150 as well as 157 and 176. On a downstream end of rope chain 140 is a counter weight 174, which is shown at its lowest position, and which does not descend into water source 170. At an upstream end of rope chain 140 is an upstream displacer 150, shown in its raised position above the water level 163 of lock 105. Rope chain 141 supports downstream and upstream displacers 151 and 152, respectively, depending from reciprocating gear 121 mounted on reciprocating gear axle 131. Downstream displacer 151 is shown at its raised position and upstream displacer 152 is shown at its lowered position, raising the water level 164 in lock 106. With the water level 163 in lock 105 being equal to the water level 102 in the water source 170, three-capstan quarry barge 160 (see FIGS. 3A-3C) carrying under-cinched building stone 1 can move through open gate 110 into lock 105.

In some embodiments having an even number of locks 105-108, downstream counterweight 174 and upstream counterweight 176 may be omitted or minimized as, with rope chain 202 (see FIG. 2) connecting all reciprocating gears 120-124, displacers 150 and 157 will counterbalance one another. In such embodiments, rope chain 140 may be attached to reciprocating gear 120 and rope chain 144 may be attached to reciprocating gear 124.

Each gate 110-114, such as gate 111, is in a gate support panel, such as gate support panel 404 (see FIGS. 4 and 6) that has a one-way valve 602 (see FIG. 6) that allows water to flow from a lower lock into the next higher lock when the height of the water in the lower lock is higher than the water in the upper lock. Thus, with upstream and downstream displacers 150 and 151 in their raised positions, water may flow into lock 105 from water source 170. Gate 111, between lock 105 and lock 106, is shown closed to prevent back flow and the water level 163 in lock 105 is lower than the water level 164 in lock 106, such that one-way valve 602 in gate 111 is closed. Rope chain 142 supports downstream and upstream displacers 153 and 154 depending from reciprocating gear 122 mounted on reciprocating gear axle 132. Downstream displacer 153 is shown at its lowered position, raising the water level 164 in lock 106, and upstream displacer 154 is shown at its raised position above water level 165 in lock 107. Downstream displacer 155 is also shown in its raised position above water level 165 in lock 107, making water level 165 in lock 107 equal to water level 164 in lock 106. Gate 112, between locks 106 and 107, is open, such that a watercraft, or floating body of any sort, in lock 106 could be transferred into lock 107. Rope chain 143 supports downstream and upstream displacers 155 and 156 that are depending from reciprocating gear 123 mounted on reciprocating gear axle 133. Downstream displacer 155 is shown at its raised position and upstream displacer 156 is shown at its lowered position, raising the water level 166 in lock 108. Gate 113, between lock 107 and lock 108, is closed to prevent backflow. Rope chain 144 supports downstream displacer 157 and upstream counterweight 176 depending from reciprocating gear 124 mounted on reciprocating gear axle 134. Downstream displacer 157 is shown at its lowered position, raising the water level 166 in lock 108 to the water level 167 of the upper reservoir 172. Gate 114 is shown as open, which would allow a watercraft, such as a three-capstan quarry barge 160, to be moved from lock 108 to upper reservoir 172. Upstream counterweight 176 is shown in its raised position. Upstream counterweight 176 does not descend into upper reservoir 172. Upper reservoir 172 may be, for non-limiting examples, a construction reservoir in the Great Pyramid, a canal (perhaps to an additional step lock system, but also for any purpose), an agricultural reservoir, or other water reservoir having defined boundaries and a nominally constant water level 167. The pair of locks 106 and 107, and the pair of lock 108 and reservoir 109, form the set of first pairs of adjacent locks in which water levels are equal.

The water levels 163-167 are initially established by using the displacers 150-157 for pumping. As discussed above, lock 105 will automatically fill to water level 163 through a one-way valve 602 in gate 110. With all other locks 106-108 empty, rotation of the reciprocating gears 120-124 will raise the water level 163 to a height above the one-way valve 602 associated with gate 111, (see FIG. 1B) causing water to flow from lock 105 to lock 106. By repeating the reciprocating gear rotations, water will also eventually flow into lock 107 and lock 108 and then fill the upper reservoir 172 to water level 167. Once the pumping is complete, normal lifting operations can begin. During normal lifting operations, the amount of water in any lock ideally remains constant, and no further pumping is needed. Realistically, there will be water losses from evaporation and seepage, and the Herodotus machine 100 will automatically pump enough water during lifting operations to make up those minor losses. The motions of the Herodotus machine 100 are the same for pumping and for lifting operations.

While four locks 105-108 are illustrated, the number of locks 105-108 may be increased incrementally by placing lifted building stones to form the walls and floor of the next lock in the construction reservoir and installing a gate, reciprocating gear, rope chain, and displacers. The walls of the construction reservoir would have to be raised, as well. As a practical matter, the height of the step lock sequence is limited by the force that can be applied by the available prime mover to rotate the reciprocating gears 120-124 and move the displacers 150-157. The reciprocating gears 120-124 store potential energy in the raised displacers 150, 151, 154, and 155 which is used to assist in raising the lowered displacers 152, 153, 156, and 157 as reciprocating gears 120-124 rotate. Once in motion, momentum gives the displacers 152, 153, 156, and 157 assistance in changing position.

Note that reciprocating gears 120-124 provide an advantage over levers (teeter-totter style) that might be used to raise and lower displacers about the same reciprocating gear axles 130-134. With levers in place of reciprocating gears 120-124, there would necessarily be sideways motion of the displacers 150-157 when changing position. The energy used in overcoming the resistance of the water to sideways motion would all be wasted. By using reciprocating gears 120-124, the displacers 150-157 move straight up and down, with no energy wasted on sideways motion.

Figure 1B:
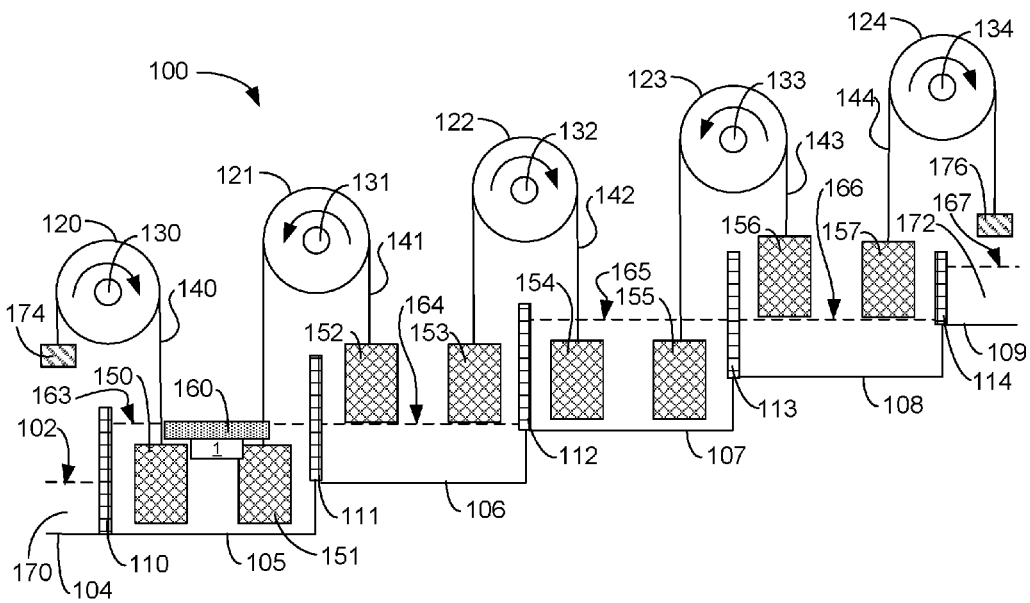
FIG. 1B is a diagrammatic side elevation view illustrating the exemplary embodiment of the Herodotus machine of FIG. 1A in a second position, according to a preferred embodiment of the present invention.

FIG. 1B is a diagrammatic elevation view illustrating the exemplary embodiment of the Herodotus machine 100 of FIG. 1A in a second position, according to a preferred embodiment of the present invention. While the reciprocating gears 120-124 rotate in their first direction (clockwise for non-neighboring reciprocating gears 120, 122, and 124; and counterclockwise for non-neighboring reciprocating gears 121 and 123), all gates 110-114 are closed. The rotational directions that produced the illustrated state are indicated by curved arrows on the reciprocating gears 120-124 here and in FIGS. 1D, 1F, and 1H. Downstream counterweight 174 is shown raised to an upper position and upstream displacer 150 is shown lowered into the water of lock 105 by the same rotation of reciprocating gear 120. Upstream displacer 152 is shown raised above the water level 164 in lock 106 and downstream displacer 151 is shown lowered into the water of lock 105 by the same rotation of reciprocating gear 121. By the changes in positions of displacers upstream and downstream displacers 150 and 151 in lock 105, water level 163 is raised to a highest point and three-capstan quarry barge 160 (like the rubber ducky) rises with the water. Downstream displacer 153 is shown raised above the water level 164 in lock 106 and upstream displacer 154 is shown lowered into the water of lock 107 by the same rotation of reciprocating gear 122. By the changes in positions of upstream and downstream displacers 152 and 153 in lock 106, water level 164 is lowered to its lowest level, which is equal to water level 163 in lock 105. Downstream displacer 155 is shown lowered into the water in lock 107 and upstream displacer 156 is shown raised out of the water of lock 108 by the same rotation of reciprocating gear 123. By the changes in positions of upstream and downstream displacers 154 and 155 in lock 107, water level 165 is raised to the highest level. Downstream displacer 157 is shown raised above the water level 166 in lock 108 and upstream counterweight 176 is shown lowered to the lowest level by the same rotation of reciprocating gear 124. By the changes in positions of upstream and downstream displacers 156 and 157 in lock 108, water level 166 is lowered to its lowest level, which is equal to water level 165 in lock 107. See step 1302 in FIG. 13. Displacers 150-157 are merely exemplary: any size, shape, or collection of displacers 150-157 that is capable of performing the function will serve. The volume of the displacers in any one lock must displace a volume of water equal to the volume of water between the highest water level and the lowest water level. That volume will depend on lock size and the vertical extent of the lift. After the first rotation of the reciprocating gears 120-124, the pair of locks 105 and 106 and the pair of locks 107 and 108 form the second set of pairs of adjacent locks, exclusive of the first set of pairs of adjacent locks, in which water levels are equal.

Figure 1C:
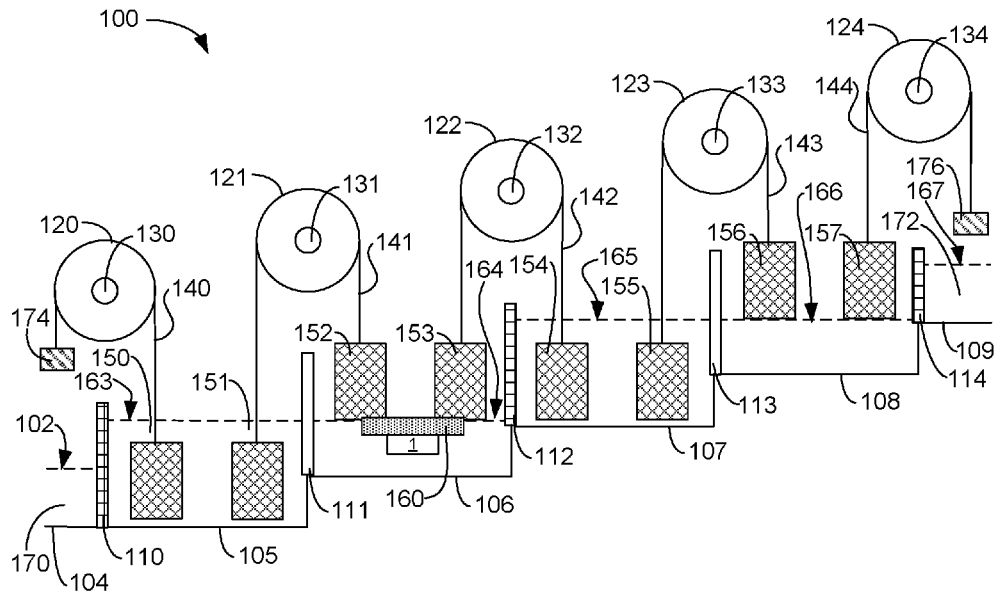
FIG. 1C is a diagrammatic side elevation view illustrating the exemplary embodiment of the Herodotus machine of FIG. 1A in a third position, according to a preferred embodiment of the present invention.

FIG. 1C is a diagrammatic elevation view illustrating the exemplary embodiment of the Herodotus machine 100 of FIG. 1A in a third position, according to a preferred embodiment of the present invention. During a pause (see step 1304 in FIG. 13) in the motion of the reciprocating gears 120-124, the non-neighboring odd-numbered gates 111 and 113 open (see step 1306 in FIG. 13) and three-capstan quarry barge 160 carrying under-cinched building stone 1 is transferred into lock 106 (see step 1308 in FIG. 13). In an embodiment, transfer may be made manually. Preferably, as discussed in more detail below, transfer is mechanized. The pair of locks 105 and 106 and the pair of locks 107 and 108 still form the second set of pairs of adjacent locks, exclusive of the first set of pairs of adjacent locks, in which water levels are equal.

Figure 1D:
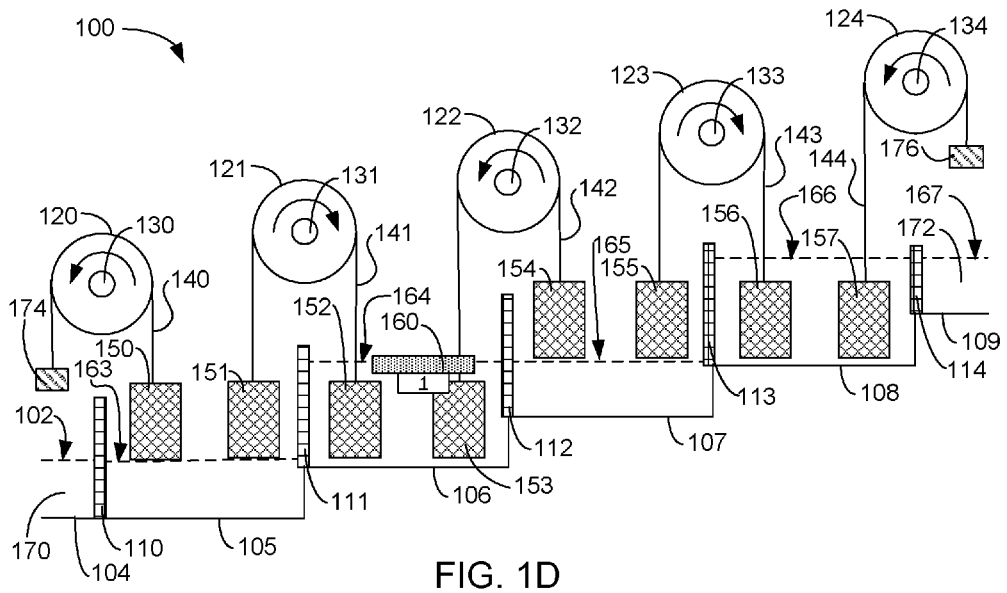
FIG. 1D is a diagrammatic side elevation view illustrating the exemplary embodiment of the Herodotus machine of FIG. 1A in a fourth position, according to a preferred embodiment of the present invention.

FIG. 1D is a diagrammatic elevation view illustrating the exemplary embodiment of the Herodotus machine 100 of FIG. 1A in a fourth position, according to a preferred embodiment of the present invention. With all gates 110-114 closed (see step 1310 in FIG. 13), reciprocating gears 120-124 now rotate (see steps 1312 and 1314 in FIG. 13) in the opposite direction (see curved arrows on reciprocating gears 120-124) of rotation as shown in FIG. 1B. Resulting, via the motions already described, in the water level 164 in lock 106 being raised to a maximum level and three-capstan quarry barge 160 being lifted by the water. Likewise, the water level 165 in lock 107 has been lowered to the water level 164 of lock 106. After the second rotation of the reciprocating gears 120-124, the pair of locks 106 and 107 and the pair of lock 108 and reservoir 109 again form first set of adjacent pairs of locks in which water levels are equal.

Figure 1E:
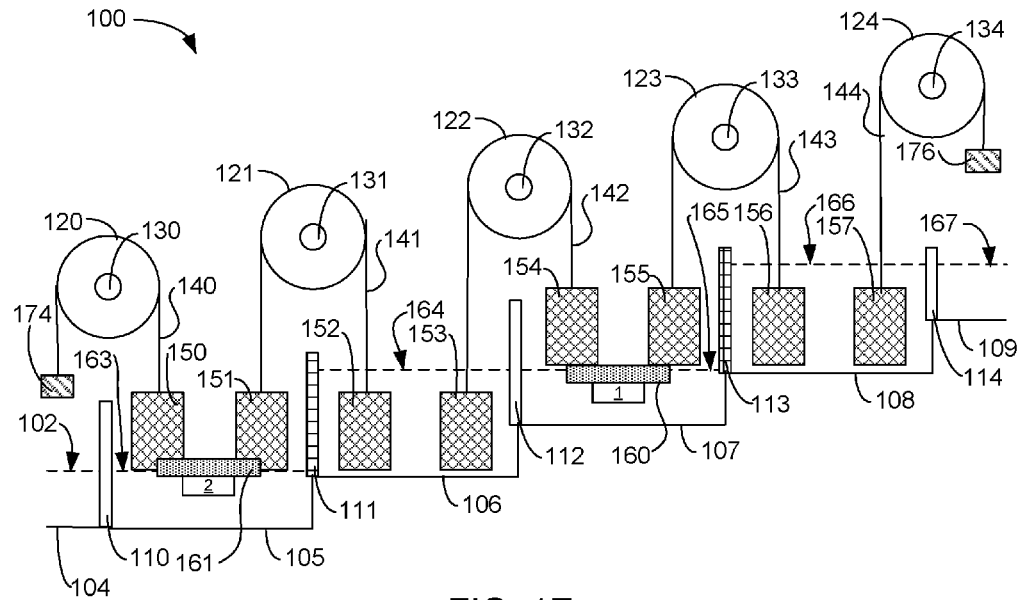
FIG. 1E is a diagrammatic side elevation view illustrating the exemplary embodiment of the Herodotus machine of FIG. 1A in a fifth position, according to a preferred embodiment of the present invention.

FIG. 1E is a diagrammatic elevation view illustrating the exemplary embodiment of the Herodotus machine 100 of FIG. 1A in a fifth position, according to a preferred embodiment of the present invention. During a pause (see step 1316 in FIG. 13) in the rotation of the reciprocating gears 120-124, the non-neighboring even-numbered gates 110, 112, and 114 open (see step 1318 in FIG. 13) and three-capstan quarry barge 160 carrying under-cinched building stone 1 is transferred into lock 107 through gate 112 (see step 1320 in FIG. 13). A second three-capstan quarry barge 161 carrying under-cinched building stone 2 is transferred into lock 105 through gate 110 (see step 1320 in FIG. 13). The pair of locks 106 and 107 and the pair of lock 108 and reservoir 109 still form first set of adjacent pairs of locks in which water levels are equal.

Figure 1F:
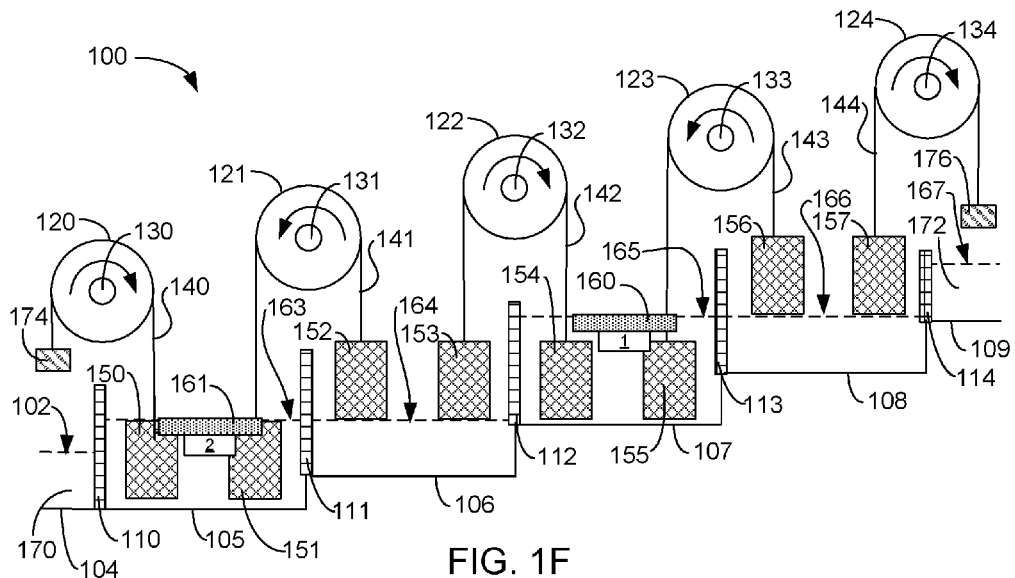
FIG. 1F is a diagrammatic side elevation view illustrating the exemplary embodiment of the Herodotus machine of FIG. 1A in a sixth position, according to a preferred embodiment of the present invention.

FIG. 1F is a diagrammatic elevation view illustrating the exemplary embodiment of the Herodotus machine 100 of FIG. 1A in a sixth position, according to a preferred embodiment of the present invention. With all gates closed (see step 1322 in FIG. 13), the reciprocating gears 120-124 again rotate (see steps 1324 and 1302 in FIG. 13), in the manner described in regard to FIG. 1B, raising three-capstan quarry barge 160 carrying under-cinched building stone 1 in lock 107 and raising second three-capstan quarry barge 161 carrying under-cinched building stone 2 in lock 105. Locks 106 and 108 have water levels 164 and 166, respectively, that are lowered to align with water levels 163 and 165, respectively. After another rotation of the reciprocating gears 120-124, the pair of locks 105 and 106 and the pair of locks 107 and 108 again form the second set of pairs of adjacent locks, exclusive of the first set of pairs of adjacent locks, in which water levels are equal.

Figure 1G:
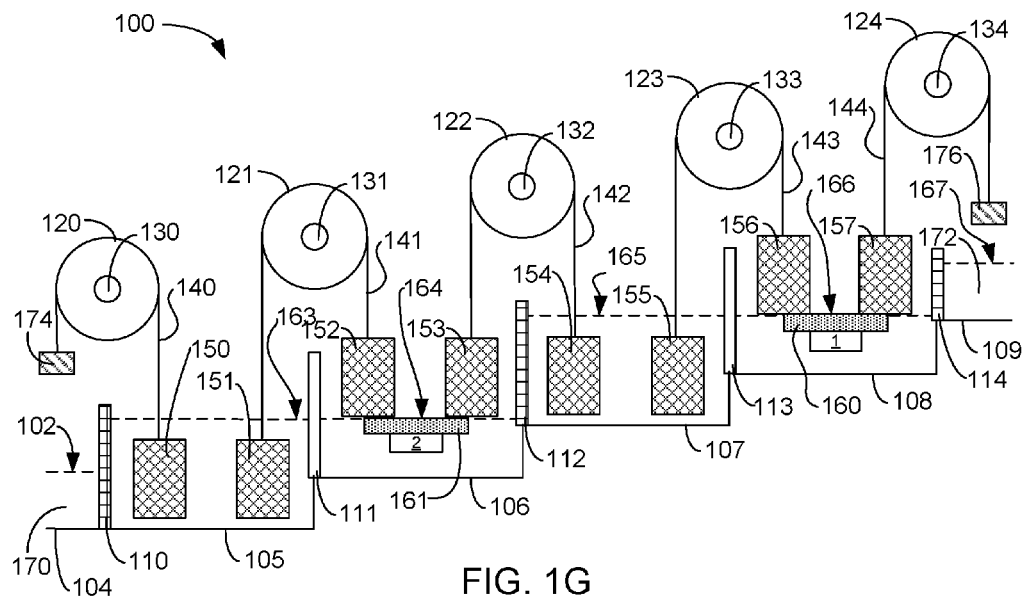
FIG. 1G is a diagrammatic side elevation view illustrating the exemplary embodiment of the Herodotus machine of FIG. 1A in a seventh position, according to a preferred embodiment of the present invention.

FIG. 1G is a diagrammatic elevation view illustrating the exemplary embodiment of the Herodotus machine 100 of FIG. 1A in a seventh position, according to a preferred embodiment of the present invention. During a pause (see step 1304 in FIG. 13) in the motion of the reciprocating gears 120-124, the non-neighboring odd-numbered gates 111 and 113 open (see step 1306 in FIG. 13) and three-capstan quarry barge 160 carrying under-cinched building stone 1 is transferred into lock 108 through gate 113 (see step 1308 in FIG. 13). Second three-capstan quarry barge 161 carrying under-cinched building stone 2 is transferred into lock 106 through gate 111 (see step 1308 in FIG. 13). The pair of locks 105 and 106, and the pair of locks 107 and 108 still form the second set of pairs of adjacent locks, exclusive of the first set of pairs of adjacent locks, in which water levels are equal.

Figure 1H:
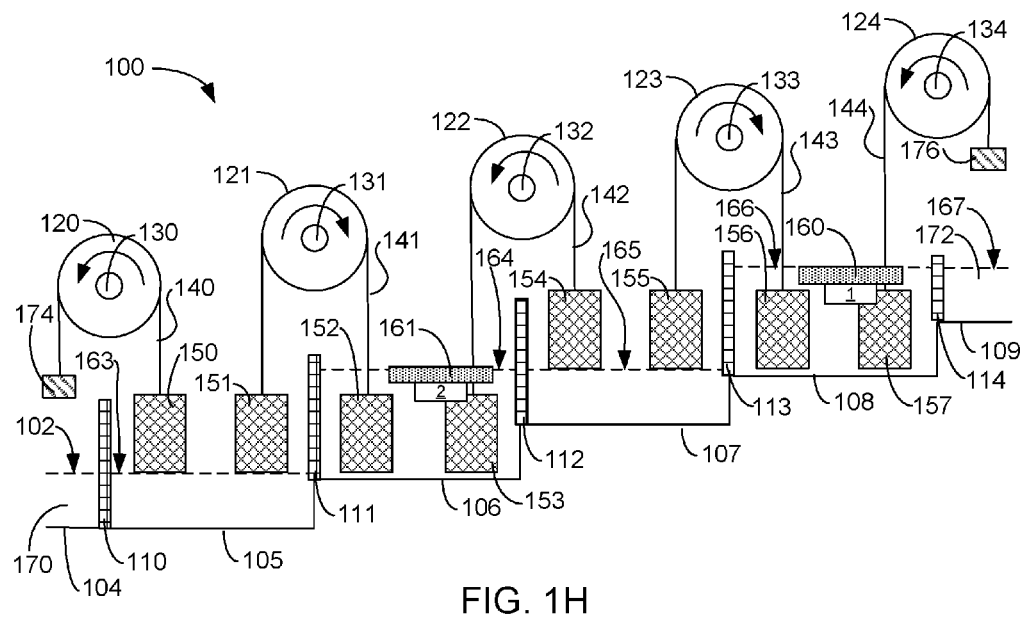
FIG. 1H is a diagrammatic side elevation view illustrating the exemplary embodiment of the Herodotus machine of FIG. 1A in a eighth position, according to a preferred embodiment of the present invention.

FIG. 1H is a diagrammatic elevation view illustrating the exemplary embodiment of the Herodotus machine 100 of FIG. 1A in an eighth position, according to a preferred embodiment of the present invention. After all gates 110-114 are closed (see step 1310 in FIG. 13), non-neighboring even-numbered reciprocating gears 120, 122, and 124 rotate (see steps 1312 and 1314 in FIG. 13) counterclockwise and non-neighboring odd-numbered reciprocating gears 121 and 123 rotate clockwise, as in FIG. 1D. As a result, the water level 166 in lock 108 is raised to the level 167 of upper reservoir 172 and three-capstan quarry barge 160 carrying under-cinched building stone 1 rises with the water. The water level 164 in lock 106 rises to the water level 165 of lock 107, and second three-capstan quarry barge 161 carrying under-cinched building stone 2 rises to the water level 165 of lock 107. While the diagram of the floors of the locks 105-108 are shown as horizontal and flat for clarity of the drawing, in the most preferred embodiment the floors of the locks 105-108 are one continuous incline (see FIGS. 6, 7 and 23), with appropriate adaptive reconfiguration of the displacers 150-157. After this additional second rotation of the reciprocating gears 120-124, the pair of locks 106 and 107, and the pair of lock 108 and reservoir 109, again form first set of adjacent pairs of locks in which water levels are equal.

Figure 1I:
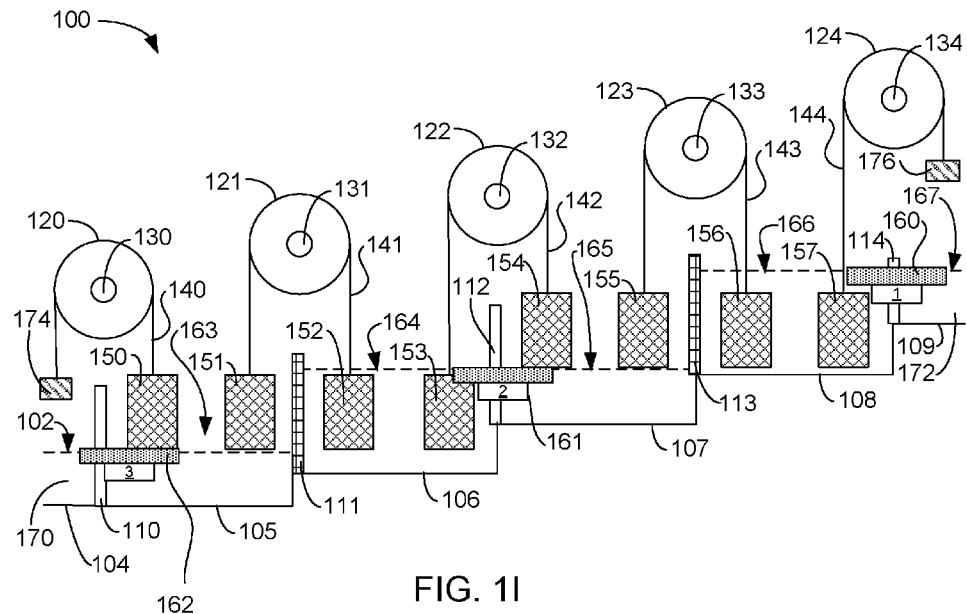
FIG. 1I is a diagrammatic side elevation view illustrating the exemplary embodiment of the Herodotus machine of FIG. 1A in a ninth position, according to a preferred embodiment of the present invention.

FIG. 1I is a diagrammatic elevation view illustrating the exemplary embodiment of the Herodotus machine 100 of FIG. 1A in a ninth position, according to a preferred embodiment of the present invention. During a pause (see step 1316 in FIG. 13) in the rotation of the reciprocating gears 120-124, the non-neighboring even-numbered gates 110, 112, and 114 open (see step 1318 in FIG. 13), and three-capstan quarry barge 160 carrying under-cinched building stone 1 is transferred into upper reservoir 172 through gate 114 (see step 1320 in FIG. 13). The second three-capstan quarry barge 161 carrying under-cinched building stone 2 is transferred into lock 107 through gate 112 (see step 1320 in FIG. 13). The third three-capstan quarry barge 162 carrying under-cinched building stone 3 is transferred into lock 105 through gate 110 (see step 1320 in FIG. 13). The pair of locks 106 and 107 and the pair of lock 108 and reservoir 109 still form the first set of adjacent pairs of locks in which water levels are equal.

While displacers 150-157 are shown as being sometimes submerged, that is not a limitation of the invention. The displacers 150-157 are designed to weigh just enough to descend into the water without tipping. A leading candidate for the displacers 150-157 are similar to the two large jars found in the Queen's chamber of the Great Pyramid that have weights built into their bases and which scientific analysis by others has shown were never used to contain anything. The present inventor's novel conclusion is that such jars where intended to be lowered into water on a flexible member (rope) without tipping and without taking in any water. Versions of such jars, scaled to the Grand Gallery, would serve as displacers 150-157.

Figure 2:
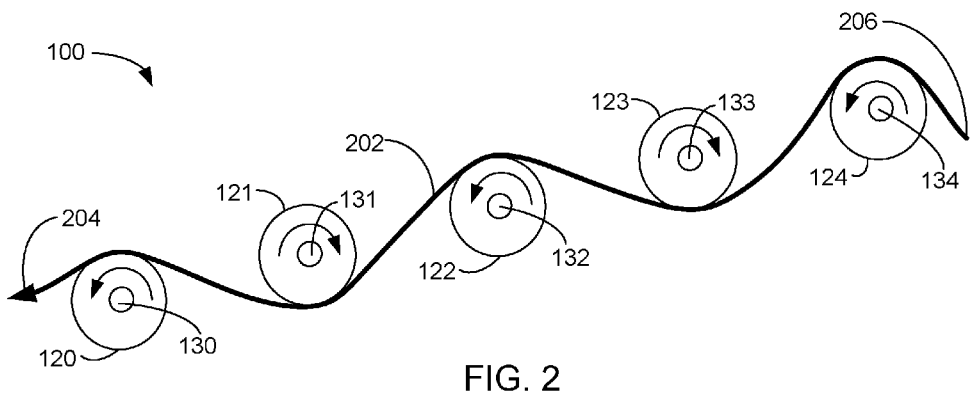
FIG. 2 is a diagrammatic side elevation view illustrating an exemplary embodiment of reciprocating gears of the exemplary embodiment of the Herodotus machine of FIG. 1A, according to a preferred embodiment of the present invention.

FIG. 2 is a side elevation diagrammatic view illustrating the exemplary embodiment of reciprocating gears 120-124 of the exemplary embodiment of the Herodotus machine 100 of FIG. 1A, according to a preferred embodiment of the present invention. One approach to synchronizing the reciprocating gears 120-124 is to use a rope chain 202 as a synchronization apparatus engaging a second set of teeth (i.e. sandwiched drive gears) on the reciprocating gears 120-124. Drive rope chain 202 first end 204 is connected to a reciprocating drive (see FIGS. 12A-12H) and second end 206 is attached to a counterweight (not shown). In another embodiment, the synchronizing apparatus may be the reciprocating gears 120-124 synchronized by meshing the second set of teeth directly to neighboring gears.

Figure 3A:
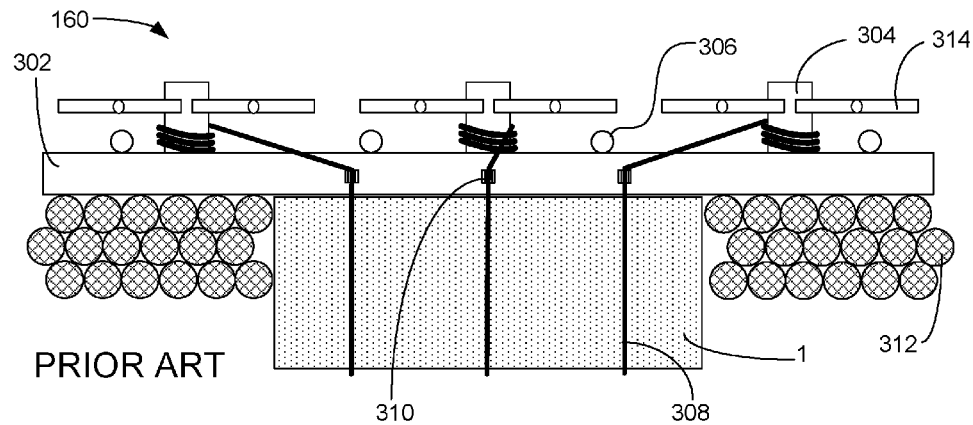
FIG. 3A is a diagrammatic side elevation view illustrating an exemplary embodiment of a three-capstan quarry barge with an under-cinched stone cargo, used with the Herodotus machine according to a preferred embodiment of the present invention.
Figure 3B:
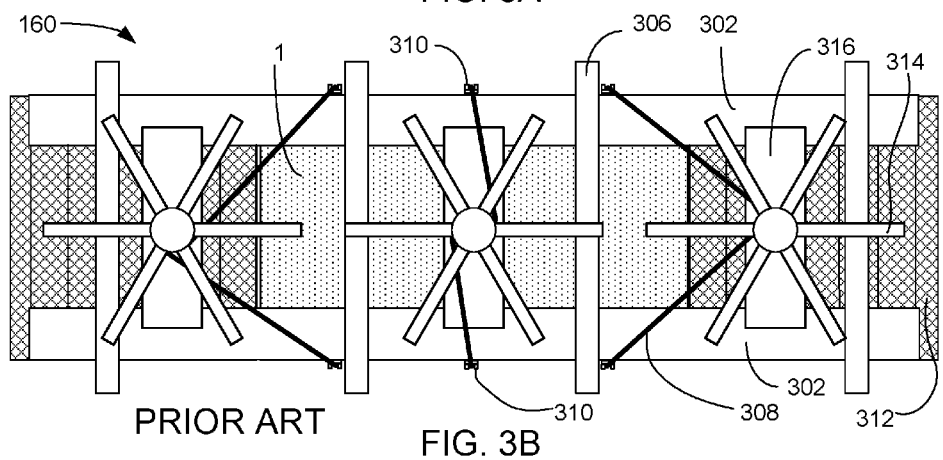
FIG. 3B is a diagrammatic top view illustrating the exemplary embodiment of a three-capstan quarry barge with the under-cinched stone cargo of FIG. 3A, according to a preferred embodiment of the present invention.
Figure 3C:
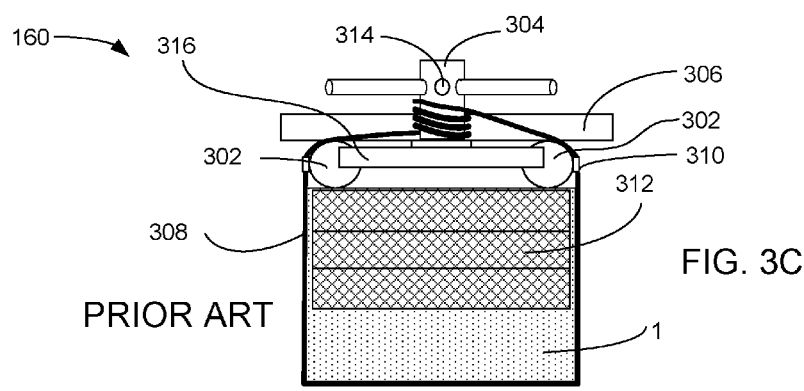
FIG. 3C is a diagrammatic end elevation view illustrating an exemplary embodiment of the three-capstan quarry barge with the under-cinched stone cargo of FIG. 3A, according to a preferred embodiment of the present invention.

FIG. 3A is a diagrammatic side elevation view illustrating an exemplary embodiment of a three-capstan quarry barge 160 with an under-cinched stone 1 cargo, used with the Herodotus machine 100, according to a preferred embodiment of the present invention. The present inventor's novel conclusion is that the three hub and spoke artifact from the above-mentioned photograph is a three-capstan quarry barge 160. The three-capstan quarry barge 160 is important to the use of the Herodotus machine 100, as will be discussed in more detail below. FIGS. 3A-3C are labeled as prior art because the present inventor taught this three-capstan quarry barge 160 in a college physics class lesson on buoyancy years ago. At that time, the detailed calculations were made showing that a two-and-one-half-ton block of Tura limestone could easily be floated using the three-capstan quarry barge 160.

The three-capstan quarry barge 160 includes two parallel spaced-apart operationally horizontal wooden beams 302 connected by three flat, parallel, spaced-apart, transverse wooden cross members 316 (see FIG. 3B, one of three labeled). Each transverse wooden cross member 316 supports a wooden capstan 304 (one of three labeled) and each wooden capstan 304 has a plurality of wooden spokes 314 (one of eighteen labeled) and a ratchet (not shown). The number of wooden spokes 314 may vary in various embodiments. Four additional transverse parallel wooden members 306 (one of four labeled) are releasably attached to wooden beams 302 and extend outboard of wooden beams 302. The function of transverse parallel wooden members 306 is to aid in manually pushing the three-capstan quarry barge 160. Transverse parallel wooden members 306 can be removed to allow passage though narrow channels. The three-capstan quarry barge 160 is scalable up to the largest stones used in building the Great Pyramid, but not all of those stones can fit through the Grand Gallery.

In operation, a building stone 1 (i.e., Tura limestone) is cut from a wall in a quarry, coated with an oil (anointed) from a biological source, and pushed off the wall into three to four feet of water in the bottom of the quarry. The coating of oil on the stone 1 provides a temporary water resistant barrier to prevent infiltration of water into the pores of the stone 1, where such infiltration would increase the weight of the stone 1. The water in the bottom of the quarry cushions the fall of the stone 1. By virtue of being under water, the law of buoyancy acts on the stone 1 to reduce its net weight by about thirty-seven percent. This reduces the amount of flotation that the three-capstan quarry barge 160 must supply. The stone quarry has an array of parallel grooves cut into its stone floor, and the stone 1 is manually oriented, using pry bars, so that its long sides are perpendicular to the grooves. The three-capstan quarry barge 160 is floated above and aligned to the stone 1. A long thin flexible stick is then passed under stone 1 in one of the floor grooves and a first end of the rope 308 (one of three labeled) is manually attached to an end of the stick. The stick is then withdrawn, pulling the first end of the rope 308 through the groove under the stone 1. First and second ends of rope 308 are then guided through rope guides 310 (one of six labeled) on opposite sides of the three-capstan quarry barge 160 and attached to wooden capstan 304. Two other ropes 308 are routed and attached to the remaining two wooden capstans 304, respectively, in a similar manner. The wooden capstans 304 are then manually turned to wind up ropes 308 and thereby cinch stone 1 under three-capstan quarry barge 160. Short logs 312 (one of thirty-six labeled) are lashed at their ends to the wooden beams 302 and/or to each other until the three-capstan quarry barge 160, carrying stone 1, floats. The number of short logs 312 illustrated is not a limitation of the method. The number of short logs 312 is determined by the mass of the stone 1. In some circumstances, some short logs 312 may be lashed to the three-capstan quarry barge 160 before loading the stone 1. When a desired number of three-capstan quarry barges have been loaded, the quarry is flooded to raise the barges to river level, and all are moved through a canal to the river for transportation to the building site. Three-capstan quarry barges 161 and 162 (see FIG. 1H) are similar to three-capstan quarry barge 160.

The advantages of the three-capstan quarry barge 160 over Kunkel's top-loaded barge include roll stability and pitch stability in a much smaller barge. Kunkel's barges had to be made wider and longer than floatation required for pitch and roll stability. Also, Kunkel's barge had to lift the entire weight of the stone, as Kunkel's top-loaded stone did not have water buoyant forces acting directly on the stone. Just for lift alone, the three-capstan quarry barge 160 needs thirty-seven percent less wood (flotation) than Kunkel's top-loaded barge. Additionally, the three-capstan quarry barge 160 needs to be no wider than the stone 1 plus twice the width of the ropes 308, enabling narrower canals and channels for transporting the stone 1. Narrower channels, in turn, require less water to supply to the channels. In particular, it enables the use of the Grand Gallery to be used as a foundation for the Herodotus machine 100 (see FIGS. 19, 20, 21 and 24). Another advantage is that stone 1 is kept in the three-capstan quarry barge 160 from quarry to preliminary placement in the upper (construction) reservoir 172. Once the stone 1 is positioned on the floor 109 of the construction reservoir 172, the ropes 308 are cut at the bottom sides of the stone 1, and fine positioning is accomplished manually, with long pry bars. In a modern archaeological dig, a large stone was moved from its place in the Great Pyramid and three generally transverse sections of rope were found between the stones. It was suggested in the article describing the find that the ropes had been used as a lubricant.

Three capstans on the quarry barge, three ropes beneath the stones.
   Six million standard tons of rock,
   to guard the Pharaoh's bones.
   No hoard of slaves to lift and haul,
   'neath fear of whip and slaughter:
   the ancients never broke a sweat
   when lifting stones with water.

FIG. 3B is a diagrammatic top view illustrating the exemplary embodiment of a three-capstan quarry barge 160 with the under-cinched stone 1 cargo of FIG. 3A, according to a preferred embodiment of the present invention. The top view shows more details of the ropes 308 routings. The three-capstan quarry barge 160 is most likely the "door-shaped crate" that Herodotus wrote about that was used for carrying stones, towed behind a boat, for the building of the Great Pyramid. Stones 1 of varying sizes and weights can be carried by the three-capstan quarry barge 160 with adjustment to the number of short logs 312 responsive to the weight of the particular stone 1. Various sizes of three-capstan quarry barges 160 and 2160 may be made.

FIG. 3C is a diagrammatic end elevation view illustrating an exemplary embodiment of the three-capstan quarry barge 160 with the under-cinched stone 1 cargo of FIG. 3A, according to a preferred embodiment of the present invention. In a particular embodiment, short logs 312 may be arranged in a triangular array to form a more hydrodynamic front end. In a preferred embodiment, stone 1 may oriented with the narrow sides at the top and bottom to allow additional space for the displacers 150-157 (see FIG. 21).

FIG. 4 is a diagrammatic top view illustrating an exemplary portion of a second embodiment of an Herodotus machine 400, an extension of the Herodotus machine 100 of FIG. 1C, according to a preferred embodiment of the present invention. Opposing spaced-apart walls 402 and 403 form canal 407 and are preferably water tight, such as limestone walls 402 and 403 with a thin cladding of gold. Gate support panel 404 supports gate 111, which is shown as open. Gate support panel 404 is also used in Herodotus machine 100. The essential difference of the Herodotus machine 400 are the dual-side displacers 151-155 on one side and displacers 451-455 on the opposite side. The three-capstan quarry barge 160 with an under-cinched stone 1 cargo has moved thru gate 111 into lock 106. Reciprocating gears 121, 122, and a portion of reciprocating gear 123 are shown on a first side and mirror image reciprocating gears 421, 422, and a portion of 423 are shown on a second side of locks 105, 106, and 107, respectively. Mirror image reciprocating gears 421, 422, and 423 support and engage rope chains 441, 442, and 443, respectively. Displacers 151-155 are shown near wall 402 and displacers 451, 452, 453, 454, and 455 are shown near wall 403. Displacers 451 and 452 depend from rope chain 441. Displacers 453 and 454 depend from rope chain 442. Displacer 455 depends from rope chain 443. The illustrated embodiment has reciprocating gear axles 131 and 132 crossing from wall 402 to opposing wall 403, but not completely shown in this view in order to better see the gate support panel 404 and gate 111. In this embodiment, the reciprocating drive gears would be on the reciprocating gear axles 131 and 132 (see FIG. 24). The gate 111 and gate support panel 404 are clad with a thin layer of gold, primarily to protect the wood of which they are made and to make them water proof. The gate 111 and gate support panel 404 are slightly arcuate and convex to the next upper lock 106. The pressure exerted by high water level 164 (see FIG. 1D) presses against the gate 111, when closed, and the gate support panel 404. Pressure against the convex side presses the panel sides 508 and 510 (see FIG. 5) of the gate support panel against the walls 403 and 402, respectively. This creates a gold-to-gold water tight seal between gate support panel 404 sides 508 and 510 (see FIG. 5) and gold-clad walls 402 and 403, respectively. The closure surfaces between the gate 111 and the gate support panel 404 preferably use gold-clad double step seals to ensure the gate 111 and gate support panel 404 are watertight when closed. Gate 111 opens into lock 106 via pivot 405, driven by means to be discussed below. Note that the double step seals are designed such that water pressure against the convex side of the gate 111 presses the seals closed. All gate support panels 404 and 504 (see FIG. 5), etc., and gates 110-114 are similarly configured. Gate support panels 404 and 504 may be of various designs in various embodiments, from a simple framework supporting a pivot and a gate to a mechanized panel. The embodiments of gate support panels 404 and 504 described herein are merely exemplary. Additional types of gate support panels 404 and 504 that perform the described function are within the scope of the present invention.

While the reciprocating gear axles 131 and 132 are shown extending directly from walls 402 and 403 but, as a practical matter, are mounted in wooden frameworks supported against each wall 402 and 403, with bracing between opposed frameworks.

FIG. 5 is a diagrammatic top view illustrating an exemplary embodiment of a portion of the Herodotus machine 100 of FIG. 1E, according to a preferred embodiment of the present invention. Gate support panel 504 is shown with pivot 406 and supported gate 112 open. Gate 111 is shown closed (see FIG. 1E). Gold-clad sides 508 and 510 of gate panel 404 are pressed against gold-clad walls 403 and 402, respectively, by water pressure from lock 106. In various embodiments, the gate pivots 405 and 406 may be closer to wall 403 and/or gates 111 and 112 may be wider.

In another preferred embodiment, gates 110-114 are exemplified as double doors, with gate actuators 1400 (see FIG. 14) and 1600 (see FIG. 16) operating in the same way, but with a mechanical linkage (such as rope chain) from the first (driven) door to a door control gear, similar to a mirror image of gate control gear 1412, on the second door. The advantage of using double doors is that gates 110-114 extend a shorter distance into the lock 107 and less energy is used to open them.

In yet another preferred embodiment, gates 110-114 are exemplified as vertical lift gates and are synchronized to operate in the same time period but with a mechanical linkage modified for lifting. One advantage of vertical lift gates is that no allowance for swinging gates needs to be made in determining the length of a lock 105-108. Reducing lock size has the advantage of requiring less displacement for a given lift height and, therefore, smaller and lighter weight displacers 150-157, requiring less energy to move them. Another advantage of vertical lift gates is avoidance of interference between gates 110-114 and displacers 150-157. The cost of these two advantages is an increase in energy needed to open the vertical lift gates and decreased watertight sealing capability of the closed vertical lift gates. Counterweights can ameliorate the energy cost but biasing mechanisms have to be added to solve the watertight sealing problem.

The three embodiments of gates 110-114 described above are merely exemplary. Additional types of gates 110-114 that perform the described function are within the scope of the present invention.

FIG. 6 is a diagrammatic elevation view illustrating an exemplary embodiment of a gate support panel 404 of the Herodotus machine 100 of FIG. 1E, FIG. 4, and FIG. 5, and defining cross section AA, according to a preferred embodiment of the present invention. Gate support panel 404 is shown mounted in a canal 407, such as the Grand Gallery of the Great Pyramid, with centrally aligned channel 608 with lock floors 624. The gold-clad gate support panel 404 fits between, and seals to, gold-clad walls 402 and 403. Gate support panel 404 has feet 626 and 628 that fit into spaced-apart and aligned vertical sockets 612 and 614, respectively, in the stone shoulders 606 and 604, respectively. One-way valve 602 allows flow into the upper lock 106 when water in lower lock 105 is higher than the water in lock 106. The diagram is not to scale, and the location of the one-way valve 602 may vary among various embodiments, with the understanding that, the lower the one-way valve 602 is located on the gate support panel 404 or gate 111, the faster the initial pumping of the locks will proceed, all other factors being equal. In some embodiments, gate 111 may extend almost to lock floor 624 or stone shoulders 604 and 606, and the one-way valve 602 may be located on the gate 111. Gate 111 is supported in gate support panel 404 and, when closed, seals to gate support panel 404. Optional braces 616 and 618 extending out of hewn slots 620 and 622, respectively, may abut a portion of the gate support panel 404 near vertical sockets 614 and 612. Those of skill in art, enlightened by the present disclosure, will appreciate the minor modifications needed to adapt gate support panel 404 for use in a step lock system with flat lock floors. Gate support panel 404 is merely exemplary. Other designs of gate support panel 404 that perform the necessary function are within the scope of the present invention.

FIG. 7 is a diagrammatic cross-sectional view of cross section AA illustrating the exemplary embodiment of the gate support panel 404 of the Herodotus machine 100 of FIG. 1E and FIG. 4, according to a preferred embodiment of the present invention. The shape of vertical socket 612 can be more clearly seen. The angle α of the bottom of the vertical socket 612 is preferably equal to the incline of the lock floor 624 and the incline of the stone shoulders 604 and 606. Brace 618 can be seen in abutment with gate support panel 404. One-way valve 602 is further illustrated as a flapper valve 602 having flapper 702.

Figure 8A:
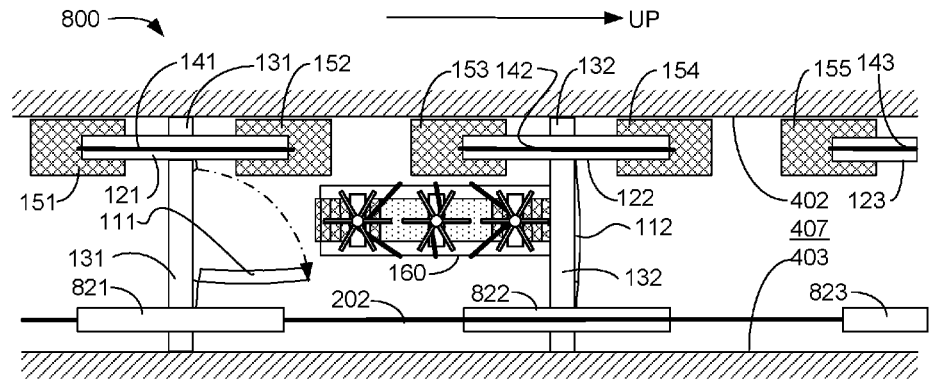
FIG. 8A is a diagrammatic top view illustrating a third exemplary embodiment of an Herodotus machine, an extension of the Herodotus machine of FIG. 1E and the Herodotus machine of FIG. 4, according to a preferred embodiment of the present invention.

FIG. 8A is a diagrammatic top view illustrating a third exemplary embodiment of an Herodotus machine 800, an extension of the Herodotus machine 100 of FIG. 1E and the Herodotus machine 400 of FIG. 4, according to a preferred embodiment of the present invention. Herodotus machine 800 is shown with displacers 151-155 near wall 402 and reciprocating drive gears 821 and 822 near wall 403 on reciprocating gear axles 131 and 132, respectively. Drive rope chain 202 turns reciprocating drive gears 821-823 to rotate reciprocating gear axles 131, 132, and 133 (not visible in this view) to drive reciprocating gears 121, 122, and 123.

Figure 8B:
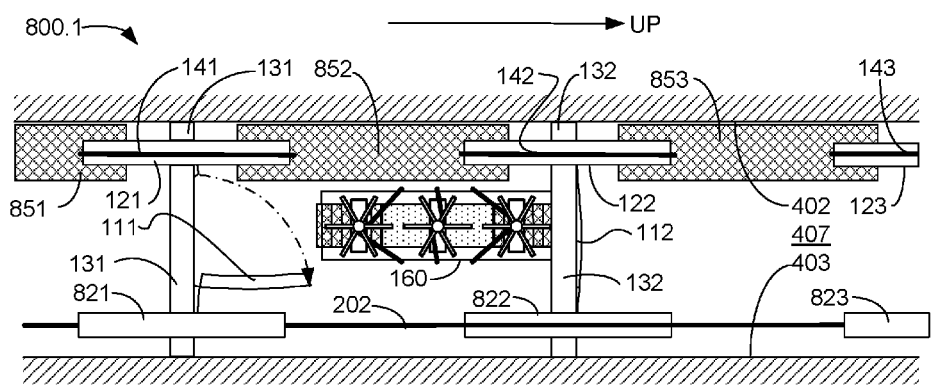
FIG. 8B is a diagrammatic top plan view illustrating a fourth exemplary embodiment of the Herodotus machine similar to FIG. 8A, according to a preferred embodiment of the present invention.

FIG. 8B is a diagrammatic top view illustrating a fourth exemplary embodiment of the Herodotus machine 800.1, similar to FIG. 8A, according to a preferred embodiment of the present invention. Displacers 152 and 153 have been replaced by a single large displacer 852. Because displacers 152 and 153 move in unison due to synchronization of the reciprocating gears 121 and 122, having one larger displacer is possible. In a particular embodiment, the large displacers 851, 852, and 853 may be an array of displacers, such as a series of jars with weighted bottoms supported between two parallel poles. Large displacer 853 replaces displacers 154 and 155. Large displacer 851 replaces displacers 151 and 150 (not visible in this view). Large displacers 851-853 are moved in the same way as in Herodotus machine 800. In a particular embodiment, drive gears, such as 821 and 822 may be in the middle of reciprocating gear axles 131 and 132, respectively. In some embodiments, a hybrid of Herodotus machines 400 (dual side displacers) 800 (separate drive gear) and 800.1 (single displacer between gates) can be made as dual-side single displacers with a separate drive gear (see FIGS. 23 and 24).

Figure 8C:
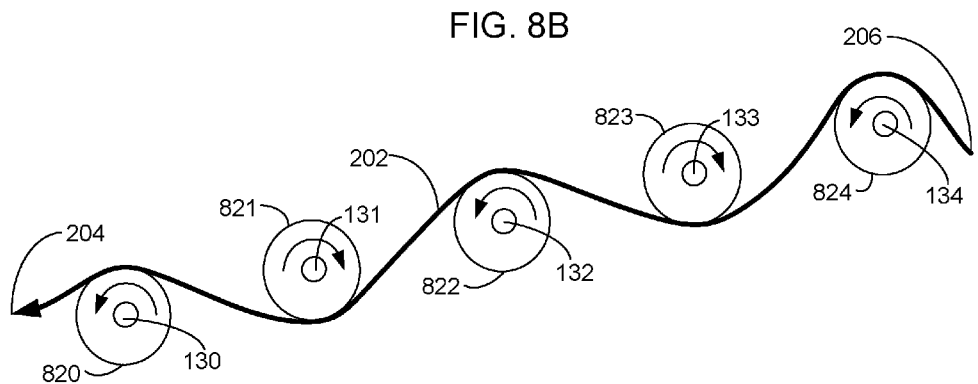
FIG. 8C is a diagrammatic side elevation view illustrating the exemplary embodiment of reciprocating gears of the Herodotus machine of FIG. 8B, according to a preferred embodiment of the present invention.

FIG. 8C is a diagrammatic view illustrating the exemplary embodiment of the reciprocating drive gears 820, 821, 822, 823, and 824 of the Herodotus machines 800 and 800.1 of FIGS. 8A and 8B, according to preferred embodiments of the present invention. Drive rope chain 202 operates in same manner as in FIG. 2, except that it engages separate reciprocating drive gears 820, 821, 822, 823, and 824.

Figure 9:
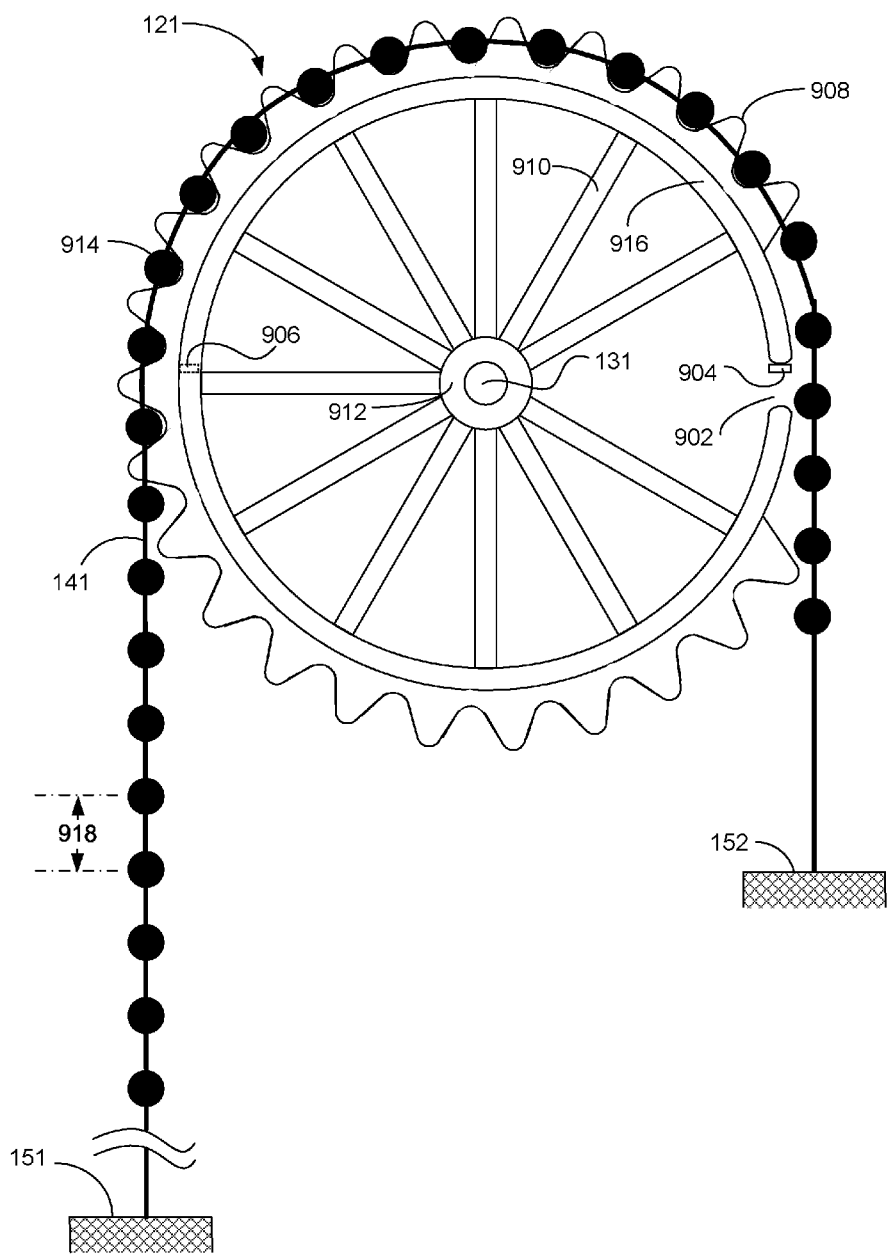
FIG. 9 is a diagrammatic side elevation view illustrating an exemplary detail of the reciprocating gear of the embodiment of the Herodotus machine of FIG. 1B, according to a preferred embodiment of the present invention.
Figure 13:
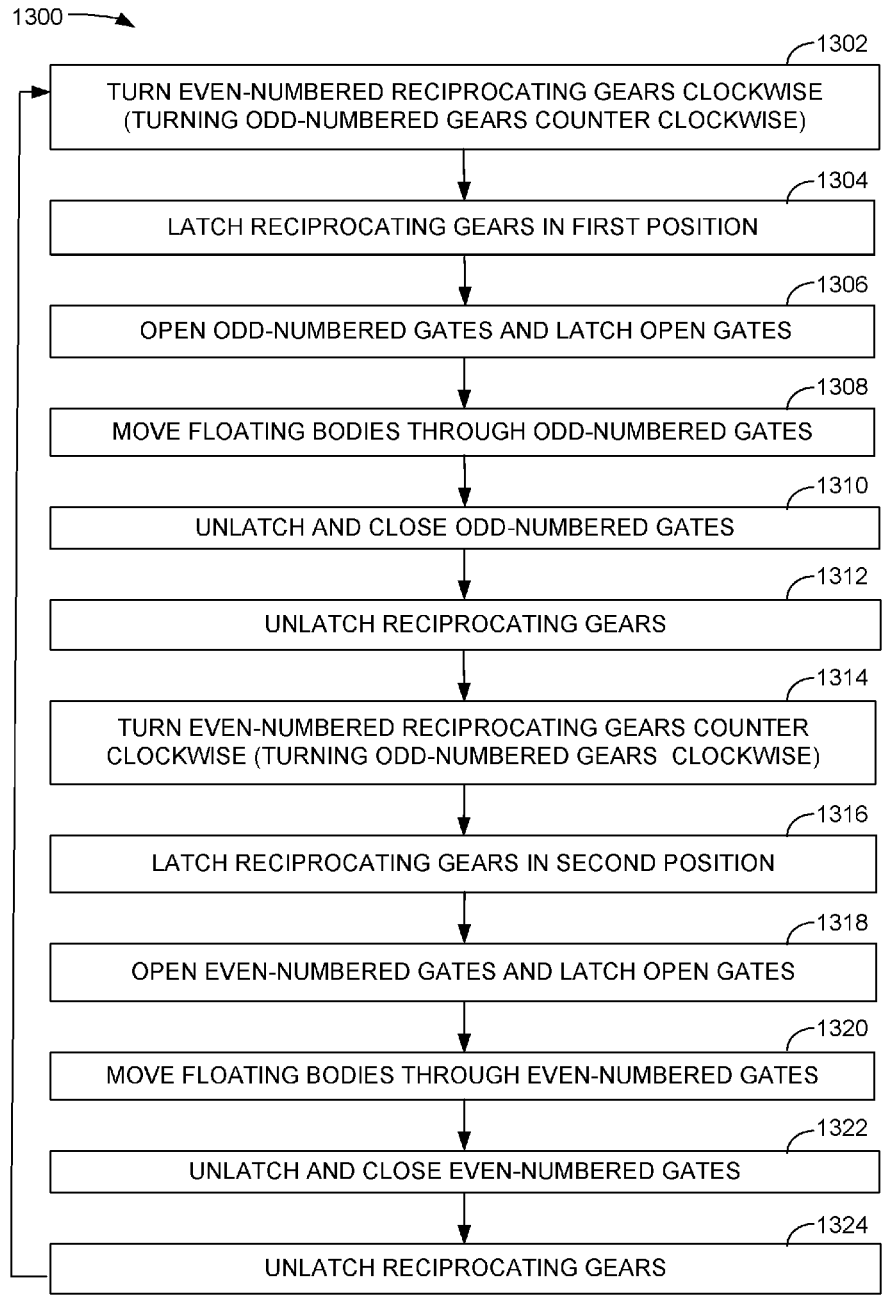
FIG. 13 is a process diagram view illustrating an exemplary event sequence of the Herodotus machine of FIG. 1A, according to a preferred embodiment of the present invention.

FIG. 9 is a diagrammatic side elevation illustrating an exemplary detail of the reciprocating gear 121 of the embodiment of the Herodotus machine 100 of FIG. 1B, according to a preferred embodiment of the present invention. Exemplary reciprocating gear 121 is mounted on reciprocating gear axle 131 via hub 912. In embodiments in which a drive gear, similar to drive gear 821, is sandwiched to reciprocating gear 121, hub 912 rotates freely on reciprocating gear axle 131. In embodiments in which the reciprocating drive gear 821 is separate from the reciprocating gear 121, hub 912 is fixed to and rotates with reciprocating gear axle 131. Spokes 910 (one of eleven labeled) extend radially from hub 912 to rim 916, which supports gear teeth 908 (one of twenty-five labeled) which, in turn, engage rope chain 141. Rope chain 141 has coiled knots 914 spaced at intervals 918 that engage the gear teeth 908. The number of spokes 908 is not a limitation of the invention. The number of teeth is predetermined from the length of the rope chain 141 to be played out and from the spacing 918 of links in the rope chain 141. Rim 916 has a gap 902 that engages a first releasable latch 904 (step 1304 in FIG. 13) when reciprocating gear 121 is in the position shown, as in FIG. 1B. First releasable latch 904 keeps downstream and upstream displacers 151 and 152 from moving while gate 111 is opened (FIG. 1C; step 1306 in FIG. 13), three-capstan quarry barge 160 is moved through the gate 111 (FIG. 1C; step 1308 in FIG. 13), and gate 111 is closed (FIG. 1D; step 1310 in FIG. 13). A second releasable latch 906 is not engaged in the illustrated position. The number of gear teeth 908 is determined by the portion of the circumference of the reciprocating gear 121 needed to move the length of rope chain 141 the distance required to operate the downstream and upstream displacers 151 and 152 in a particular embodiment. For example, all other factors being equal, if reciprocating gear 121 had a larger diameter, a lesser extent of the rim 916 of the larger reciprocating gear 121 would be populated with gear teeth 908. There is a balance to be struck, in each of various embodiments, as the larger the reciprocating gear 121, the higher above the gate 111 reciprocating gear 121 must be mounted, thereby requiring a longer rope chain 141. All reciprocating gears 120-124 are configured in a similar manner, where non-neighboring odd-numbered reciprocating gears 121 and 123 are in the position shown when non-neighboring even-numbered reciprocating gears 120,122, and 124 are as shown in FIG. 10.

Figure 10:
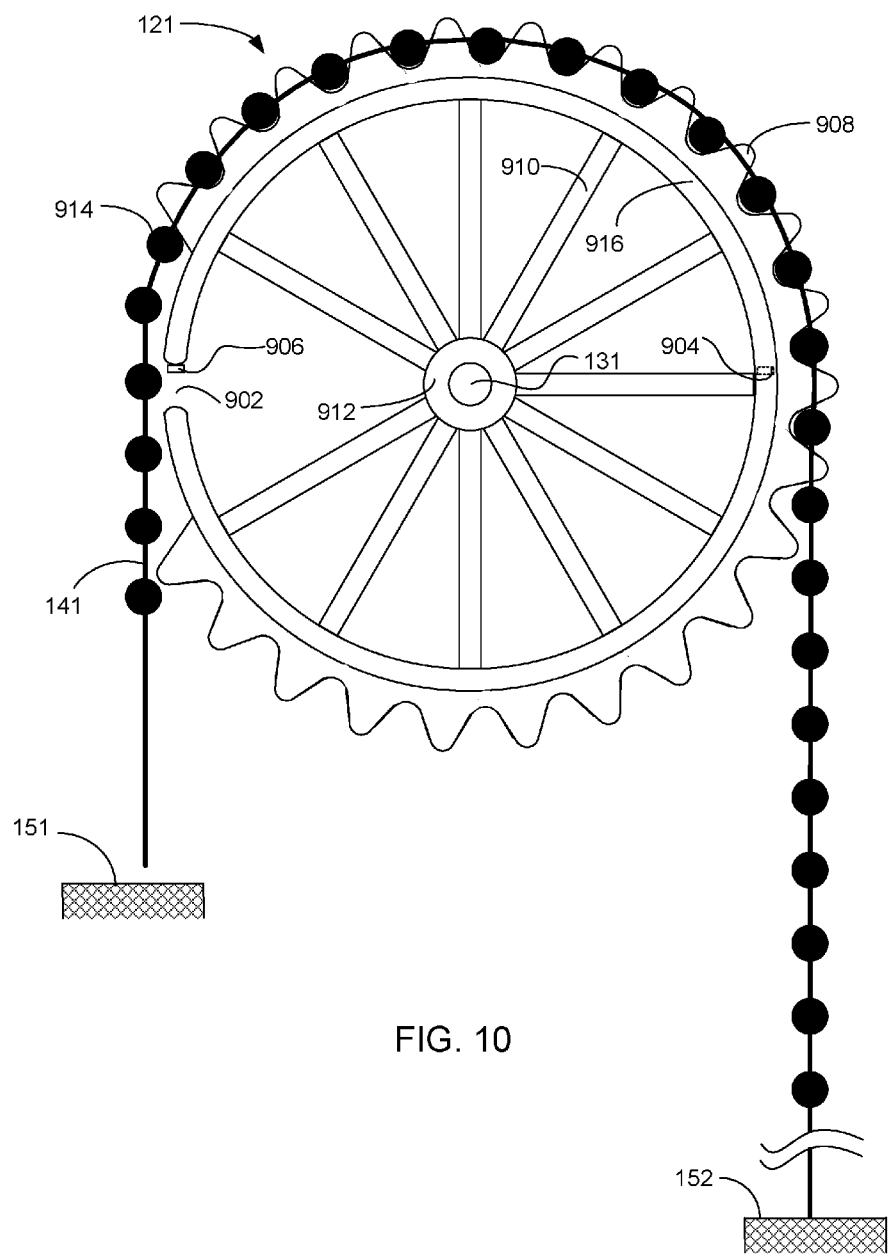
FIG. 10 is a diagrammatic side elevation view illustrating the exemplary detail of the embodiment of the Herodotus machine of FIG. 1B and FIG. 9, according to a preferred embodiment of the present invention.

FIG. 10 is a diagrammatic elevation illustrating the exemplary detail of the reciprocating gear 121 of the embodiment of the Herodotus machine 100 of FIG. 1D and FIG. 9, according to a preferred embodiment of the present invention. Shown in the position of FIG. 1D, gap 902 in rim 916 of reciprocating gear 121 has rotated one hundred eighty degrees to engage second releasable latch 906. All the reciprocating gears 120-124 are configured like reciprocating gear 121.

Figure 11:
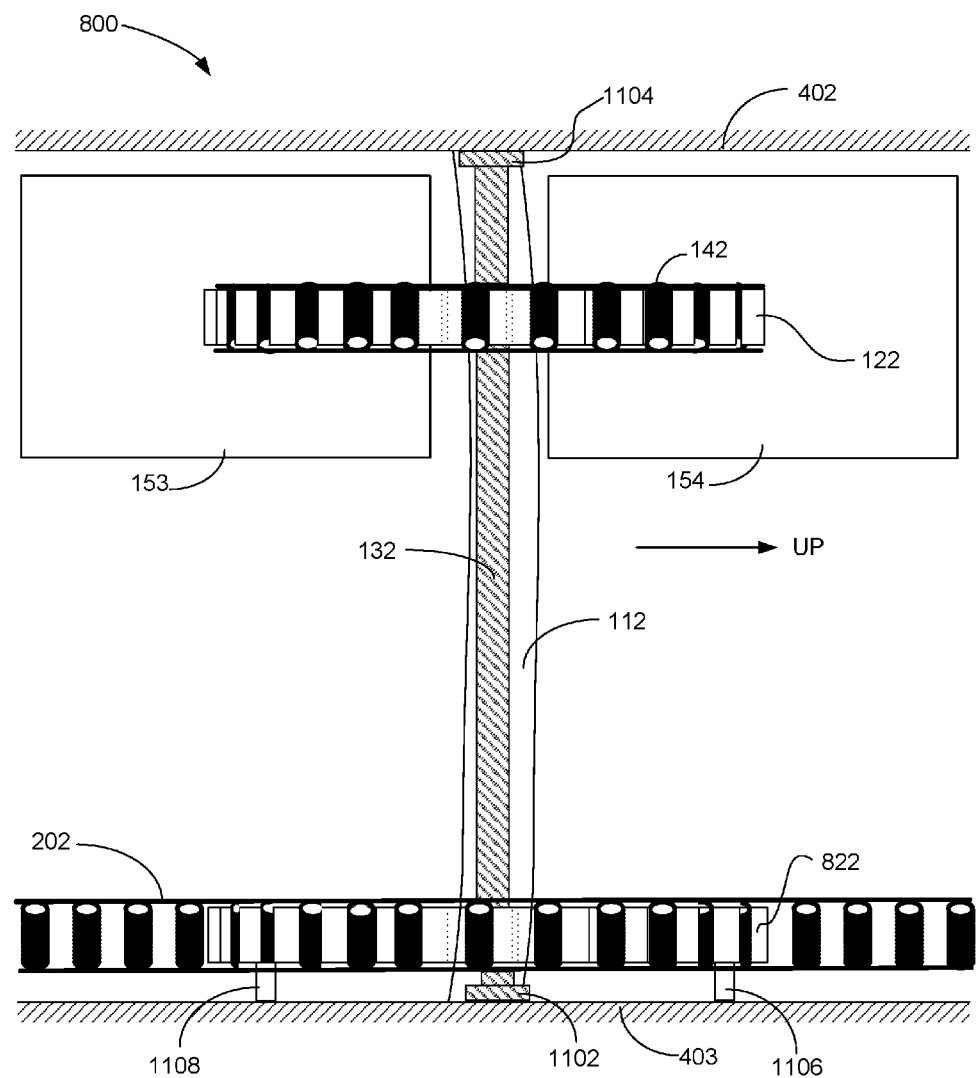
FIG. 11 is a diagrammatic top plan view illustrating an exemplary detail of the embodiment of the Herodotus machine of FIG. 8B, according to a preferred embodiment of the present invention.

FIG. 11 is a diagrammatic top plan view illustrating an exemplary detail of the embodiment of the Herodotus machine 800 of FIG. 8B, according to a preferred embodiment of the present invention. Reciprocating gear axle 132 is fixed to reciprocating gear 122 and reciprocating drive gear 822. Reciprocating gear axle 132 rotates in bearings 1102 and 1104, which may, for non-limiting example, be a wooden socket lubricated with goose grease. Rope chains 142 and 202 are seen from the top and show the similarity of the rope chains 142 and 202 to a modern bicycle chain, with coiled knots 914 for joints. Latches 1106 and 1108 (similar to first and second releasable latches 904 and 906) are shown diagrammatically.

FIGS. 12A-12H illustrate a sequence of exemplary discrete points in a continuous rotation of main drive gear 1202 at a nominally constant rate.

Figure 12A:
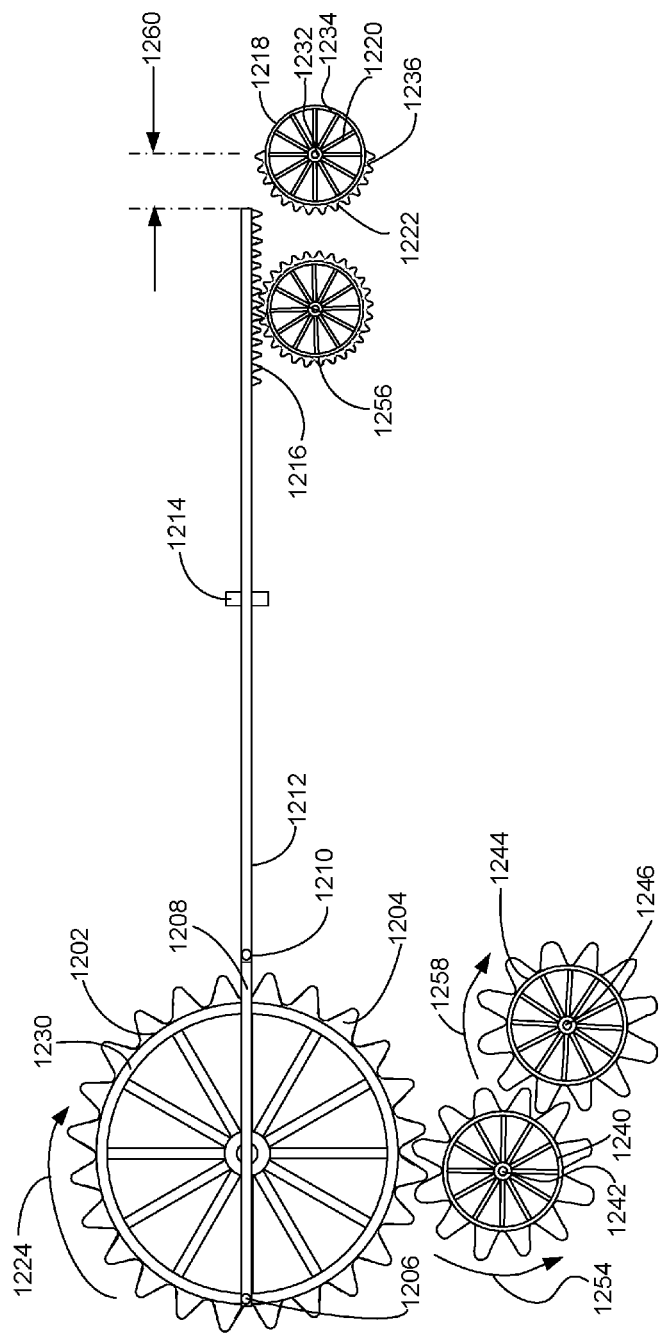
FIG. 12A is a diagrammatic side elevation view illustrating an exemplary detail of the embodiment of the Herodotus machine of FIG. 1A in a first exemplary position, according to a preferred embodiment of the present invention.

FIG. 12A is a diagrammatic side elevation view illustrating an exemplary detail of the embodiment of the Herodotus machine 100 of FIG. 1A in a first exemplary position, according to a preferred embodiment of the present invention. In all FIGS. 12A-12H, main drive gear 1202 rotates at a uniform rate on main drive gear axle 1238 in direction 1224, driven by main drive gear teeth 1204 (one of twenty-four labeled) in response to a prime mover (not shown), such as, for non-limiting example, a turnstile gear powered by four large bulls. As a point for future reference in FIG. 18, the rotational position of main drive gear 1202 shown in FIG. 12A is taken as the zero degree of rotation position. Main drive gear 1202 is the power transferring mechanism for all actions of the Herodotus machine 100. All motions of the Herodotus machine 100 are commonly synchronized to main drive gear 1202. Crank 1208 is attached by a pivot 1206 to the main drive gear rim 1230 and is attached to arm 1212 by pivot 1210. Sleeve 1214 constrains the motion of arm 1212 to nearly linear back-and-forth motion. Rack 1216 on arm 1212 is shown engaging intermediate gear teeth 1222 (one of fourteen labeled) of intermediate gear 1218 in a furthest extent of a return stroke of arm 1212. Timing gap 1260, shown at fullest extent, occurs in the rotation interval between three hundred fifteen degrees and forty-five degrees, during which the reciprocating gears 120-124 do not rotate and gate operations occur. Intermediate gear 1218 drives intermediate gear axle 1232, which may drive larger gears (not shown) which drive the reciprocating gears 120-124. Intermediate gear 1218 is shown with an intermediate gear hub 1236 supporting spokes 1220 (one of twelve labeled) attached to intermediate gear rim 1234. Intermediate gear rim 1234 supports intermediate gear teeth 1222 (one of fourteen labeled) arranged over one-half of the circumference of intermediate gear rim 1234. At the instant of time corresponding to the position shown, intermediate gear 1218 is not moving. Rack idler gear 1256 keeps arm 1212 aligned to intermediate gear 1218 when rack 1216 is not engaged with intermediate gear teeth 1222. In some embodiments, rack idler gear 1256 may have no more teeth than rack 1216. Gate drive idler gear 1240 rotates in direction 1254 freely about axle 1242 and drives gate driver gear 1244 that is fixed on gate drive timing axle 1246. The gear ratio between main drive gear 1202 and gate drive idler gear 1240 is 2:1. The gear ratio between gate drive idler gear 1240 and gate driver gear 1244 is 1:1. Gate drive timing axle 1246 drives timing gears 1402 (see FIG. 14), 1502 (see FIG. 15) and 1602 (see FIG. 16). During initial pumping of water into the step locks 105-108 and reservoir 109, gate drive idler gear 1240 may be dismounted from axle 1242, or otherwise disengaged, as the gate openers 1400 (see FIG. 15) and 1600 (see FIG. 16) and the floating body mover 1500 (see FIG. 15) are not necessary for initial pumping.

Figure 12B:
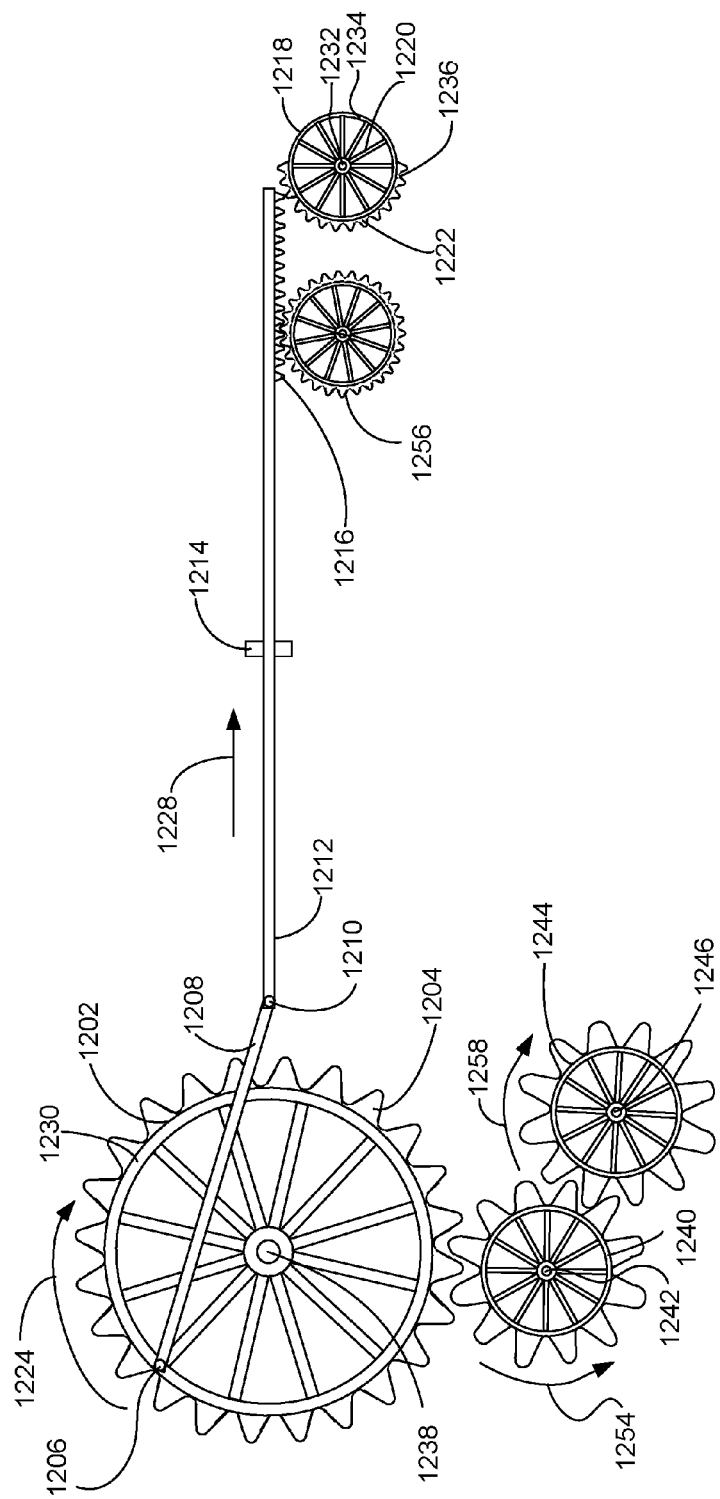
FIG. 12B is a diagrammatic side elevation view illustrating the exemplary detail of the embodiment of the Herodotus machine of FIG. 1A and FIG. 12A in a second exemplary position, according to a preferred embodiment of the present invention.

FIG. 12B is a diagrammatic side elevation illustrating the exemplary detail of the embodiment of the Herodotus machine 100 of FIG. 1A and FIG. 12A in a second exemplary position, according to a preferred embodiment of the present invention. The main drive gear 1202 has rotated forty-five degrees from the zero position shown in FIG. 12A. Arm 1212 has been pushed forward 1228 by crank 1208 and is at the end of timing gap 1260, ready to begin rotating intermediate gear 1218. In various embodiments, by selection of the size of intermediate gear 1218 and the number of intermediate gear teeth 1222 and the rack 1216 size, any adaptive degree of rotation of intermediate gear 1218 may be achieved. In a particular embodiment, an intermediate gear may be sized to drive reciprocating gears 120-124 or reciprocating drive gears 820-824 on a one-to-one ratio. In some embodiments, the rim 1234 of intermediate gear 1218 may have a gap (similar to rim gap 902) for engaging releasable latches (similar to first and second releasable latches 904 and 906) which would obviate the need for rim gap 902 and first and second releasable latches 904 and 906 in reciprocating gears 120-124, as latching the intermediate gear 1218 would latch all reciprocating gears 120-124. If the material used in the main drive gear 1202, intermediate gear 1218, and reciprocating gears 120-124 is comparatively weak, it is preferred to use first and second releasable latches 904 and 906 in the reciprocating gears 120-124 to spread the strain forces. If the material used in the main drive gear 1202, intermediate gear 1218, and reciprocating gears 120-124 is sufficiently strong, it is preferred to use first and second releasable latches 904 and 906 in the intermediate gear 1218.

Figure 12C:
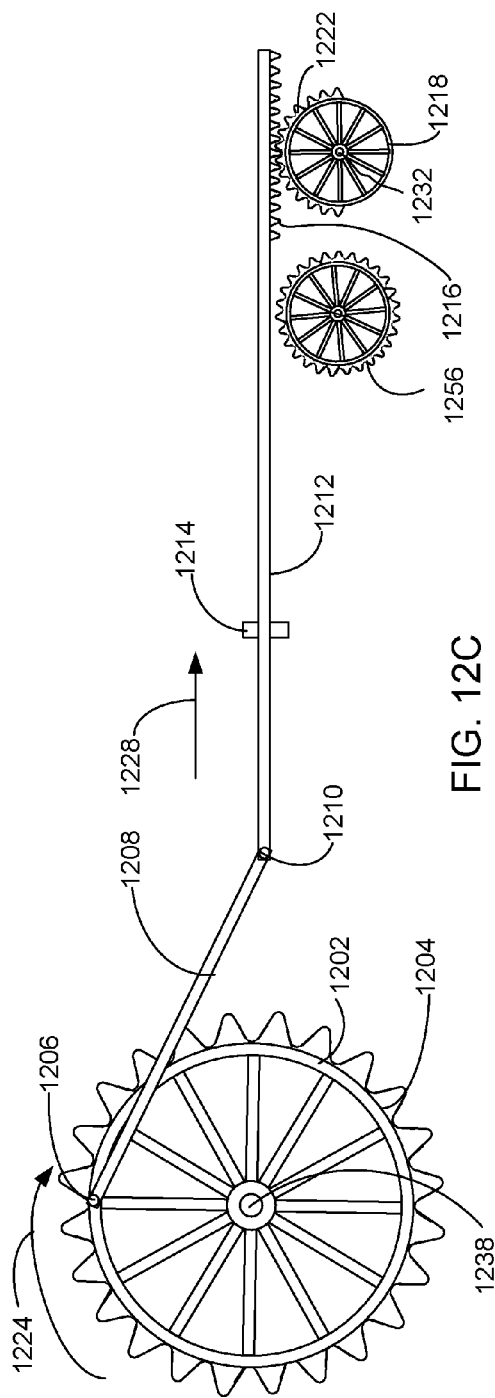
FIG. 12C is a diagrammatic side elevation view illustrating the exemplary detail of the embodiment of the Herodotus machine of FIG. 1A and FIG. 12A in a third exemplary position, according to a preferred embodiment of the present invention.

FIG. 12C is a diagrammatic side elevation illustrating the exemplary detail of the embodiment of the Herodotus machine 100 of FIG. 1A and FIG. 12A in a third exemplary position, according to a preferred embodiment of the present invention. Gate drive idler gear 1240 and gate drive gear 1244 are omitted from this view to conserve drawing space. Main drive gear 1202 has rotated an additional forty-five degrees to the ninety degree position, pushing forward 1228 crank 1208 and arm 1212 to rotate intermediate gear 1218 ninety degrees clockwise. All reciprocating gears 120-124 are rotated ninety degrees by this rotation of intermediate gear 1218, which turns intermediate gear axle 1232, which, in some embodiments, turns a gear (not shown) that engages end 204 of drive rope chain 202 (see FIGS. 2 and 8C) to rotate all reciprocating gears 120-124. In a particular embodiment, with reciprocating gears 120-124 fixed to reciprocating gear axles 130-134, respectively, intermediate gear axle 1232 and reciprocating gear axle 130, 131, 132, 133, or 134 may be coextensive.

Figure 12D:
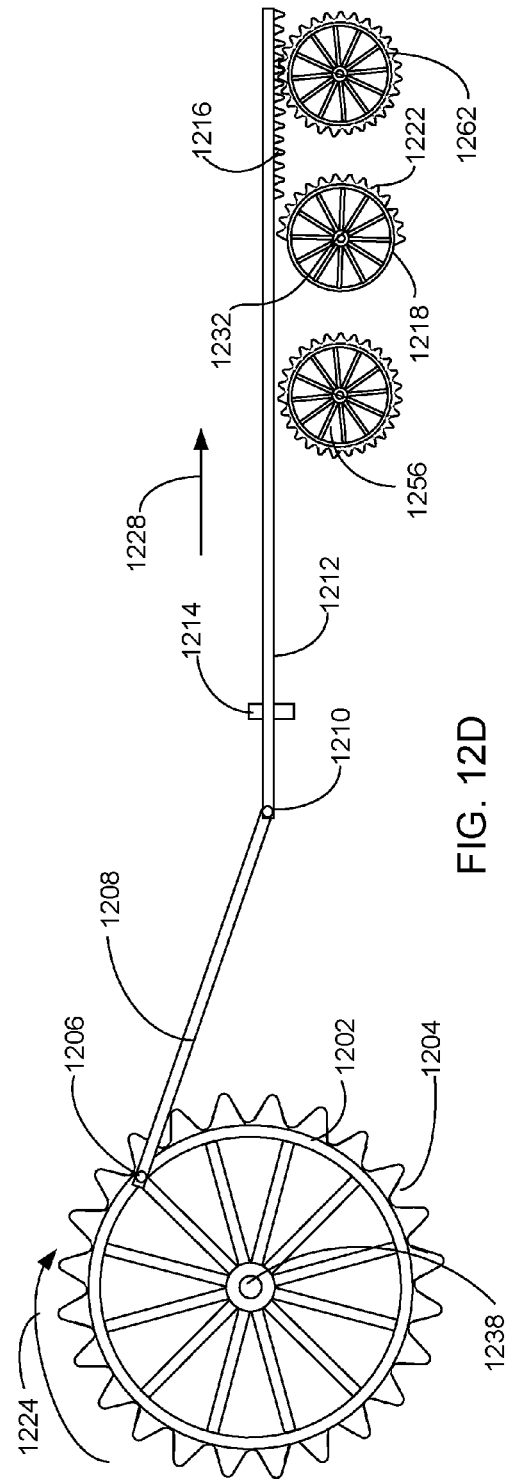
FIG. 12D is a diagrammatic side elevation view illustrating the exemplary detail of the embodiment of the Herodotus machine of FIG. 1A and FIG. 12A in a fourth exemplary position, according to a preferred embodiment of the present invention.

FIG. 12D is a diagrammatic side elevation illustrating the exemplary detail of the embodiment of the Herodotus machine 100 of FIG. 1A and FIG. 12A in a fourth exemplary position, according to a preferred embodiment of the present invention. Gate drive idler gear 1240 and gate drive gear 1244 are omitted from this view to conserve drawing space. Main drive gear 1202 has rotated an additional forty-five degrees to the one hundred thirty-five degree position, pushing forward 1228 crank 1208 and arm 1212 to rotate intermediate gear 1218 an additional ninety degrees clockwise. All reciprocating gears 120-124 are rotated ninety degrees by this continued rotation of intermediate gear 1218, which turns intermediate gear axle 1232, which, in some embodiments, turns a gear (not shown) that engages end 204 of drive rope chain 202 (see FIGS. 2 and 8C) to rotate all reciprocating gears 120-124 to latch positions. Steps 1302 and 1304 (see FIG. 13) are completed, as shown, in FIG. 12D. Rack 1216 extends beyond intermediate gear 1218 and is supported by an additional idler gear 1262.

Figure 12E:
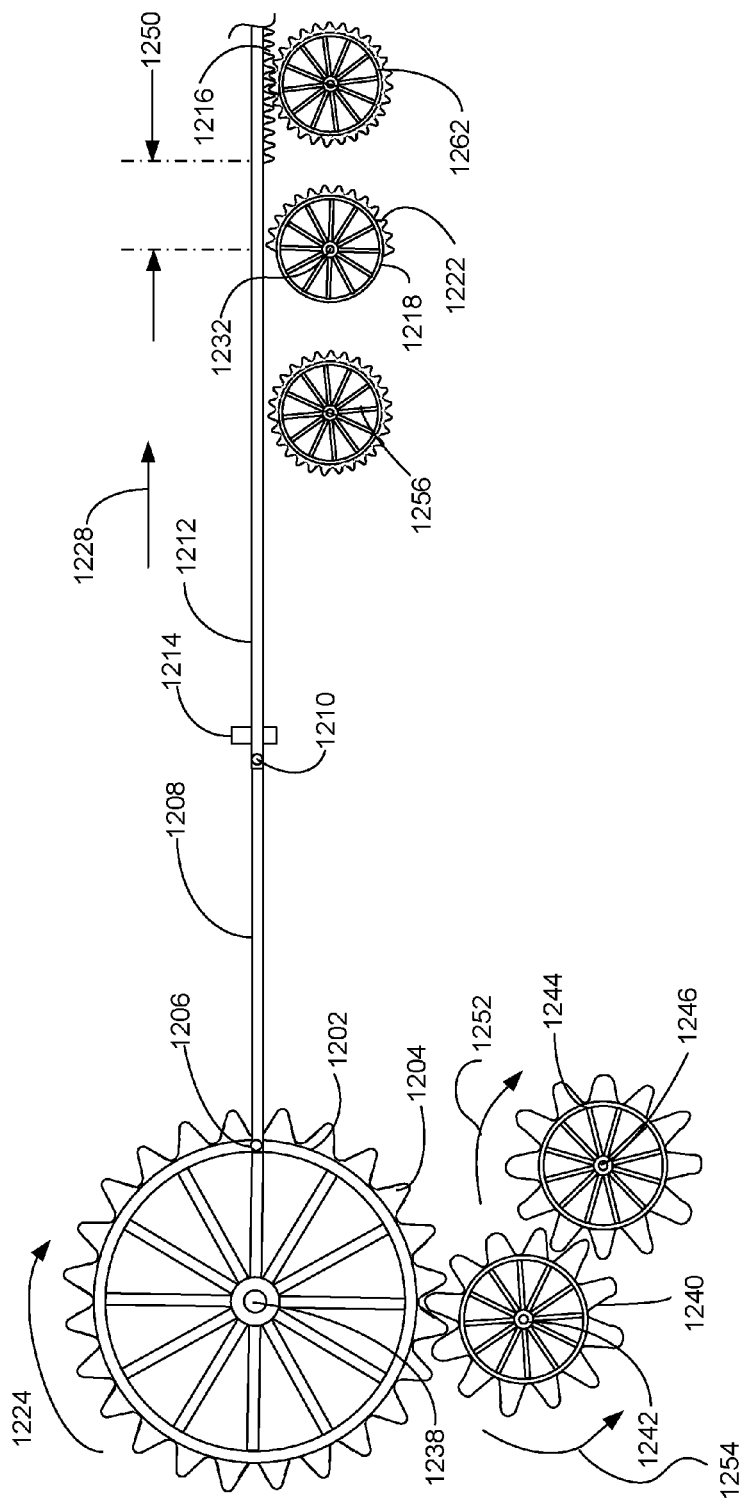
FIG. 12E is a diagrammatic side elevation view illustrating the exemplary detail of the embodiment of the Herodotus machine of FIG. 1A and FIG. 12A in a fifth exemplary position, according to a preferred embodiment of the present invention.

FIG. 12E is a diagrammatic side elevation illustrating the exemplary detail of the embodiment of the Herodotus machine 100 of FIG. 1A and FIG. 12A in a fifth exemplary position, according to a preferred embodiment of the present invention. Main drive gear 1202 has rotated an additional forty-five degrees to the one hundred eighty degree position, pushing forward 1228 crank 1208 and arm 1212 past intermediate gear 1218 to create timing gap 1250, during which gate operations occur. Timing gap 1250 includes the time it takes rack 1216 to extend beyond intermediate gear 1218 plus the time it takes to move back to re-engage intermediate gear 1218. All reciprocating gears 120-124 are latched during timing gap 1250. Arm 1212 is instantaneously at rest in the position shown.

Figure 12F:
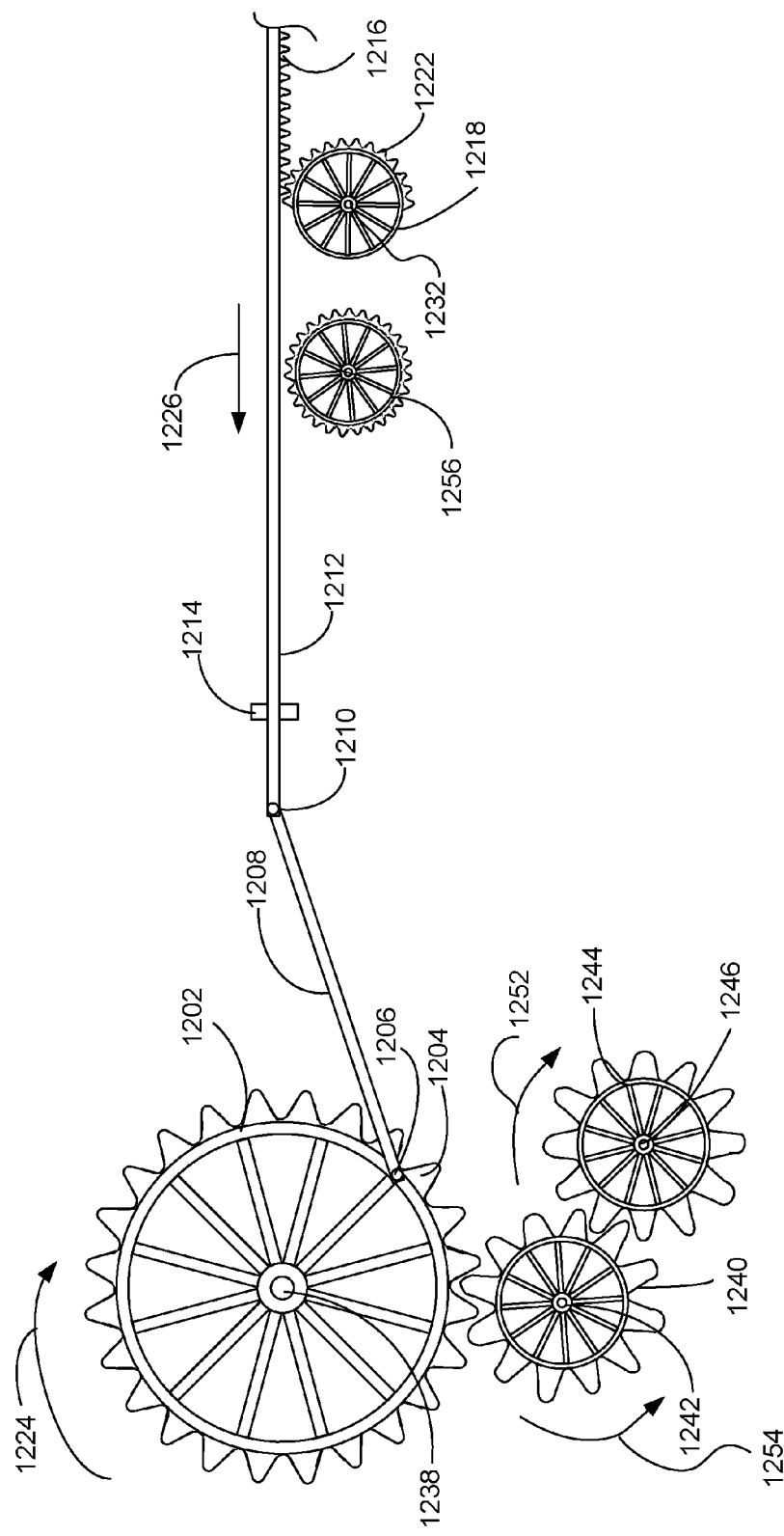
FIG. 12F is a diagrammatic side elevation view illustrating the exemplary detail of the embodiment of the Herodotus machine of FIG. 1A and FIG. 12A in a sixth exemplary position, according to a preferred embodiment of the present invention.

FIG. 12F is a diagrammatic side elevation illustrating the exemplary detail of the embodiment of the Herodotus machine 100 of FIG. 1A and FIG. 12A in a sixth exemplary position, according to a preferred embodiment of the present invention. Main drive gear 1202 has rotated an additional forty-five degrees to the two hundred twenty-five degree position, pulling backward 1226 crank 1208 and arm 1212 to a starting point to engage intermediate gear 1218 to end timing gap 1250 and complete step 1312 (see FIG. 13).

Figure 12G:
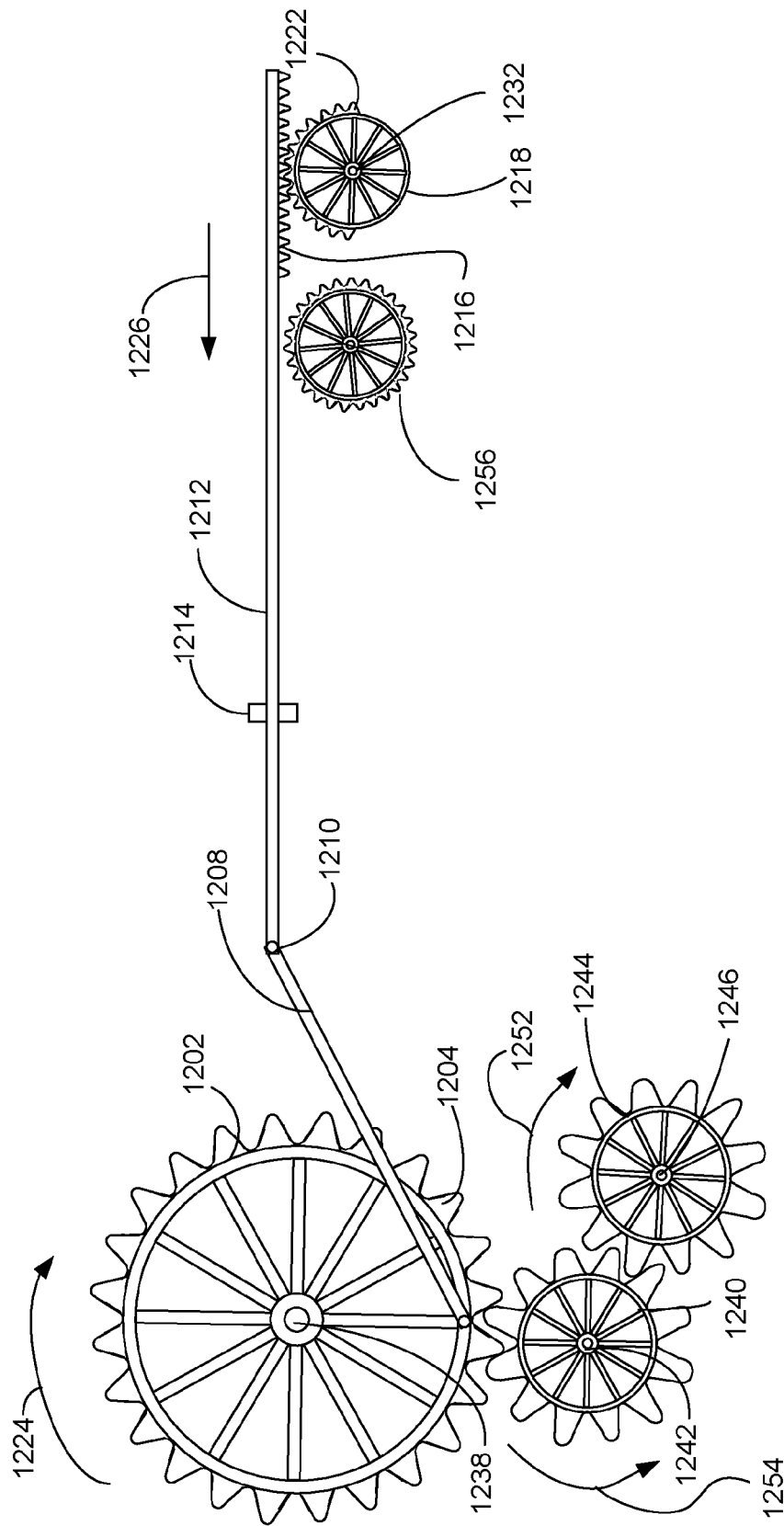
FIG. 12G is a diagrammatic side elevation view illustrating the exemplary detail of the embodiment of the Herodotus machine of FIG. 1A and FIG. 12A in a seventh exemplary position, according to a preferred embodiment of the present invention.

FIG. 12G is a diagrammatic side elevation illustrating the exemplary detail of the embodiment of the Herodotus machine 100 of FIG. 1A and FIG. 12A in a seventh exemplary position, according to a preferred embodiment of the present invention. Main drive gear 1202 has rotated an additional forty-five degrees to the two hundred seventy degree position, pulling backward 1226 crank 1208 and arm 1212 to rotate intermediate gear 1218 ninety degrees counterclockwise. All reciprocating gears 120-124 are rotated ninety degrees by this counterclockwise rotation of intermediate gear 1218, which turns intermediate gear axle 1232, which turns a gear (not shown) that engages end 204 of drive rope chain 202 (see FIGS. 2 and 8C) to rotate all reciprocating gears 120-124.

Figure 12H:
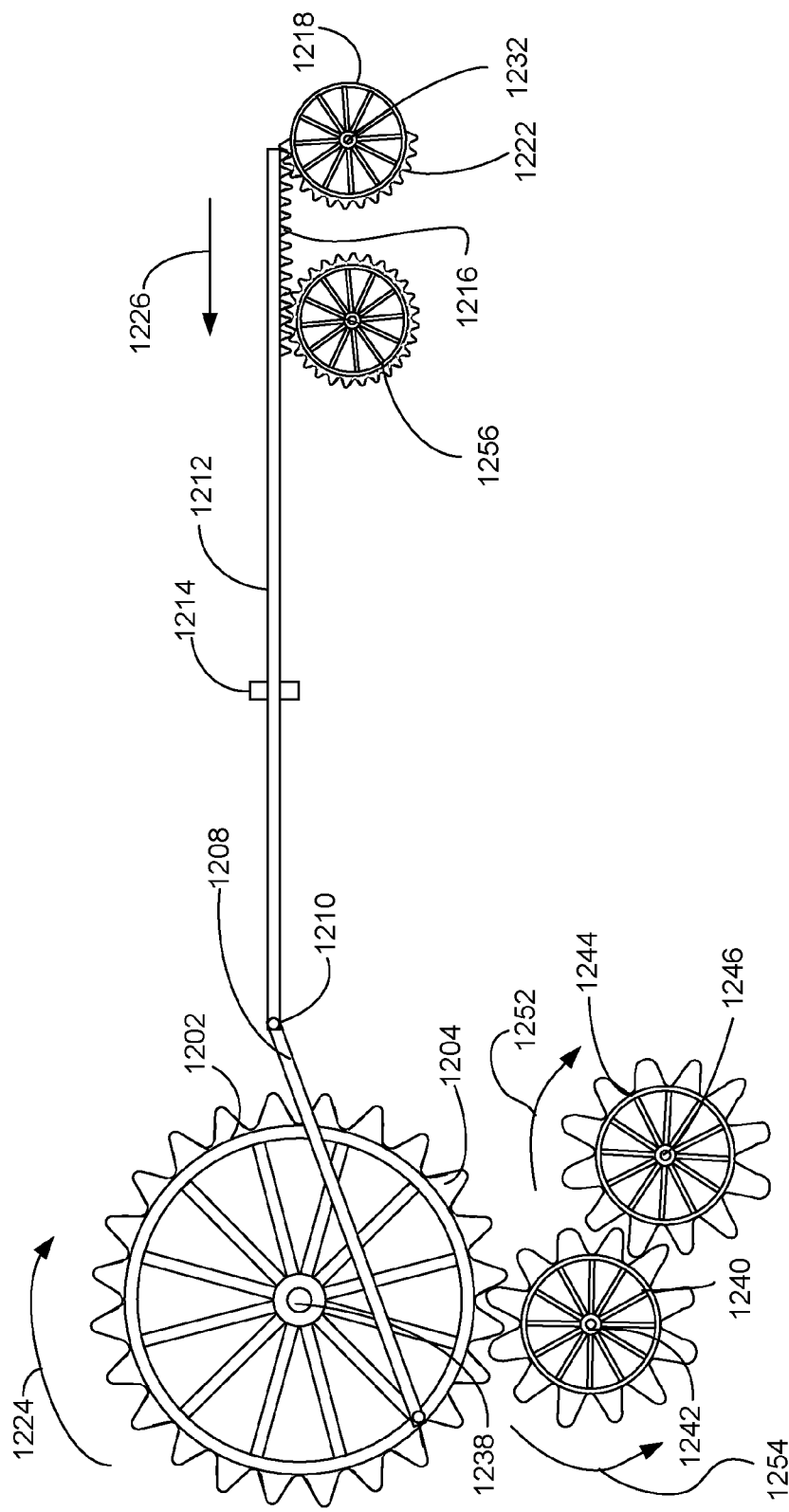
FIG. 12H is a diagrammatic side elevation view illustrating the exemplary detail of the embodiment of the Herodotus machine of FIG. 1A and FIG. 12A in an eighth exemplary position, according to a preferred embodiment of the present invention.

FIG. 12H is a diagrammatic side elevation illustrating the exemplary detail of the embodiment of the Herodotus machine 100 of FIG. 1A and FIG. 12A in an eighth exemplary position, according to a preferred embodiment of the present invention. Main drive gear 1202 has rotated an additional forty-five degrees to the three hundred fifteen degree position, pulling backward 1226 crank 1208 and arm 1212 to rotate intermediate gear 1218 an additional ninety degrees counterclockwise. All reciprocating gears 120-124 are rotated ninety degrees by this counterclockwise rotation of intermediate gear 1218, which turns intermediate gear axle 1232, which turns a gear (not shown) that engages end 204 of drive rope chain 202 (see FIGS. 2 and 8C) to rotate all reciprocating gears 120-124. Steps 1314 and 1316 are complete. The next forty-five degree rotation of main drive gear 1202 returns to the state shown in FIG. 12A.

Those of skill in the art, enlightened by the present disclosure, will be aware of many devices which convert rotational motion into reciprocating linear motion, and can be modified to have timing gaps 1250 and 1260. All such devices that meet the functional requirements as to input and output are within the scope of the present invention.

FIG. 13 is a process diagram view illustrating an exemplary event sequence 1300 of the Herodotus machine 100 of FIG. 1A, according to a preferred embodiment of the present invention. In step 1302, non-neighboring even-numbered reciprocating gears 120, 122, and 124 are rotated clockwise and all non-neighboring odd-numbered reciprocating gears 121 and 123 are rotated counter-clockwise to change water levels 163-167 as in FIG. 1B and FIGS. 12B-12D. In step 1304, all reciprocating gears 120-124 automatically latch at the end of the first rotation as the rim gap 902 engages the first releasable latch 904, for example. In step 1306, all non-neighboring odd-numbered gates 111 and 113 are opened, as in FIG. 1C and FIG. 14. In step 1308, the three-capstan quarry barge 160 is moved through at least one of the non-neighboring odd-numbered gates 111 and 113, as in FIG. 1C and FIG. 15. While the illustrations here show the three-capstan quarry barge 160 moving through the locks 105-108, the invention, with appropriate scaling, will work with any type and size of floating body. In step 1310, the non-neighboring odd-numbered gates 111 and 113 are unlatched and closed, as in FIG. 1D and FIG. 14. Because the non-neighboring even-numbered gates 110, 112, and 114 were originally closed, all gates are closed at the end of step 1310. In step 1312, the reciprocating gears 120-124 are unlatched as lever 1516 (see FIG. 15) returns to a ready position after pushing a three-capstan quarry barge 160 through at least one of the non-neighboring odd-numbered gates 111 or 113. Unlatching is done when the lever 1516 engages reciprocating gear unlatch trigger 1540 (see FIG. 15) which is connected by a mechanical linkage (not shown) to the first and second releasable latches 904 and 906. In step 1314, non-neighboring even-numbered reciprocating gears 120, 122, and 124 are rotated in a counter-clockwise direction and non-neighboring odd-numbered reciprocating gears 121 and 123 are rotated in a clockwise direction, all to change water levels 163-167, as in FIG. 1D and FIGS. 12G-12H. In step 1316, all reciprocating gears 120-124 automatically latch at the end of the second rotation as, for example, the rim gap 902 engages the first releasable latch 904. In step 1318 all non-neighboring even-numbered gates 110, 112, and 114 are opened, as in FIG. 1E and FIG. 16. In step 1320, the three-capstan quarry barge 160 is moved through at least one of the non-neighboring even-numbered gates 110, 112, or 114, as in FIG. 1E and FIG. 15. In step 1322, the non-neighboring even-numbered gates 110, 112, and 114 are closed, as in FIG. 1F and FIG. 16. In step 1324, the reciprocating gears 120-124 are unlatched as lever 1516 (see FIG. 15) returns to a ready position after pushing a three-capstan quarry barge 160 through at least one of the non-neighboring even-numbered gates 110, 112, or 114. With all gates 110-114 closed and all reciprocating gears 120-124 unlatched, the process repeats, starting at step 1302.

In a basic embodiment, the gates 110-114 can be operated manually, and the three-capstan quarry barge 160 can be propelled manually, thereby operating the Herodotus machine 100. In the embodiments to be described below, operation of the gates 110-114 and the propelling of the three-capstan quarry barge 160 are mechanized as an extension on the basic embodiment of the Herodotus machine 100.

Figure 14:
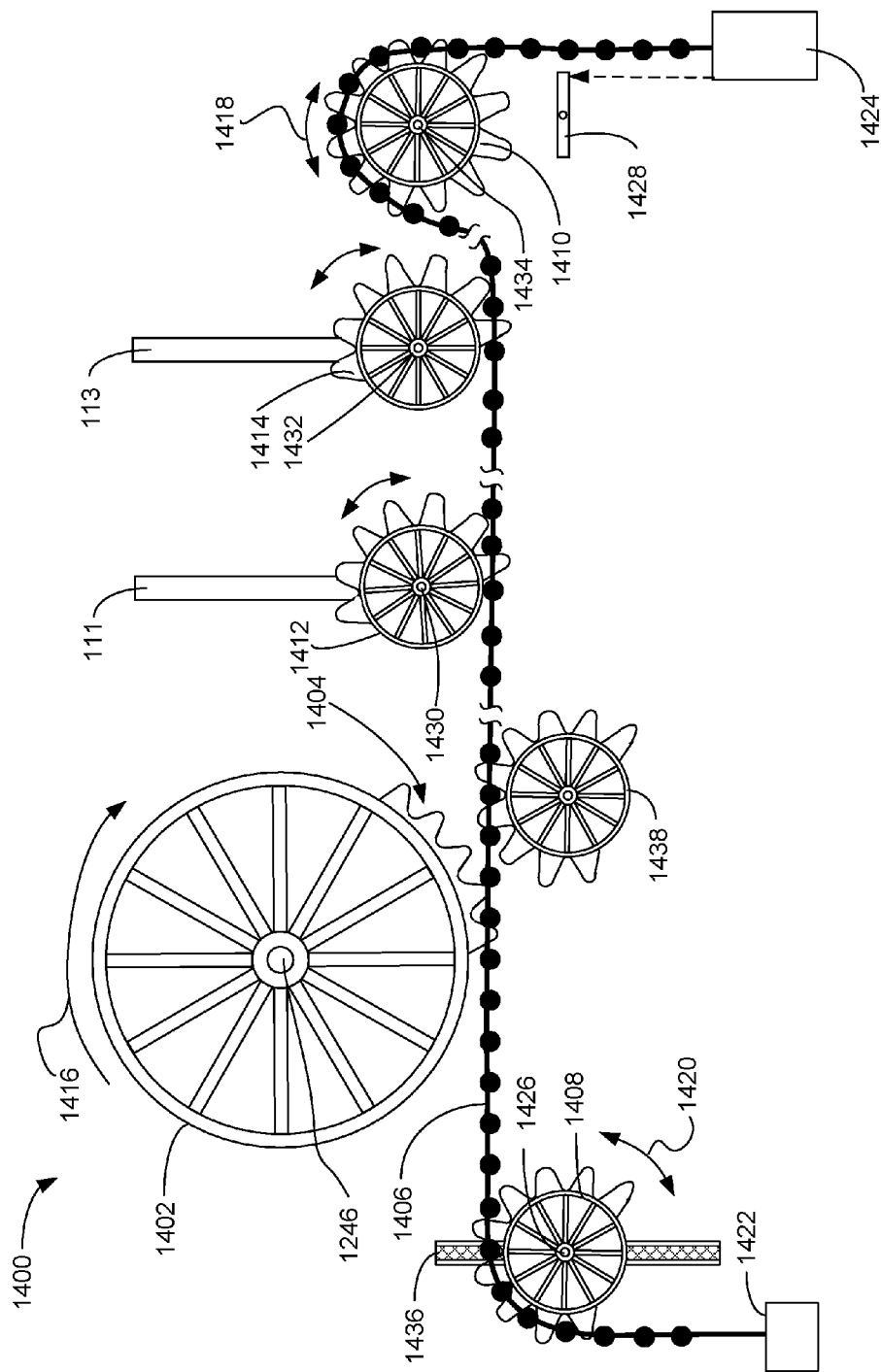
FIG. 14 is a diagrammatic side elevation view and partial plan view illustrating an exemplary odd-numbered gate actuator of the exemplary embodiment of the Herodotus machine of FIG. 1A and FIG. 12A in an exemplary position, according to a preferred embodiment of the present invention.

FIG. 14 is a diagrammatic side elevation and partial plan view illustrating an exemplary odd-numbered gate actuator 1400 of the exemplary embodiment of the Herodotus machine 100 of FIG. 1A and FIG. 12A in an exemplary position, according to a preferred embodiment of the present invention. Odd-numbered gate actuator 1400 opens and closes a subset of non-neighboring gates 111 and 113 of the gates 110-114. Odd-gate timing gear 1402 is fixed to gate drive timing axle 1246 and rotates uniformly in one direction 1416. Odd-gate timing gear 1402 has five odd-gate timing gear teeth 1404, which are sufficient to rotate gate control gears 1412, 1414 enough to open non-neighboring gates 111 and 113, respectively. All gears herein, except reciprocating gears 120-124, are shown with complete rims. However, in some embodiments, those gears that have portions of rim without teeth, such rim portion may be omitted, as well as the spokes connected thereto. Tensioner idler gear 1408 rotates freely 1420 on axle 1426, engaging odd-gate timing rope chain 1406 to maintain alignment of odd-gate timing rope chain 1406 to odd-gate timing gear 1402 when odd-gate timing gear teeth 1404 are not engaged with odd-gate timing rope chain 1406. Clutch 1436 moves tensioner idler gear 1408 downward to prevent odd-gate timing gear 1402 from engaging odd-gate timing rope chain 1406 when even-gate timing gear 1602 (see FIG. 16) is engaging even-gate timing rope chain 1606 to open non-neighboring even gates 110, 112, and 114, thereby preventing all gates 110-114 from opening at once. Clutch 1436 activates at step 1316 and releases when step 1318 is complete. Idler gear 1438 rotates freely to isolate gate control gears 1412, 1414 from clutch 1436. Tensioner weight 1422 is suspended from one end of odd-gate timing rope chain 1406 to maintain tension on the odd-gate timing rope chain 1406 so that odd-gate timing gear teeth 1404 can engage when odd-gate timing gear 1402 rotates in direction 1416 through the engagement position and the clutch 1436 is not activated. Terminal idler gear 1410 rotates freely 1418 on axle 1434. When the odd-gate timing gear teeth 1404 finish engaging odd-gate timing rope chain 1406, counterweight 1424 has ascended to activate odd-gate latch 1428, which latches the counterweight 1424 and so prevents the non-neighboring odd-numbered gates 111 and 113 from closing until the latch is released after the three-capstan quarry barge 160 has been moved through an odd-numbered gate 111 or 113 in step 1308. Gate control gear 1414 is fixed to vertical axle 1432 that is fixed to a gate pivot, similar to gate pivot 406. Gate control gears 1412 and 1414 and gates 111 and 113 are shown in top plan view. Gate control gears 1412 and 1414 have no more teeth than are needed to open the gates 111 and 113, respectively. Gate control gear 1412 is fixed to vertical axle 1430 that is also fixed to, and drives, a gate pivot (not shown). All gate control gears are configured similarly to gate control gear 1414. A ninety degree twist in odd-gate timing rope chain 1406 is required to transition from vertically-oriented odd-gate timing gear 1402 to horizontally oriented gate control gears 1412 and 1414, which is easily accomplished with odd-gate timing rope chain 1406. Gate closing counterweight 1424 is suspended on odd-gate timing rope chain 1406, is heavier than tensioner weight 1422, and will pull the odd-gate timing rope chain 1406 to close the non-neighboring odd-numbered gates 111 and 113, as shown, when the odd-gate timing gear teeth 1404 are no longer engaged with the odd-gate timing rope chain 1406. Those of skill in the art, enlightened by the present disclosure, will be aware of other mechanical approaches to opening, latching, unlatching, and closing non-neighboring odd-numbered gates 111 and 113.

Figure 15:
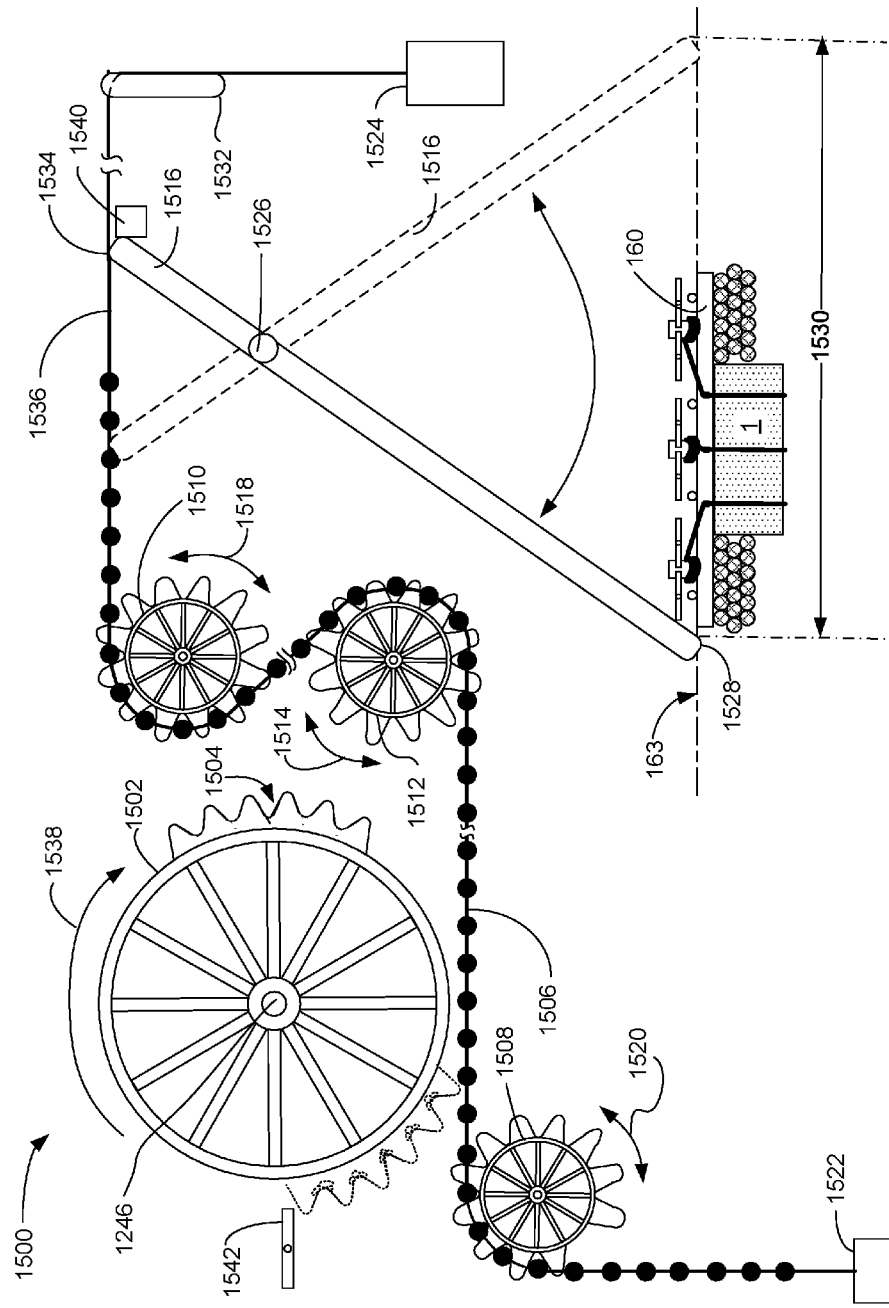
FIG. 15 is a diagrammatic side elevation view illustrating an exemplary floating body mover of the exemplary embodiment of the Herodotus machine of FIG. 1A, FIG. 12A, and FIG. 14 in an exemplary position, according to a preferred embodiment of the present invention.

FIG. 15 is a diagrammatic side elevation view illustrating an exemplary floating body mover 1500 of the exemplary embodiment of the Herodotus machine 100 of FIG. 1A, FIG. 12A, and FIG. 14 in an exemplary position, according to a preferred embodiment of the present invention. Floating body mover 1500 is synchronized with reciprocating gears 120-124, odd-numbered gate actuator 1400, and even-gate actuator 1600 (see FIG. 16) by virtue of having the same main drive gear 1202. Floating body mover timing gear 1502 is fixed to gate drive timing axle 1246 and rotates at a uniform rate in one direction 1538. Floating body mover timing gear 1502 has six teeth 1504, which is sufficient to rotate upper and lower alignment idler gears 1510 and 1512 to move lever 1516 from its ready position (solid lines) to its extended position (dashed lines). The ready position of lever 1516 is preferably with the tip of long end 1528 partially submerged at the maximum water level 163 of the exemplary lock 105, as shown. Upper and lower alignment idler gears 1510 and 1512 rotate freely (1518 and 1514, respectively) and are used to raise floating body mover rope chain 1506 to the necessary height and alignment with top end 1534 of lever 1516. Lever 1516 rotates about a pivotal fulcrum 1526 when top end 1534 of lever 1516 is pulled by floating body mover rope chain 1506 due to engagement of floating body mover timing gear teeth 1504 with floating body mover rope chain 1506. The rotational position of floating body mover timing gear 1502 is shown in its correct phase relative to odd-gate timing gear 1402 and even-gate timing gear 1602 (see FIG. 16) all of which are fixed to gate drive timing axle 1246, which is one hundred thirty-five degrees lagging out of phase with main drive gear 1202 (see FIG. 18). Immediately after floating body mover timing gear teeth 1504 complete engagement with floating body mover rope chain 1506 (floating body mover timing gear teeth 1504 shown in dotted lines at that point), the lead tooth engages open gates latch release trigger 1542 which is connected by mechanical linkage (not shown) to unlatch gates 110-114 by releasing counterweights 1424 and 1624 (see FIG. 16). Any gates 110-114 that are not latched open, when the lead tooth engages open gates latch release trigger 1542, are unaffected. Because lever 1516 does not extend beyond any gate 110-114, any open gates 110-114 may be closed while lever 1516 is returning to its ready position. Latches on non-neighboring gates 110, 112, and 114 are also released, but with no effect, as non-neighboring gates 110, 112, and 114 are already closed.

Tensioner idler gear 1508 rotates freely 1520 and engages floating body mover rope chain 1506 to suspend a tensioner weight 1522 that keeps floating body mover rope chain 1506 aligned and positioned to be engaged by floating body mover timing gear 1502 when floating body mover timing gear teeth 1504 are not engaged with mover rope chain 1506. Floating body mover rope chain 1506 is of one piece with rope 1536 beginning at a point were engagement of floating body mover rope chain 1506 with upper alignment idler gear 1510 no longer occurs. Rope 1536 is attached to top end 1534 of lever 1516 and to each such lever in each lock 105-108. Rope 1536 threads over pulley 1532 (which may be a lubricated groove in a wooden block) and ends in a counterweight 1524 for returning lever 1516, and all other levers, to the ready position. Floating body mover 1500 has no clutch, and so activates twice for every one rotation of main drive gear 1202: once after odd-gate timing gear 1402 completes engagement and again after even-gate timing gear 1602 completes engagement.

In operation, for example, three-capstan quarry barge 160 rises in lock 105 with water level 163 to within reach of lever 1516. As the floating body mover rope chain 1506 pulls lever top end 1534, lever 1516 rotates about pivotal fulcrum 1526 such that the long end 1528 moves into engagement with three-capstan quarry barge 160 to push three-capstan quarry barge 160 distance 1530 and through gate 111 into lock 106. When, via further rotation of floating body mover timing gear 1502, teeth 1504 disengage with floating body mover rope chain 1506, counterweight 1524 controls, descending to pull lever 1516 back to its ready position. While lever 1516 is moving back to its ready position, momentum carries three-capstan quarry barge 160 further into lock 106. When lever 1516 returns to its ready position, lever 1516 engages reciprocating gear unlatch trigger 1540, unlatching reciprocating gears 120-124. Lever 1516 operates similarly when non-neighboring even-numbered gates 110, 112, and 114 are open. Those of skill in the art, enlightened by the present disclosure, will be aware of many devices which can move a floating body through a canal. All such devices which meet the functional requirements as to input and output are within the scope of the present invention.

Figure 16:
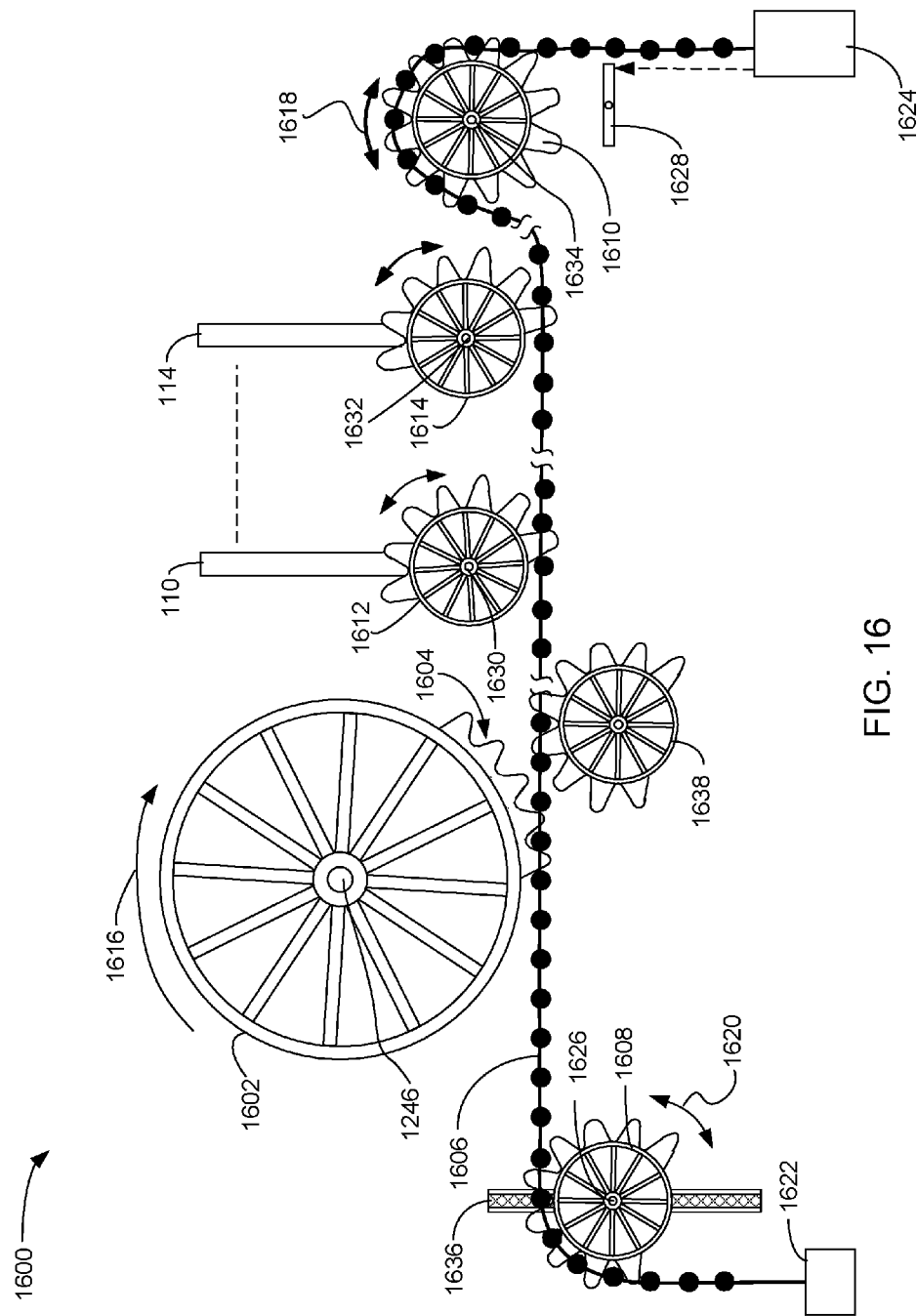
FIG. 16 is a diagrammatic side elevation view and partial plan view illustrating an exemplary even-gate actuator of the exemplary embodiment of the Herodotus machine of FIG. 1A, FIG. 12A, FIG. 14, and FIG. 15 in an exemplary position, according to a preferred embodiment of the present invention.

FIG. 16 is a diagrammatic side elevation view and partial plan view illustrating an exemplary even-gate actuator 1600 of the exemplary embodiment of the Herodotus machine 100 of FIG. 1A, FIG. 12A, FIG. 14, and FIG. 15 in an exemplary position, according to a preferred embodiment of the present invention. Even-gate actuator 1600 opens and closes a subset of non-neighboring gates 110, 112, and 114 of the gates 110-114. Even-gate timing gear 1602 is fixed to gate drive timing axle 1246 and rotates uniformly in one direction 1616. Even-gate timing gear 1602 has five even-gate timing gear teeth 1604, which are sufficient to rotate gate control gears 1612 and 1614 enough to open gates 110 and 114, respectively. Gate 112 is also opened by this action, with its own gate control gear, which is omitted due to limited drawing space. Tensioner idler gear 1608 rotates freely 1620 on axle 1626, engaging even-gate timing rope chain 1606 to maintain alignment of even-gate timing rope chain 1606 to even-gate timing gear 1602 when even-gate timing gear teeth 1604 are not engaged with even-gate timing rope chain 1606. Clutch 1636 moves tensioner idler gear 1608 downward to prevent even-gate timing gear 1602 from engaging even-gate timing rope chain 1606 when odd-gate timing gear 1402 (see FIG. 14) is engaged to odd-gate timing rope chain 1406 to open non-neighboring odd gates 111 and 113, thereby preventing all gates 110-114 from opening at once. Clutch 1636 activates at step 1304 and releases when step 1306 is complete. Idler gear 1638 rotates freely to isolate gate control gears 1612, 1614 from clutch 1636. Tensioner weight 1622 is suspended from one end of even-gate timing rope chain 1606 to maintain tension on the even-gate timing rope chain 1606 so that even-gate timing gear teeth 1604 can engage when even-gate timing gear 1602 rotates in direction 1616 through the engagement position. When the even-gate timing gear teeth 1604 finish engaging even-gate timing rope chain 1606, counterweight 1624 has ascended to activate even-gate latch 1628, which latches the counterweight 1624 and so prevents the non-neighboring even-numbered gates 110, 112, and 114 from closing until the latch is released after the three-capstan quarry barge 160 has been moved through a non-neighboring even-numbered gate 110 or 114. Gate control gears 1612 and 1614 as well as gates 110 and 114 are shown in top plan view. Gate control gear 1614 is fixed to vertical axle 1632 that is fixed to a gate pivot, similar to gate pivot 406. Gate control gears 1612 and 1614 have no more teeth than are needed to open the non-neighboring odd-numbered gates 110, 112, and 114, respectively. Gate control gear 1612 is fixed to vertical axle 1630 that is also fixed to a gate pivot (not shown) for gate 110. All gate control gears are configured similarly to gate control gear 1614. A ninety degree twist in even-gate timing rope chain 1606 is required to transition from vertically-oriented even-gate timing gear 1602 to horizontally oriented gate control gears 1612 and 1614, etc., which is easily accomplished with an even-gate timing rope chain 1606. Even-gate closing counterweight 1624 is suspended on even-gate timing rope chain 1606 over terminal idler gear 1610 which is freely rotating 1618 on axle 1634, is heavier than tensioner weight 1622, and will pull the even-gate timing rope chain 1606 to close the non-neighboring even-numbered gates 110, 112, and 114, as shown. Those of skill in the art, enlightened by the present disclosure, will be aware of other mechanical approaches to opening, latching, unlatching, and closing non-neighboring even-numbered gates 110, 112, and 114, which perform the functions and are within the scope of the present invention.

Those of skill in the art, enlightened by the present disclosure, will be aware of many devices which can control the opening and closing of gates in synchronization with a reciprocating gear driver 1200. All such devices which meet the functional requirements as to input and output are within the scope of the present invention.

Figure 17:
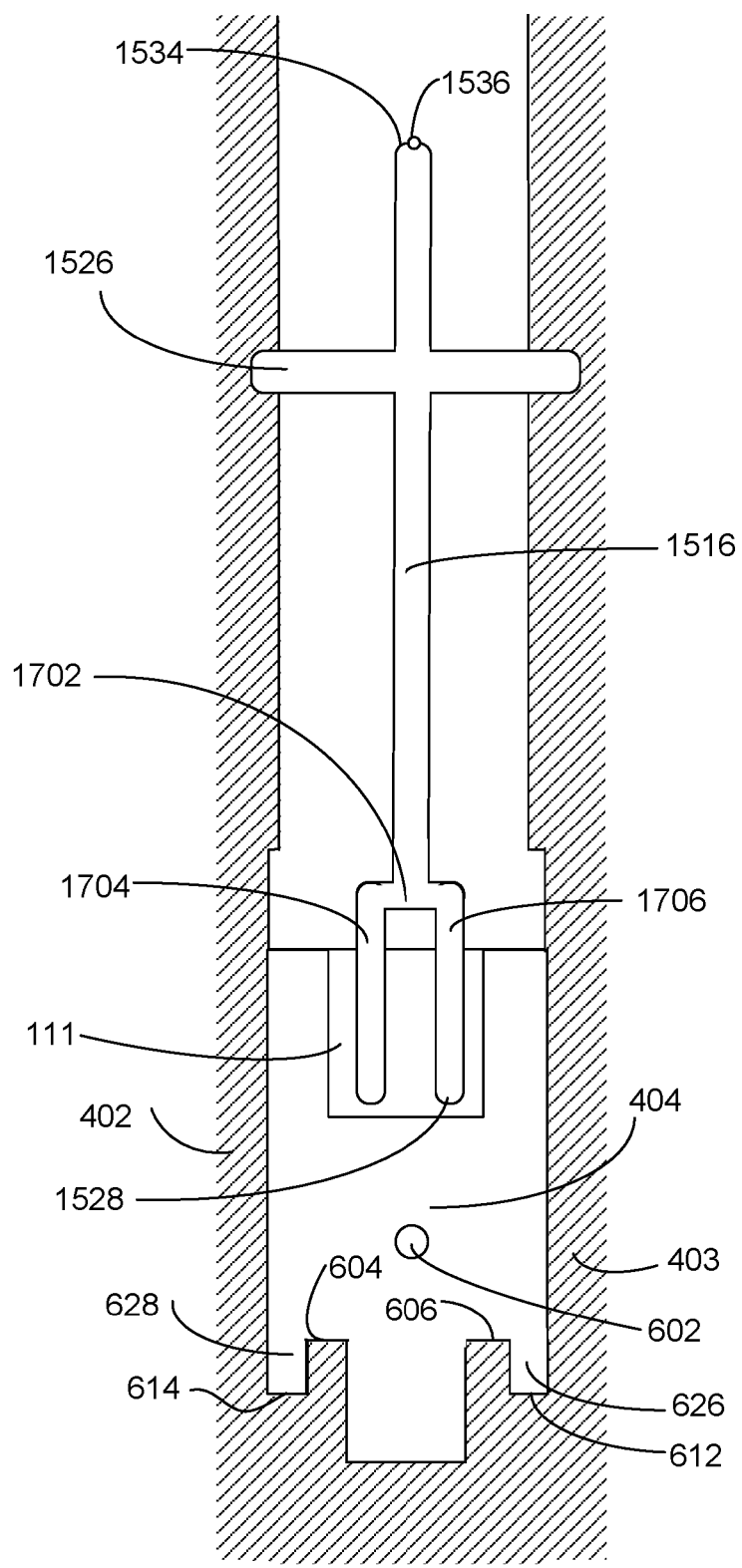
FIG. 17 is a diagrammatic front elevation view illustrating an exemplary floating body mover of the exemplary embodiment of the Herodotus machine of FIG. 1A in an exemplary position, according to a preferred embodiment of the present invention.

FIG. 17 is a diagrammatic front elevation view illustrating an exemplary floating body mover 1500 of the exemplary embodiment of the Herodotus machine 100 of FIG. 1A in an exemplary position, according to a preferred embodiment of the present invention. Pivotal fulcrum 1526 is exemplified as a rotatable cross bar 1526 with lever 1516 extending above to top end 1534 and below to long end 1528. Lever 1516 has a fork 1702 with two parallel spaced-apart prongs 1704 and 1706, which reduce yaw motion of the three-capstan quarry barge 160 while it is being pushed. Lever 1516 is shown at the extended position.

Figure 18:
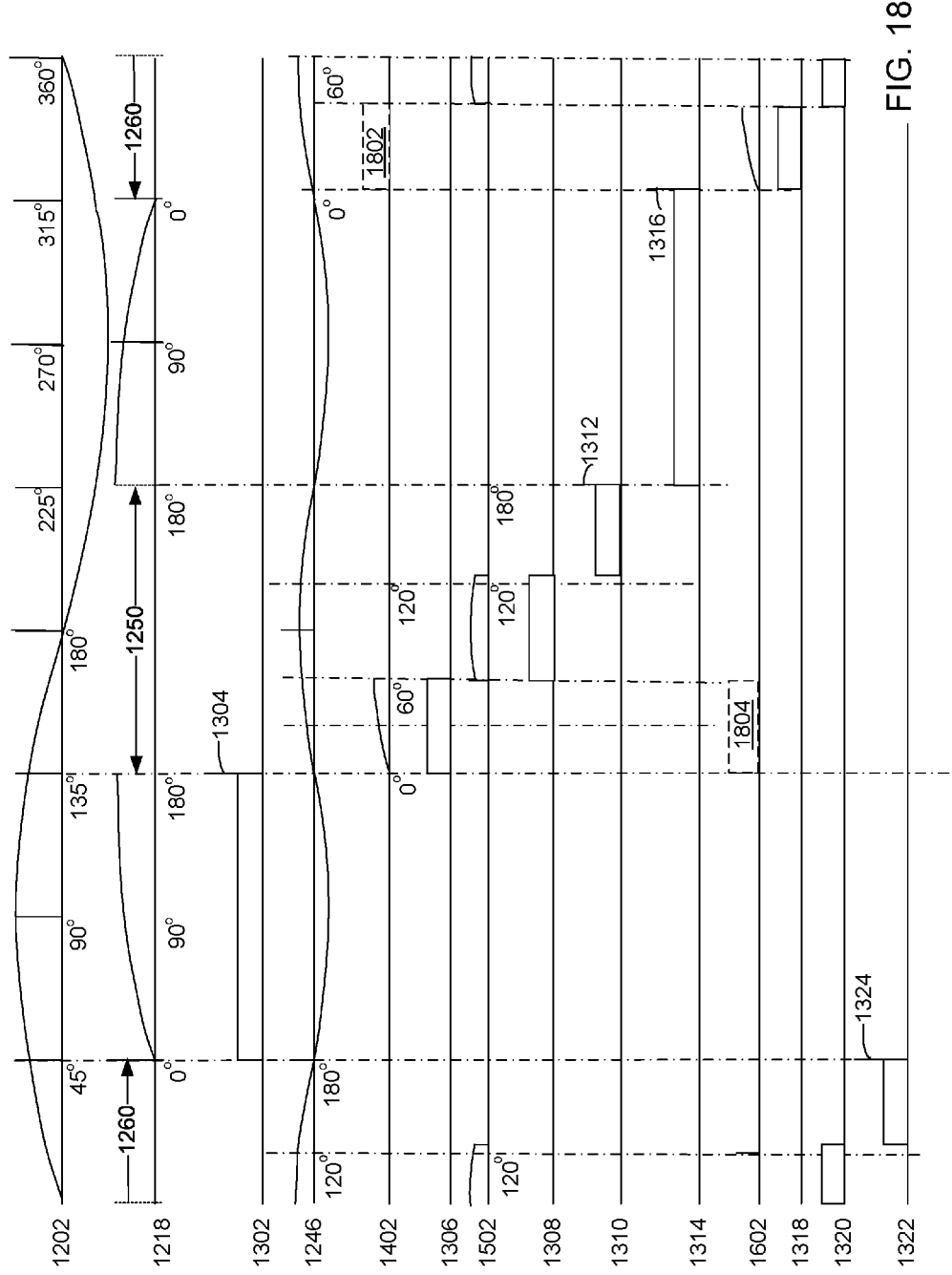
FIG. 18 is a mechanical and step timing diagram illustrating the timing relationships of the motion of parts of the Herodotus machine of FIGS. 12A-16, according to a preferred embodiment of the present invention.

FIG. 18 is a mechanical and step timing diagram illustrating the timing relationships of the motion of parts 1202, 1218, 1246, 1402, 1502, and 1602 of the Herodotus machine 100 of FIGS. 1A-1I, and 12A-16, according to a preferred embodiment of the present invention. Numbers to the left of each line indicate the step reference number from FIG. 13 or the part reference number from FIGS. 12A-12I and 14-16. Beginning at the top, the step and timing diagram of FIG. 18 covers one full rotation of main drive gear 1202. The zero degree point for main drive gear 1202 is shown in FIG. 12A. Gate drive timing axle 1246 rotates at a two-to-one ratio to main drive gear 1202. Gears 1402, 1502, and 1602 rotate with gate drive timing axle 1246, but only the portions of the rotation involving engagement are illustrated in FIG. 18. Gate drive timing axle 1246 is one hundred thirty-five degrees lagging out of phase with main drive gear 1202.

For the first interval of forty-five degrees of rotation of main drive gear 1202, intermediate gear 1218 is unmoving during timing gap 1260, as shown in FIGS. 12A and 12B. Gate drive timing axle 1246 is rotating at a two-to-one ratio to main drive gear 1202 and rotates from ninety degrees to one hundred eighty degrees in the first interval. Floating body mover timing gear 1502 completes its engagement with floating body mover rope chain 1506, thereby completing step 1320. Step 1322, closing non-neighboring even-numbered gates 110, 112, and 114, is performed by counterweight 1624. The unlatching of reciprocating gears 120-124 in step 1324 occurs as counterweight 1524 returns lever 1516 to its ready position and engages reciprocating gear unlatch trigger 1540. Odd-gate and even-gate timing gears 1402 and 1602, respectively, are not yet engaged.

For the second interval of an additional ninety degrees of rotation of main drive gear 1202, intermediate gear 1218 rotates one hundred eighty degrees thereby performing steps 1302 (rotate reciprocating gears 120-124) and 1304 (latch reciprocating gears 120-124). Timing gears 1402, 1502, and 1602 are not engaged.

For the third interval of an additional ninety degrees of rotation of main drive gear 1202, intermediate gear 1218 is motionless in timing gap 1250 while gate drive timing axle 1246 rotates one hundred eighty degrees. For the first sixty degrees of gate drive timing axle 1246 rotation, odd-gate timing gear 1402 rotates while engaging odd-gate timing rope chain 1406 to perform step 1306, opening non-neighboring odd-numbered gates 111 and 113. Even-gate timing gear 1602 is disengaged 1804 by clutch 1636 to prevent all gates 110-114 from opening at once. Subsequently, floating body mover timing gear 1502 rotates sixty-five degrees while engaging floating body mover rope chain 1506 to perform step 1308. Step 1310 allows unlatched counterweight 1424 to close non-neighboring odd-numbered gates 111 and 113 and step 1312 unlatches all reciprocating gears 120-124.

For the fourth interval of an additional ninety degrees of rotation of main drive gear 1202, intermediate gear 1218 rotates back one hundred and eighty degrees, performing steps 1314 (rotate reciprocating gears 120-124 in the other direction) and step 1316 (latch reciprocating gears 120-124). Gears 1402, 1502, and 1602 are not engaged.

For the fifth interval of an additional forty-five degrees of rotation of main drive gear 1202, intermediate gear 1218 is unmoving during timing gap 1260 as main drive gear 1202 rotates from three hundred fifteen degrees to forty-five degrees, as shown in FIGS. 12H through 12B. During the next sixty degrees of rotation of gate drive timing axle 1246, even-gate timing gear 1602 rotates sixty degrees to perform step 1318 (open non-neighboring even-numbered gates 110, 112, and 114) while odd-gate timing gear 1402 is disengaged 1802 by clutch 1436 to avoid opening all of the gates 110-114 at once. Floating body mover timing gear 1502 rotates sixty-five degrees to engage floating body mover rope chain 1506 to push three-capstan quarry barge 160 through even gate 110, 112, or 114 to accomplish step 1320. Non-neighboring even gates 110, 112, and 114 are unlatched and closed in step 1322 and reciprocating gears are unlatched in step 1324.

Figure 19:
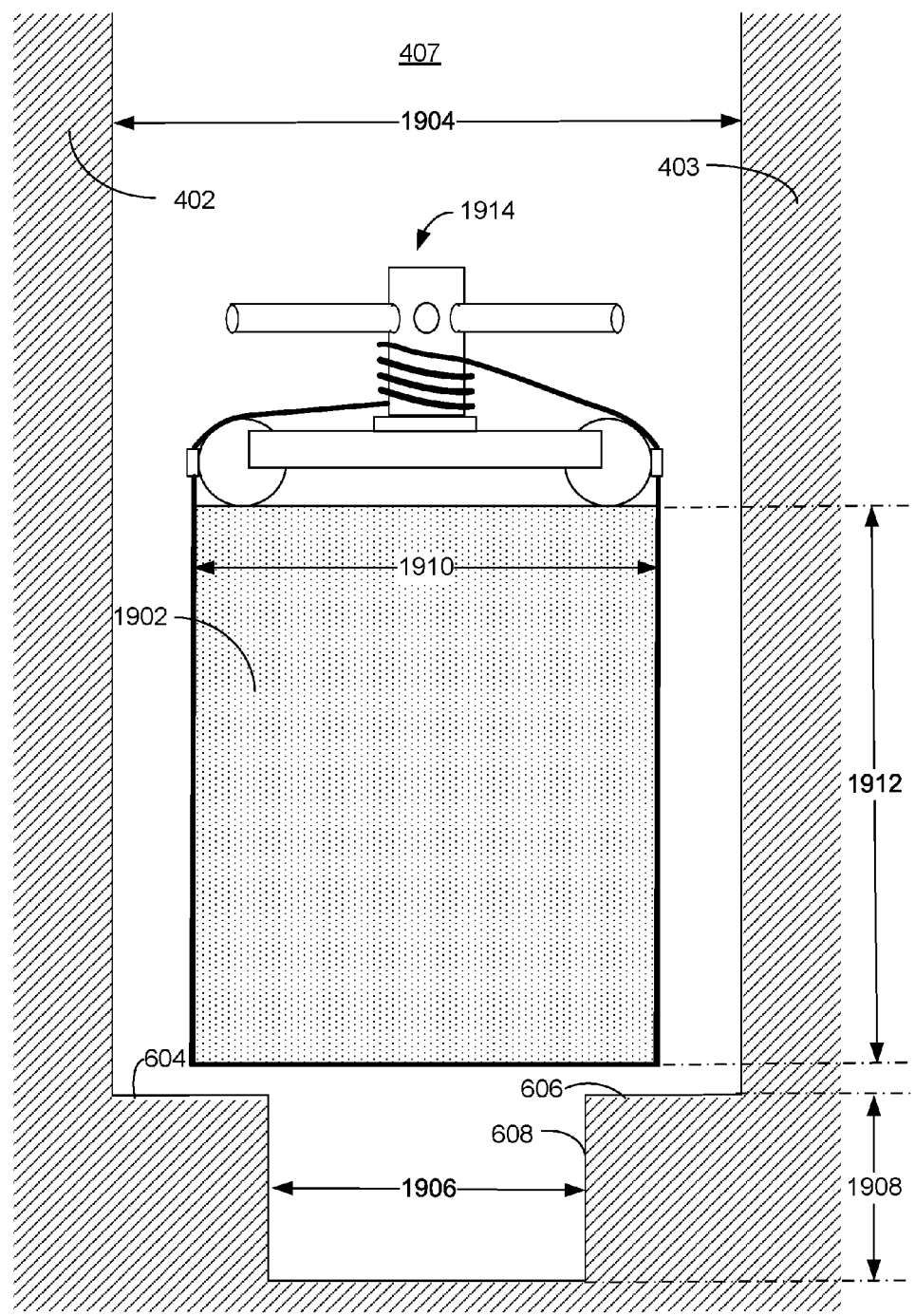
FIG. 19 is a transverse cross-sectional view of the Grand Gallery shown to scale with a larger stone, according to a preferred embodiment of the present invention.

FIG. 19 is a transverse cross-sectional view of the Grand Gallery shown to scale with a larger stone 1902, according to a preferred embodiment of the present invention. The canal 407 is about six feet and nine inches in width 1904, with a centrally aligned channel 608 three feet and five inches in width 1906 and two feet in depth 1908. Opposed, spaced-apart stone shoulders 604 and 606 extend one foot and eight inches from the top sides of the centrally aligned channel 608. The larger stone 1902 is five feet in width 1910 and six feet in height 1912 and is shown with a larger three-capstan quarry barge 1914 but without the necessary short logs 312, for simplicity of the drawing. Larger stone 1902 is five feet long, putting larger stone 1902 near the upper range for unspecialized pyramid stones. While requiring a large gate, it can still fit in the Grand Gallery with room to spare. Preferably, larger stone 1902 may be carried close to wall 402 with the large displacers 851, 852, and 853, etc., close to wall 403, and gates 110-114 that have pivots, such as pivots 405 and 406, close to wall 402. While this shows a tight fit between larger stone 1902 and walls 402 and 403, it should be remembered that stone sizes decrease in higher courses of stone in the Great Pyramid, and the need to move a stone this size in the Grand Gallery may not have arisen.

Figure 20:
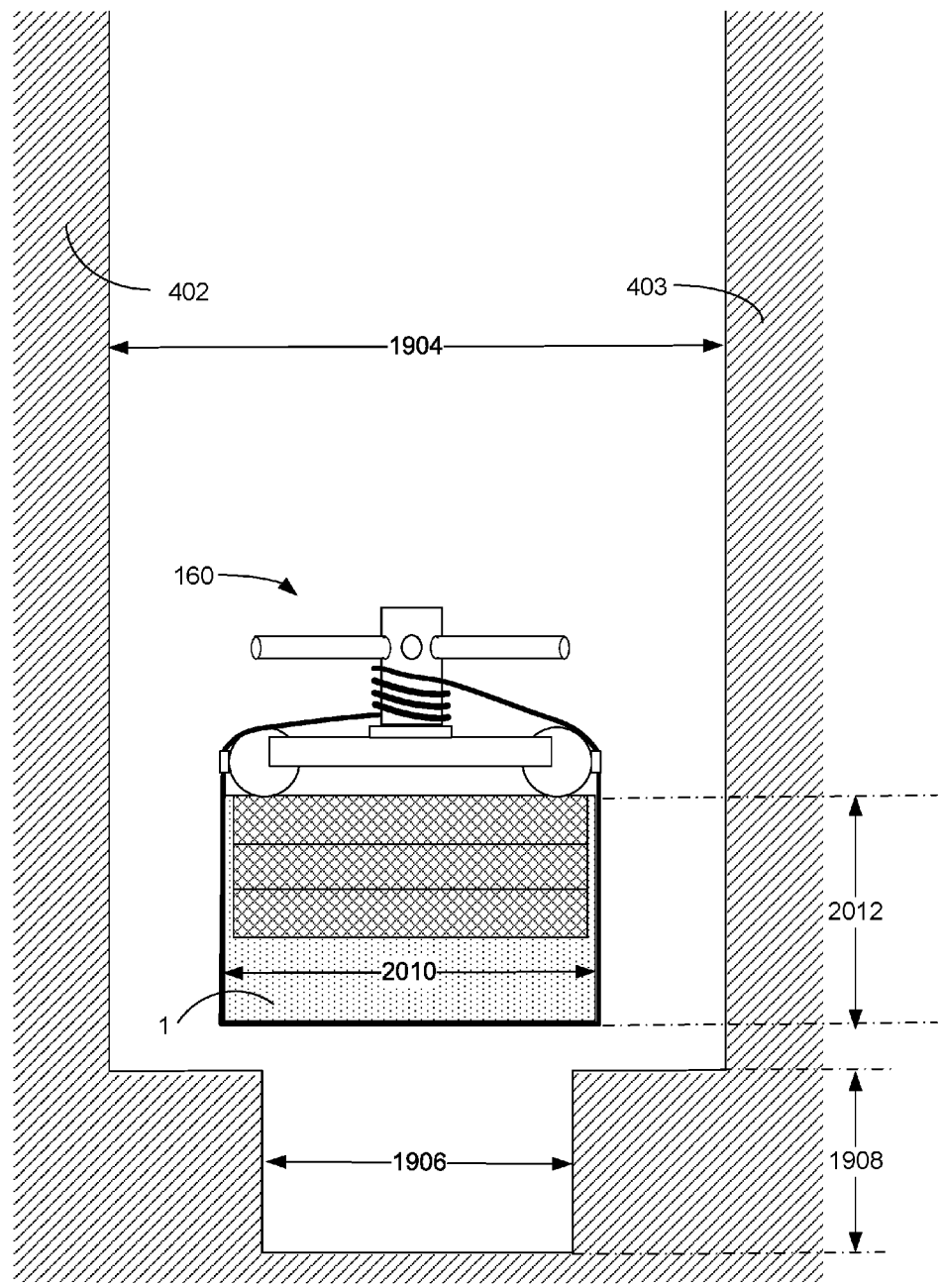
FIG. 20 is a transverse cross-sectional view of the Grand Gallery shown to scale with the three-capstan quarry barge carrying the cinched stone of FIGS. 3A-3C, according to a preferred embodiment of the present invention.

FIG. 20 is a transverse cross-sectional view of the Grand Gallery shown to scale with the three-capstan quarry barge 160 carrying the cinched stone 1 of FIGS. 3A-3C, according to a preferred embodiment of the present invention. Stone 1 weighs 2.5 tons and has a width 2010 of four feet and two inches and a height 2012 of two feet and four inches. Any of the displacer configurations of FIG. 4, FIG. 8A, FIG. 8B, additional configurations described above, and hybrids thereof may be used with three-capstan quarry barge 160 in the Grand Gallery.

Figure 21:
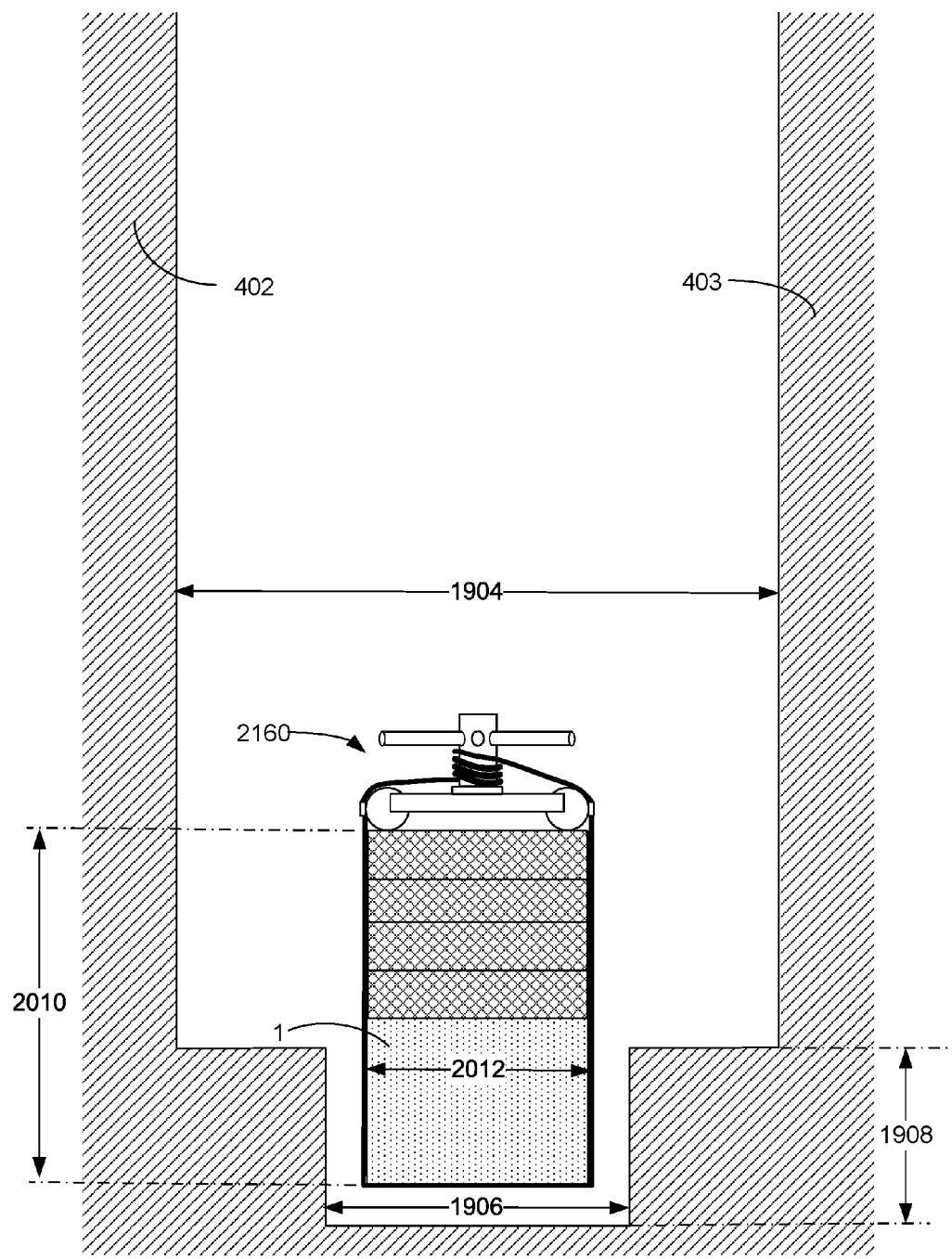
FIG. 21 is a transverse cross-sectional view of the Grand Gallery shown to scale with a three-capstan quarry barge carrying cinched stone of FIGS. 3A-3C in a rotated orientation, according to a preferred embodiment of the present invention.

FIG. 21 is a transverse cross-sectional view of the Grand Gallery shown to scale with a three-capstan quarry barge 2160 carrying cinched stone 1 of FIGS. 3A-3C in a rotated orientation, according to a preferred embodiment of the present invention. The stone 1 is oriented with its narrow sides at the top and bottom, with a narrower three-capstan quarry barge 2160 to provide more room for displacers 150-157 and to make use of the lower channel 608, as shown.

Figure 22:
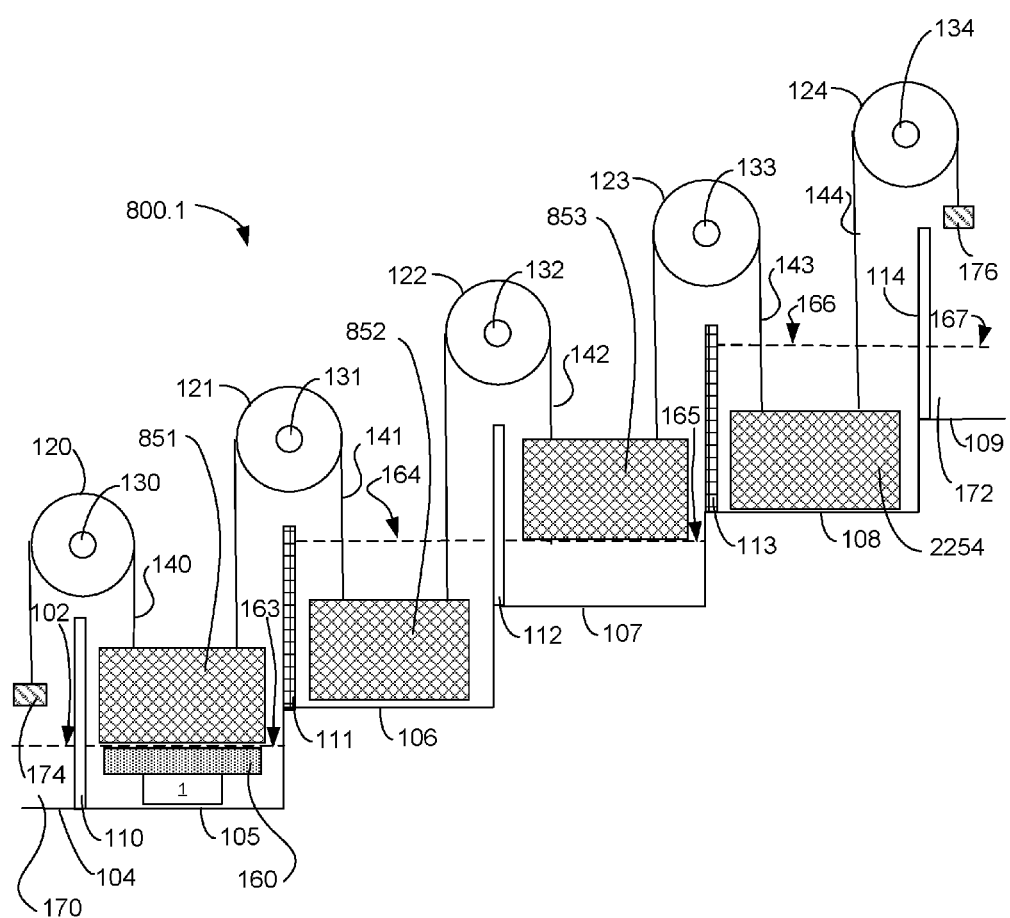
FIG. 22 is a diagrammatic elevation view illustrating the third exemplary embodiment of the Herodotus machine of FIG. 8B in a first position, according to a preferred embodiment of the present invention.

FIG. 22 is a diagrammatic elevation view illustrating the third exemplary embodiment of the Herodotus machine 800.1 of FIG. 8B in a first position, according to a preferred embodiment of the present invention. The fourth large displacer 2254, not shown in FIG. 8B, is shown here. From the initial state shown, the further operation of Herodotus machine 800.1 can be inferred by reference to FIGS. 1A-1I, 13, and 18.

Figure 23:
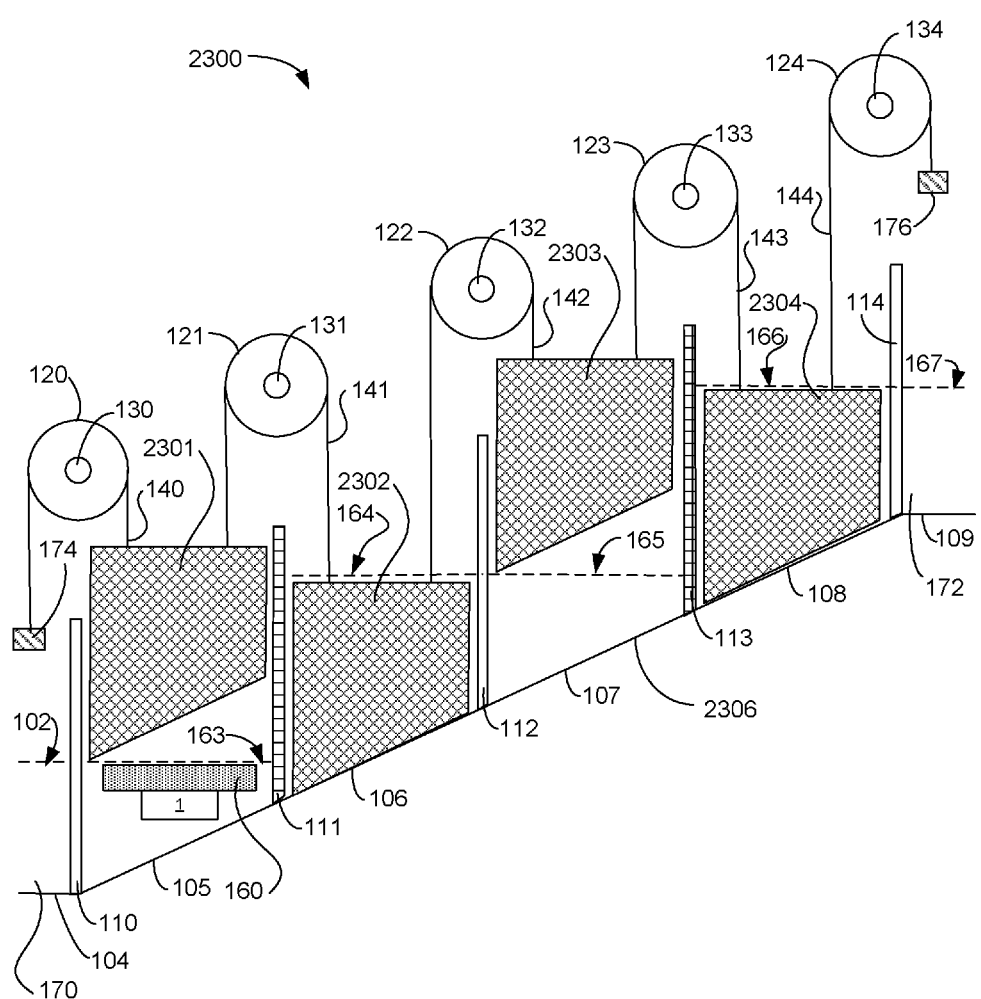
FIG. 23 is a diagrammatic side elevation view illustrating a fifth exemplary embodiment of an Herodotus machine in a first position, according to a preferred embodiment of the present invention.

FIG. 23 is a diagrammatic side elevation view illustrating a fifth exemplary embodiment of an Herodotus machine 2300 in a first position, according to a preferred embodiment of the present invention. Herodotus machine 2300 has a continuously inclined floor 2306 and large, shape-adapted displacers 2301, 2302, 2303, and 2304. The floor 2306 is inclined at an angle more representative of the Grand Gallery. In a preferred embodiment, Herodotus machine 2300 has displacers 2301-2304 shown, on both right and left sides of the centrally aligned channel in each lock 105-108 for lifting a three-capstan quarry barge 2160 of FIG. 21 carrying under-cinched stone 1. From the initial state shown, the further operation of Herodotus machine 2300 can be inferred by reference to FIGS. 1A-1I, 13, and 18.

Figure 24:
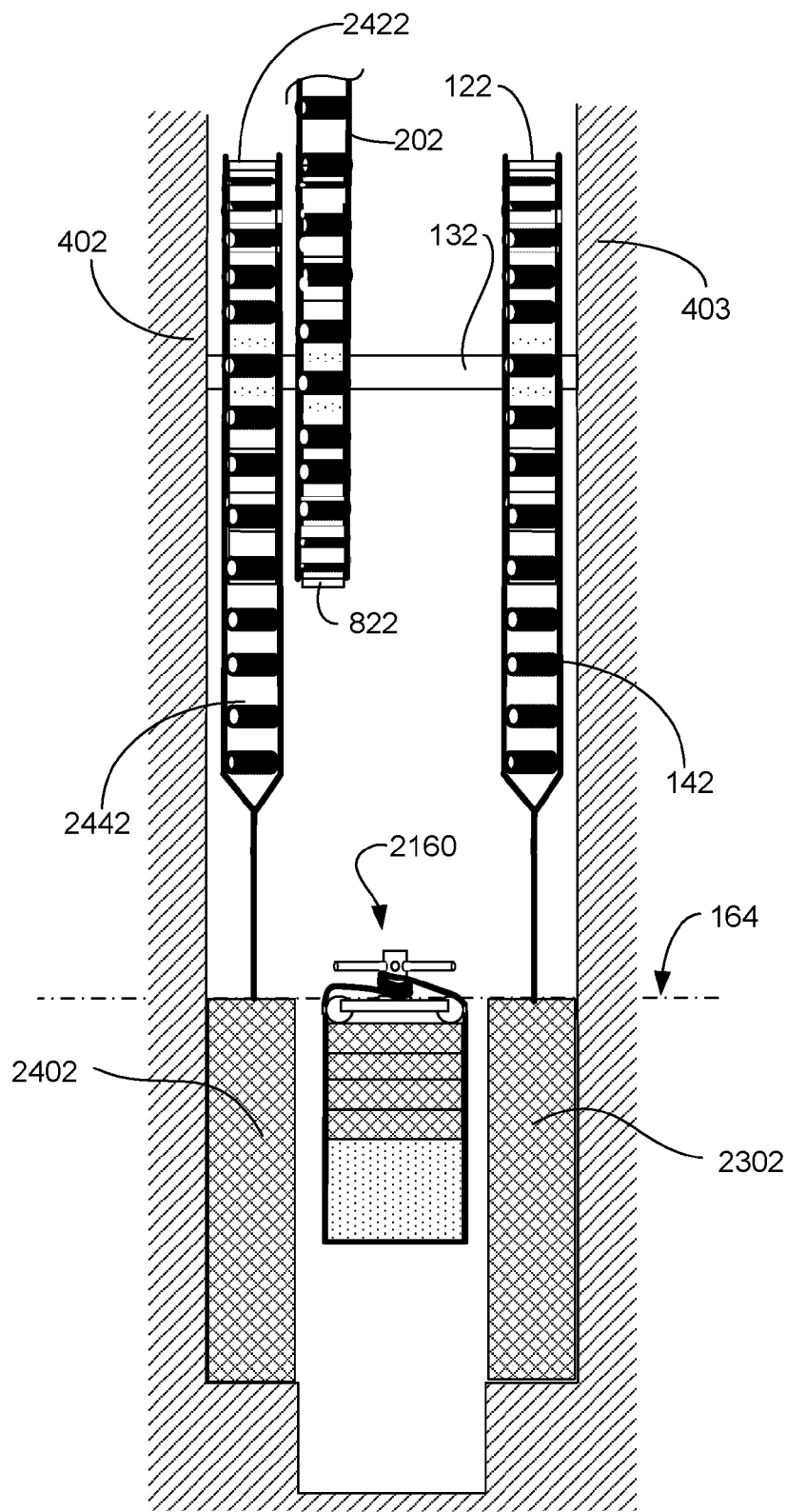
FIG. 24 is a diagrammatic side elevation view illustrating the fifth exemplary embodiment of an Herodotus machine of FIG. 23 in the first position, according to a preferred embodiment of the present invention.

FIG. 24 is a diagrammatic front elevation view illustrating the fifth exemplary embodiment of the Herodotus machine 2300 of FIG. 23 in the first position, according to a preferred embodiment of the present invention. Displacer 2302 is shown in its lowest position, almost in contact with shoulder 606. Displacer 2302 is suspended from reciprocating gear 122 by rope chain 142. Displacer 2402 is shown in its lowest position, almost in contact with shoulder 604. Displacer 2402 is suspended from reciprocating gear 2422 by rope chain 2442. Reciprocating drive gear 822 is driven by drive rope chain 202. Reciprocating drive gear 822 is positioned off center to accommodate floating body mover 1500 (see FIG. 15). Reciprocating gear 122, reciprocating gear 2422, and reciprocating drive gear 822 are all fixed to reciprocating gear axle 132 which rotates in bearings 1102 and 1104

(see FIG. 11). By the lowering of displacers 2302 and 2402, three-capstan quarry barge 2160 has been lifted to upper water level 164.

While the illustrated embodiments are focused on purely mechanical Herodotus machines 100, 800, 800.1, and 2300, the invention is not so limited. For example, a modern embodiment would use motors for the reciprocating gears, the gate openers, and the floating body movers, all under control of a central electronic controller. For another example, an Herodotus machine could be used in a theme park to raise passenger boats for a water slide ride or used for lifting small pleasure craft boats to a secure reservoir to discourage theft. For yet another example, an Herodotus machine could be used to lift fingerling salmon over a hydroelectric dam and into descending salmon locks on their way downstream to the sea. In an agricultural embodiment, an Herodotus machine could be used to pump irrigation water up from a river during the growing season, and used to lower boats, loaded with harvested crops, into the river at harvest.

I claim:

1. A bottom-source, up stair, hybrid pump and step lock system comprising:
    a. a first plurality of gates delineating a second plurality of ascending adjacent step locks;
    b. a first plurality of reciprocating cross-gate displacer devices, each aligned to a respective gate of said first plurality of gates; and
    c. a synchronization apparatus coupled to said first plurality of reciprocating cross-gate displacer devices.

2. The system of claim 1, wherein said gates are commonly synchronized.

3. The system of claim 1, comprising a commonly synchronized floating body mover within each said step lock of said second plurality of ascending adjacent step locks.

4. A system for lifting a floating body with water, comprising:
    a. a plurality of ascending adjacent step locks;
    b. a lowest step lock of said plurality of ascending adjacent step locks adapted and operable to receive said floating body from a water source having a water level higher than a floor of said lowest step lock;
    c. an uppermost step lock of said plurality of ascending adjacent step locks adapted and operable to provide said floating body to a reservoir having a water level higher than a floor of said reservoir;
    d. a plurality of gates installed with a respective gate of said plurality of gates between:
        i. each two adjacent step locks of said plurality of ascending adjacent step locks;
        ii. said water source and said lowest step lock; and
        iii. said water reservoir and said uppermost step lock;
    e. a plurality of reciprocating gears with a respective reciprocating gear of said plurality of reciprocating gears:
        i. supported above each said gate of said plurality of gates; and
        ii. mounted on an axle parallel to and aligned to each said gate of said plurality of gates;
    f. a plurality of chains with a respective chain of said plurality of chains:
        i. supported on at least one respective said reciprocating gear of said plurality of reciprocating gears;
        ii. engaging said at least one respective reciprocating gear of said plurality of reciprocating gears; and
        iii. comprising opposed downstream and upstream ends extending below said at least one respective said reciprocating gear of said plurality of reciprocating gears;
    g. a downstream counterweight suspended from said downstream end of said chain engaged with said reciprocating gear above said gate between said lowest step lock and said water source;
    h. an upstream displacer suspended from said upstream end of said chain engaged with said reciprocating gear above said lowest step lock;
    i. an upstream counterweight suspended from said upstream end of said chain engaged with said reciprocating gear above said gate between said uppermost step lock and said reservoir;
    j. a downstream displacer suspended from said downstream end of said chain on said reciprocating gear above said gate between said uppermost step lock and said reservoir;
    k. downstream and upstream displacers suspended from respective downstream and upstream ends of each said chain on each respective said reciprocating gear between said lowest step lock and said uppermost step lock.

5. The system of claim 4, comprising a reciprocating drive gear on each said axle operable to drive each respective said at least one reciprocating gear mounted on said each axle.

6. The system of claim 5, comprising a synchronization apparatus adapted to make neighboring said reciprocating drive gears rotate in opposite directions.

7. The system of claim 6, comprising a reciprocating drive:
    a. coupled to said synchronization apparatus;
    b. adapted to rotate said drive gears in a first rotation direction and then in an opposite second rotation direction;
    c. adapted to stop rotating after said first rotation for a period of time long enough to:
        i. open a first subset of non-neighboring said gates of said plurality of gates;
        ii. move at least one said floating body through at least one of said open gates of said first subset of said non-neighboring gates; and
        iii. close said first subset of said non-neighboring gates;
    d. adapted to stop rotating after said second rotation for a period of time long enough to:
        i. open a second subset of non-neighboring said gates exclusive of said first subset of said non-neighboring gates;
        ii. move at least one said floating body through at least one of said open gates of said second subset of said non-neighboring gates; and
        iii. close said second subset of said non-neighboring gates.

8. The system of claim 7, wherein said displacers are sized to:
    a. make water levels in first pairs of adjacent step locks equal at an end of said first rotation; and
    b. make water levels in second pairs of adjacent step locks, exclusive of said first pairs of adjacent step locks, equal at an end of said second rotation.

9. The system of claim 7, comprising a first gate drive:
    a. synchronized to said reciprocating drive;
    b. adapted to open said first subset of gates;
    c. adapted to hold said first subset of gates open while said at least one floating body is moved through at least one respective open gate of said first subset of gates;

d. adapted to close said first subset of gates after said at least one floating body has moved through at least one open gate of said first subset of gates.

10. The system of claim 7, comprising a second gate drive:
   a. synchronized to said reciprocating drive;
   b. adapted to open said second subset of non-neighboring gates;
   c. adapted to hold said second subset of non-neighboring gates open while said at least one floating body is moved through at least one open gate of said second subset of non-neighboring gates;
   d. adapted to close said second subset of non-neighboring gates after said at least one floating body has moved through said at least one open gate of said second subset of non-neighboring gates.

11. The system of claim 7, comprising a floating body driver:
   a. synchronized to said reciprocating drive; and
   b. adapted to move at least one said floating body through said at least one open gate of one of said first and second subsets of gates.

12. The system of claim 4, comprising:
   a. an ascending step lock channel having opposed spaced-apart parallel walls;
   b. a plurality of gate support panels, each extending between, and sealing to, said walls;
   c. wherein each said gate of said plurality of gates is supported in, and seals to when closed, a respective said gate support panel, thereby forming a gate and panel assembly; and
   d. wherein each said gate opens toward one of:
      i. an adjacent upper said step lock;
      ii. said reservoir; and
      iii. upward toward said reciprocating gear axle.

13. The system of claim 12, wherein each said gate and panel assembly is arcuate and convex toward one of an adjacent upper said step lock and said reservoir.

14. The system of claim 12, comprising a one-way valve in at least one of said gate support panel and said gate of each said gate and panel assembly.

15. A bottom-source, up stair, hybrid pump and step lock system comprising:
   a. a first plurality of synchronized reciprocating cross-gate displacer devices;
   b. a first plurality of commonly synchronized gates delineating a second plurality of ascending adjacent step locks, wherein said first plurality of commonly synchronized gates are aligned to respective said synchronized reciprocating cross-gate displacer devices of said first plurality of synchronized reciprocating cross-gate displacer devices; and
   c. a synchronization apparatus:
      i. coupled to said first plurality of synchronized reciprocating cross-gate displacer devices; and
      ii. adapted to make neighboring reciprocating drive gears of said reciprocating cross-gate displacer devices rotate in opposite directions.

16. The system of claim 15, comprising a second plurality of commonly synchronized floating body movers, each within a respective step lock of said second plurality of ascending adjacent step locks.

17. The system of claim 16, comprising a reciprocating drive:
   a. coupled to said synchronization apparatus;
   b. adapted to rotate said drive gears in a first rotation in a first direction and then in a second rotation in a second opposite direction;
   c. adapted to stop rotating after said first rotation for a period of time long enough to:
      i. open a first subset of non-neighboring said gates of said plurality of gates;
      ii. move at least one said floating body through at least one of said open gates of said first subset of said non-neighboring gates; and
      iii. close said first subset of said non-neighboring gates;
   d. adapted to stop rotating after said second rotation for a period of time long enough to:
      i. open a second subset of non-neighboring said gates exclusive of said first subset of said non-neighboring gates;
      ii. move at least one said floating body through at least one of said open gates of said second subset of said non-neighboring gates; and
      iii. close said first subset of said non-neighboring gates.

18. The system of claim 16, wherein a third plurality of displacers of said first plurality of synchronized reciprocating cross-gate displacer devices are sized to:
   a. make water levels in first pairs of adjacent step locks equal at an end of said rotation in said first direction; and
   b. make water levels in second pairs of adjacent step locks, exclusive of said first pairs of adjacent step locks, equal at an end of said rotation in said second direction.

19. The system of claim 17, comprising:
   a. a first gate drive:
      i. synchronized to said reciprocating drive;
      ii. adapted to open said first subset of non-neighboring gates;
      iii. adapted to hold said first subset of non-neighboring gates open while said at least one floating body is moved through at least one respective open gate of said first subset of non-neighboring gates;
      iv. adapted to close said first subset of non-neighboring gates after said at least one floating body has moved through at least one respective open gate of said first subset of non-neighboring gates;
   b. a second gate drive:
      i. synchronized to said reciprocating drive;
      ii. adapted to open said second subset of non-neighboring gates;
      iii. adapted to hold said second subset of non-neighboring gates open while said at least one floating body is moved through at least one open gate of said second subset of non-neighboring gates;
      iv. adapted to close said second subset of non-neighboring gates after said at least one floating body has moved through at least one respective open gate of said second subset of non-neighboring gates; and
   c. a floating body driver:
      i. synchronized to said reciprocating drive; and
      ii. adapted to move at least one said floating body through said at least one open gate of one of said first and second subsets of non-neighboring gates.

20. The system of claim 15, comprising:
   a. an ascending step lock canal having opposed spaced-apart parallel walls;
   b. a plurality of gate support panels, each extending between, and sealing to, said walls;

c. wherein each said gate of said plurality of gates is supported in, and seals to when closed, a respective said gate support panel, thereby forming a gate and panel assembly;
d. wherein each said gate opens toward one of:
   i. an adjacent upper said step lock;
   ii. said reservoir; and
   iii. upward towards said reciprocating gear axle;
e. wherein each said gate and panel assembly is arcuate and convex toward one of an adjacent upper said step lock and said reservoir; and
f. a one-way valve in at least one of said gate support panel and said gate of each said gate and panel assembly.

* * * * *